April 28, 1953     H. J. MICHAEL     2,636,947
TWO-WAY TRUNK FOR PULSE CONVERSION SYSTEMS
Filed Dec. 16, 1949     39 Sheets-Sheet 1

FIG. I.

INVENTOR
H. J. MICHAEL
BY C. Mattice
ATTORNEY

INVENTOR
*H. J. MICHAEL*
BY C. Mattice
ATTORNEY

INVENTOR
H. J. MICHAEL
BY C. Mathie
ATTORNEY

INVENTOR
H. J. MICHAEL
BY C. Mattice
ATTORNEY

INVENTOR
H. J. MICHAEL
BY C. Mattice
ATTORNEY

April 28, 1953     H. J. MICHAEL     2,636,947
TWO-WAY TRUNK FOR PULSE CONVERSION SYSTEMS
Filed Dec. 16, 1949     39 Sheets-Sheet 20

INVENTOR
H. J. MICHAEL
BY C. Mattice
ATTORNEY

April 28, 1953     H. J. MICHAEL     2,636,947
TWO-WAY TRUNK FOR PULSE CONVERSION SYSTEMS
Filed Dec. 16, 1949                                               39 Sheets-Sheet 26

INVENTOR
H. J. MICHAEL
BY
*C. Mathie*

ATTORNEY

April 28, 1953 H. J. MICHAEL 2,636,947
TWO-WAY TRUNK FOR PULSE CONVERSION SYSTEMS
Filed Dec. 16, 1949 39 Sheets-Sheet 32

INVENTOR
H. J. MICHAEL
BY C. Mattice
ATTORNEY

April 28, 1953 H. J. MICHAEL 2,636,947
TWO-WAY TRUNK FOR PULSE CONVERSION SYSTEMS
Filed Dec. 16, 1949 39 Sheets-Sheet 36

INVENTOR
H. J. MICHAEL
BY C. Mathis
ATTORNEY

INVENTOR
H. J. MICHAEL
BY C. Mathie
ATTORNEY

April 28, 1953 H. J. MICHAEL 2,636,947
TWO-WAY TRUNK FOR PULSE CONVERSION SYSTEMS
Filed Dec. 16, 1949 39 Sheets-Sheet 39

FIG. 39.

| FIG.38 | | | | | | | | | |
|---|---|---|---|---|---|---|---|---|---|
| | FIG.9 | FIG.17 | FIG.24 | FIG.31 | | | | | |
| | | FIG.10 | FIG.18 | FIG.25 | FIG.32 | | | | |
| | | FIG.11 | FIG.19 | FIG.26 | FIG.33 | | | | |
| | | FIG.12 | FIG.20 | FIG.27 | FIG.34 | | | | |
| | | FIG.13 | FIG.21 | FIG.28 | FIG.35 | | | | |
| | | FIG.14 | FIG.22 | FIG.29 | FIG.36 | | | | |
| | | FIG.15 | FIG.23 | FIG.30 | FIG.37 | | | | |
| | FIG.1 | | | | | | | | |
| | FIG.2 | | | | | | | | |
| | FIG.3 | | | | | | | | |
| | FIG.4 | | | | | | | | |
| | FIG.5 | | | | | | | | |
| | FIG.6 | | | | | | | | |
| | FIG.7 | FIG.16 | | | | | | | |
| | FIG.8 | | | | | | | | |

INVENTOR
H. J. MICHAEL
BY C. Mattice
ATTORNEY

Patented Apr. 28, 1953

2,636,947

UNITED STATES PATENT OFFICE 2,636,947

TWO-WAY TRUNK FOR PULSE CONVERSION SYSTEMS

Henry J. Michael, Mineola, N. Y., assignor to Bell Telephone Laboratories, Incorporated, New York, N. Y., a corporation of New York Application December 16, 1949, Serial No. 133,381

6 Claims. (Cl. 179—27)

This invention relates to automatic telephone systems and has for its object to facilitate the establishment of connections between offices employing different types of automatic equipment.

Heretofore it has been the general custom to set up such interoffice calls under the control of register senders which are equipped with registers to be set in accordance with the type of pulses employed in the office in which the call originates and with sending mechanism to send out pulses of the type required by the office in which the call terminates.

Recently a cross-bar system has been developed in which the registering function has been separated from the sending function and separate apparatus units known as registers and senders are provided for the two functions. In addition, different types of registers are provided to receive different types of pulses and different types of senders are provided to send out different types of pulses. Such a system is disclosed in the Patent No. 2,585,904, granted to A. J. Busch, February 19, 1952.

Trunks incoming to such a cross-bar office are arranged to be connected with an incoming register equipped to receive the type of pulses employed at the office from which the trunk comes, while trunks outgoing from the cross-bar office are arranged to be connected with a sender equipped to send out the type of pulses required by the office to which the trunk extends.

For certain interoffice traffic two-way trunks present advantages, and the present invention relates to the use of such trunks in a system of the type above described.

In accordance with the present invention a two-way trunk circuit terminating a trunk connecting two automatic offices employing different types of pulses is arranged to be connected with one of two types of registers in accordance with the office at which the trunk is seized.

According to a further feature of the invention, a trunk circuit seizable automatically or manually is arranged to be associated with one or with two pieces of control apparatus in accordance with the means of seizure.

More specifically, when the trunk circuit is seized automatically it is associated with a sender which controls the transmission of pulses to the distant office and when seized manually it is first associated with a register and subsequently with a sender, in order to convert the type of pulsing employed by the manual operator to the type of pulsing required by the distant office.

These and other features of the invention will be more clearly understood from a consideration of the following description in connection with the drawings in which.

Figure 24:
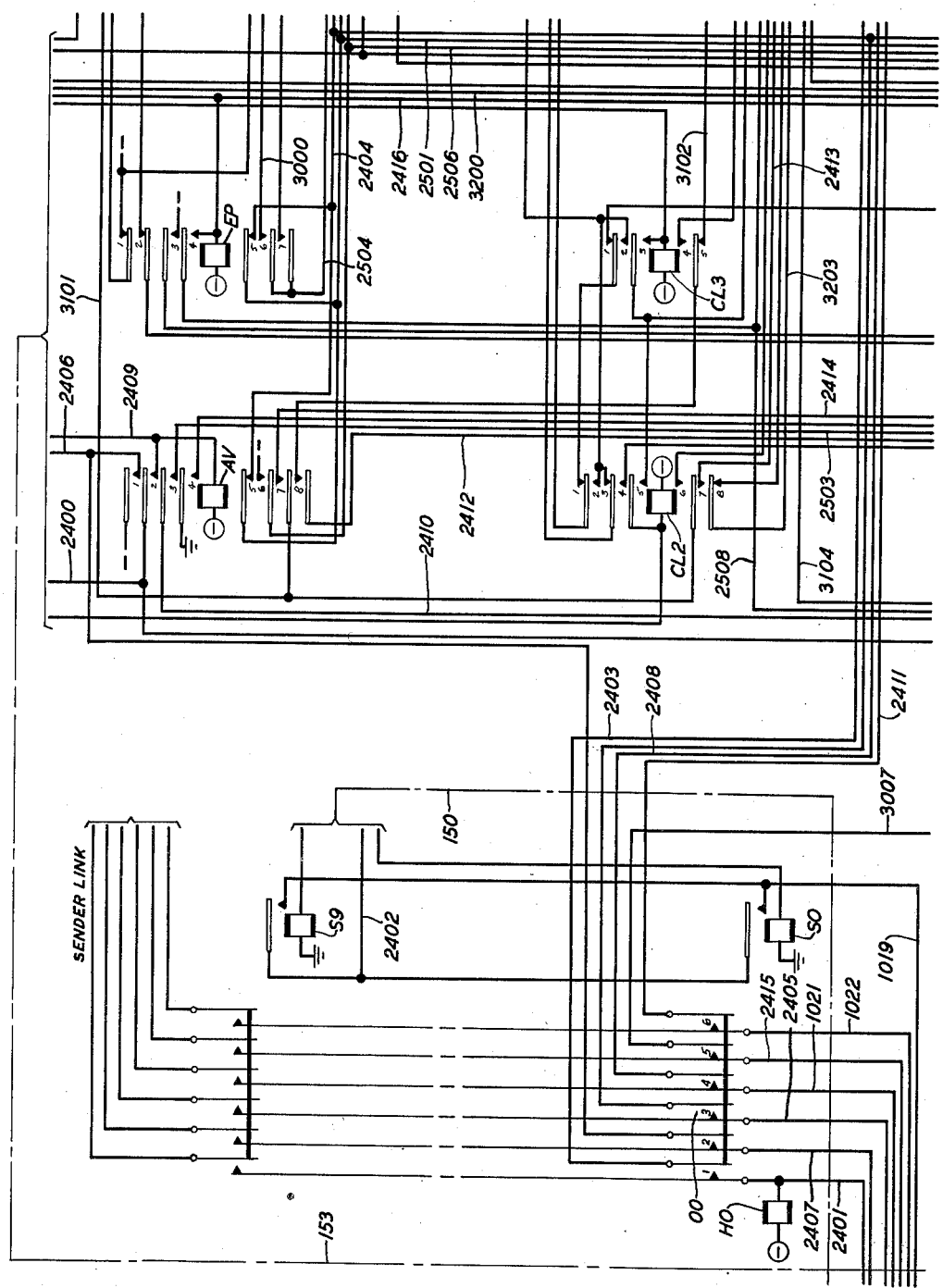
Figure 25:
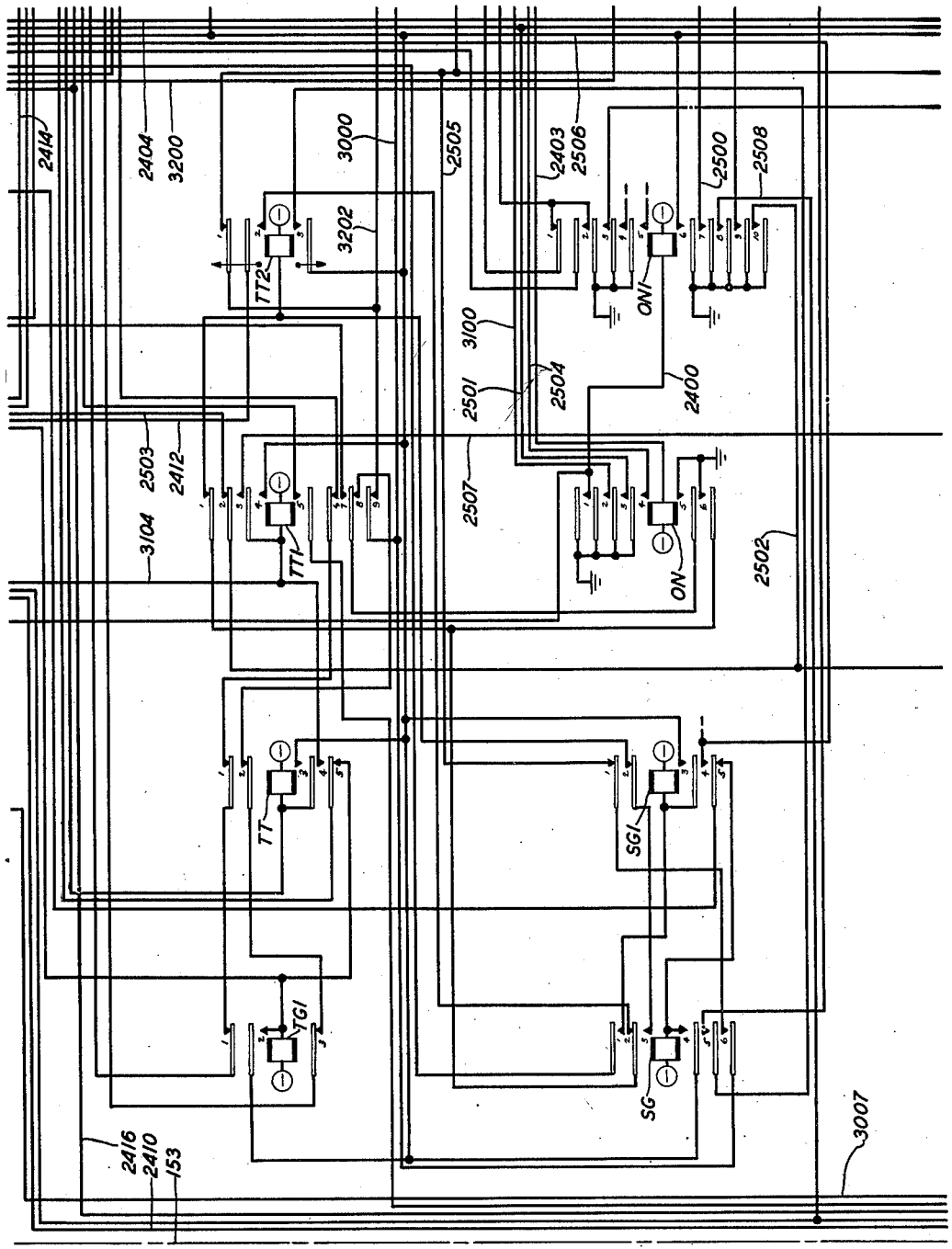
Figure 26:
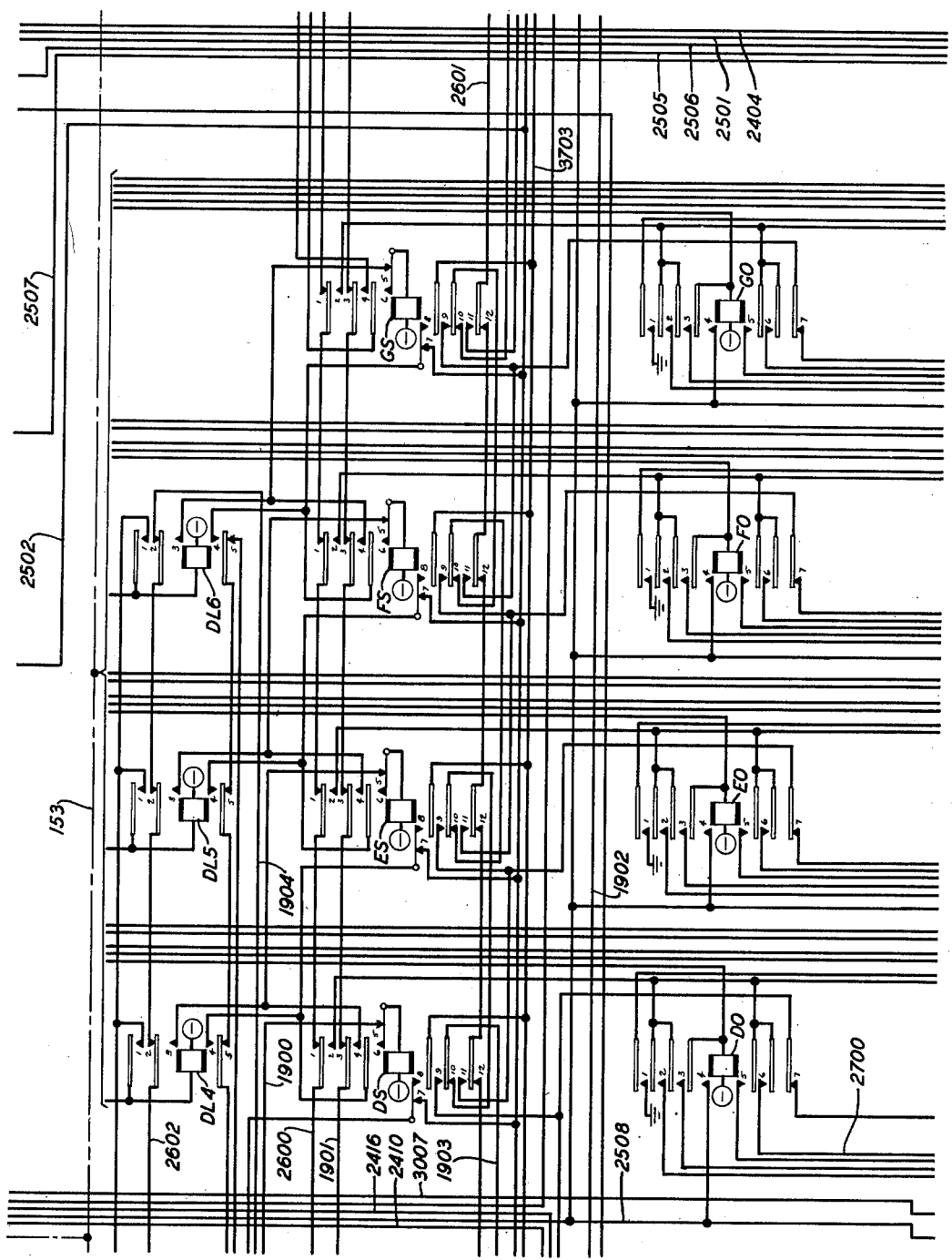
Figure 27:
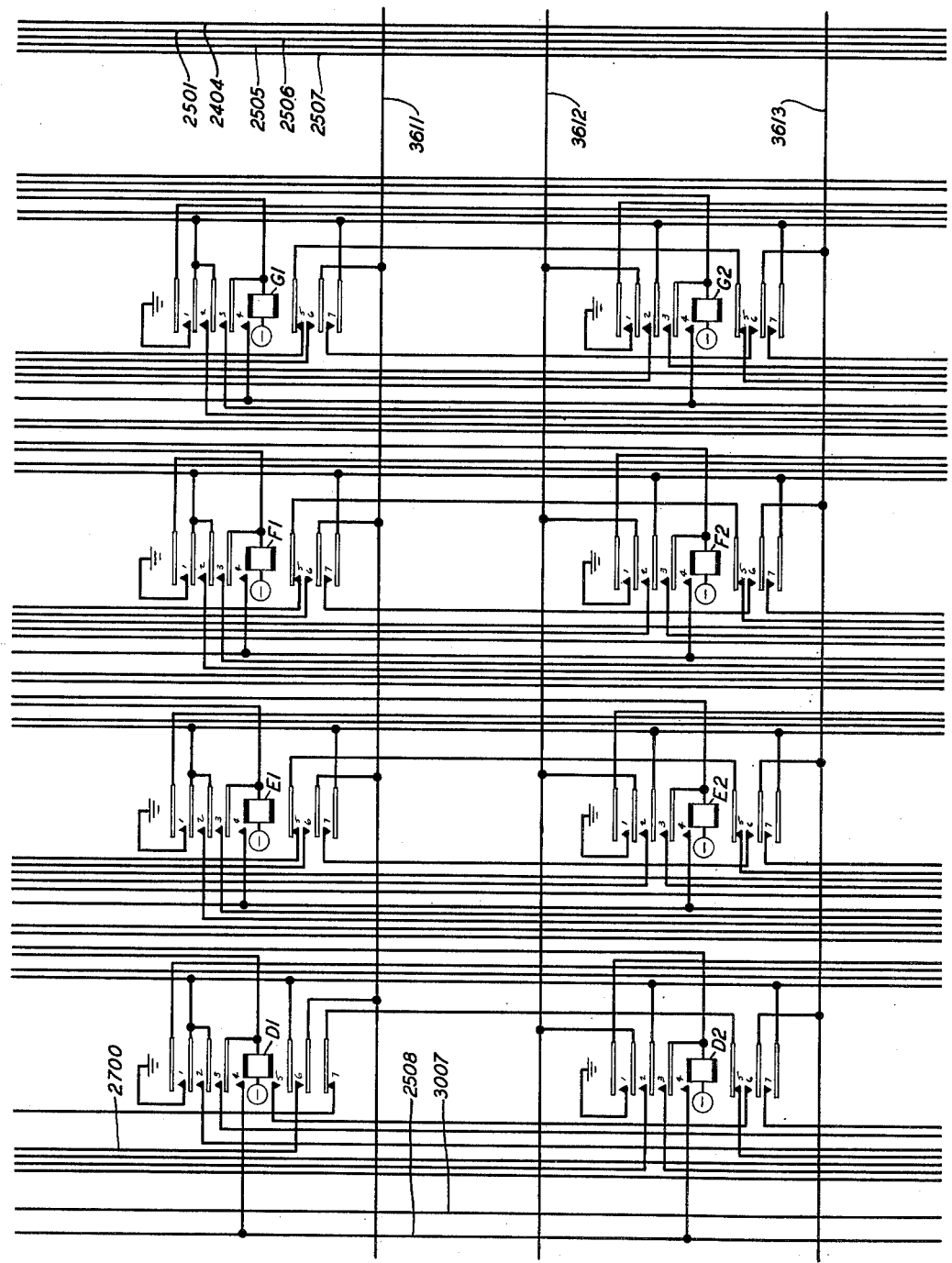
Figure 28:
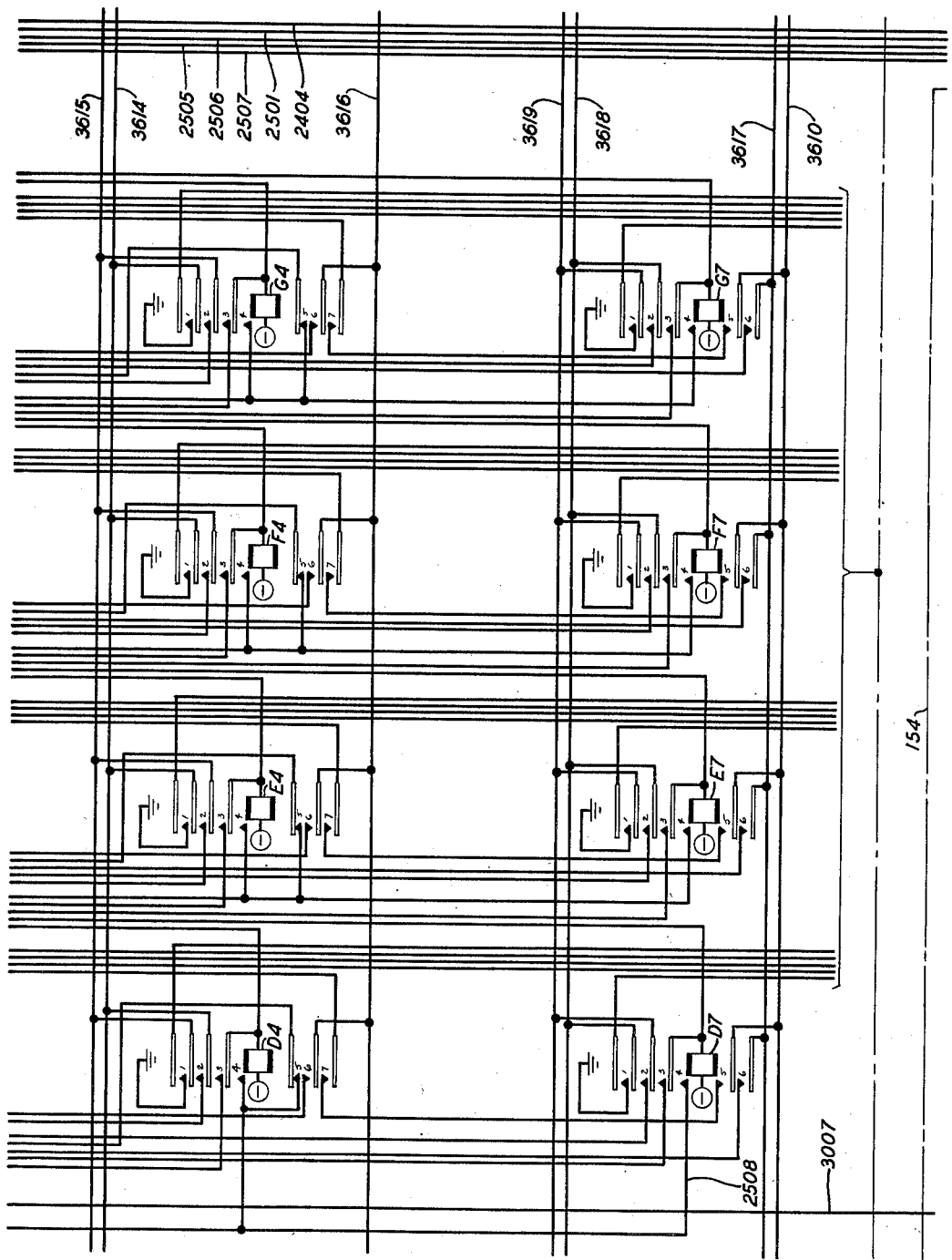
Figure 29:
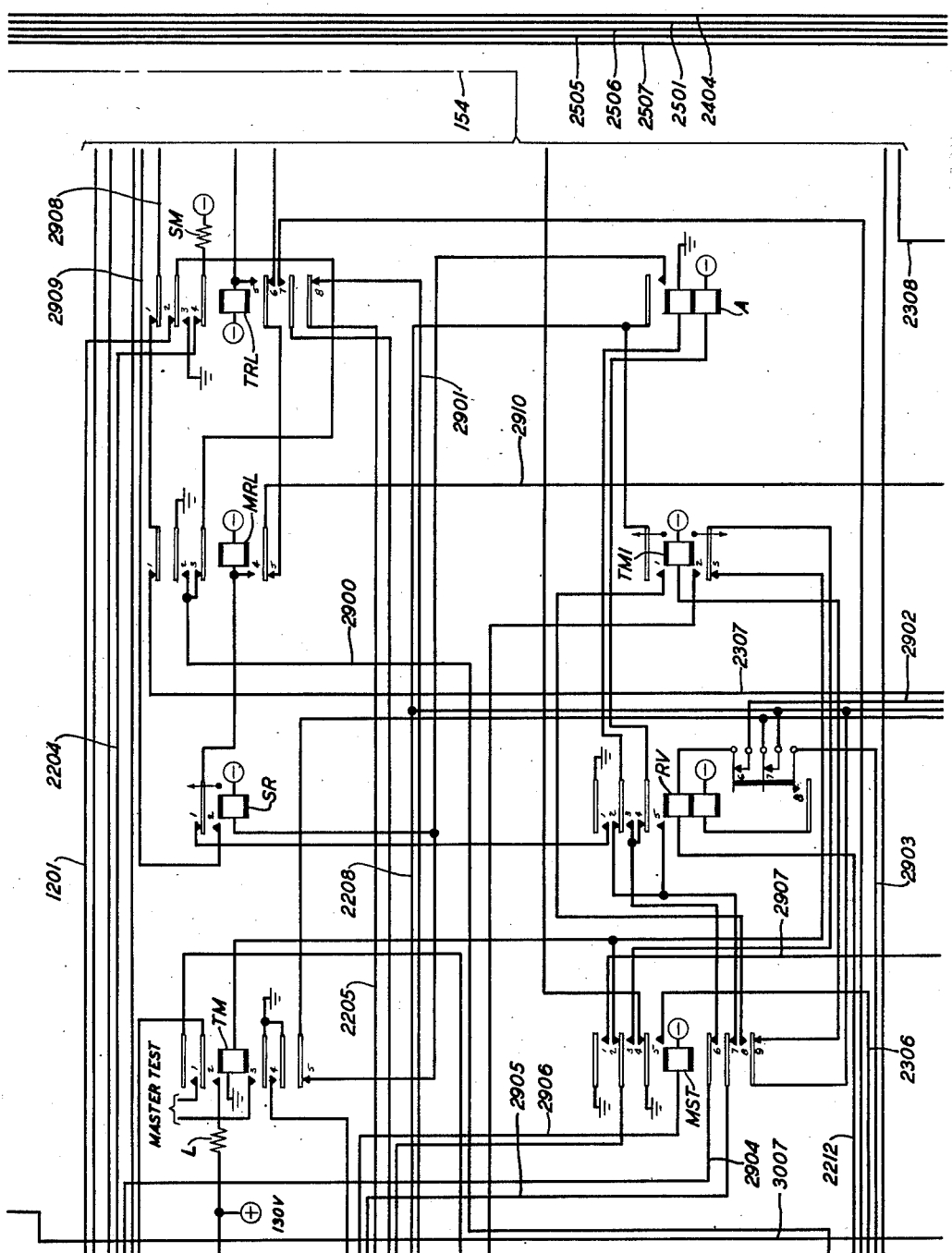
Figure 30:
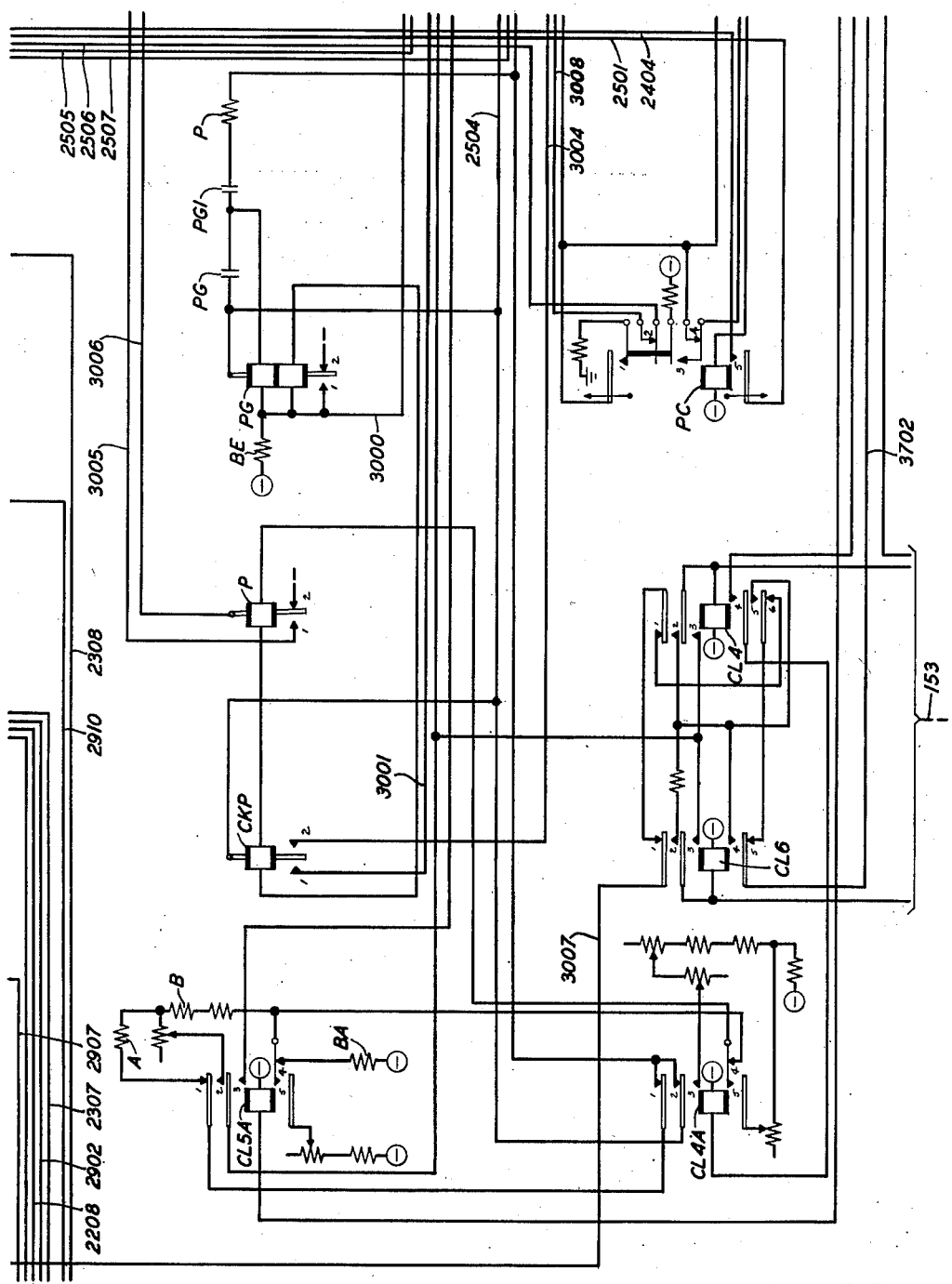
Figure 31:
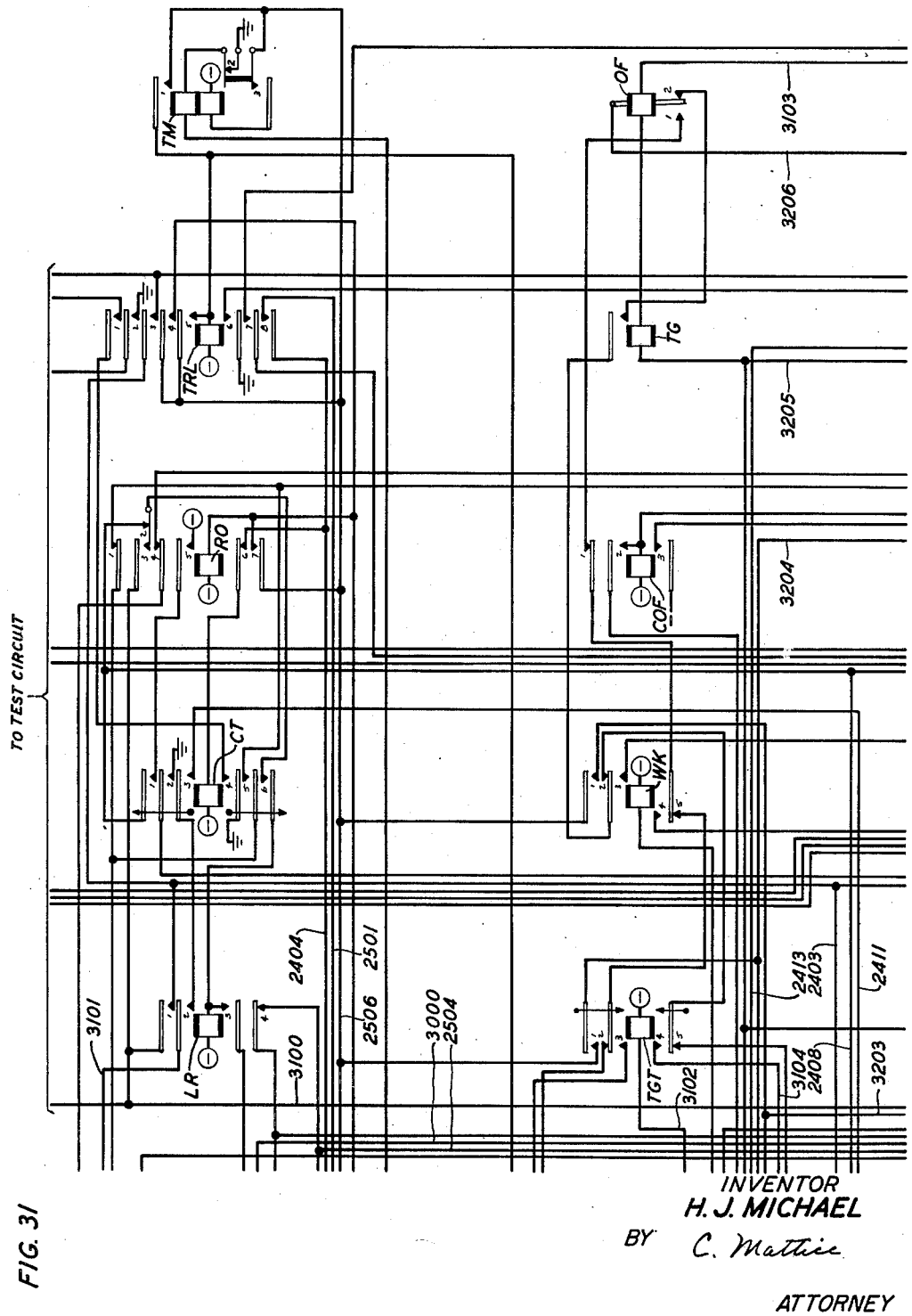
Figure 32:
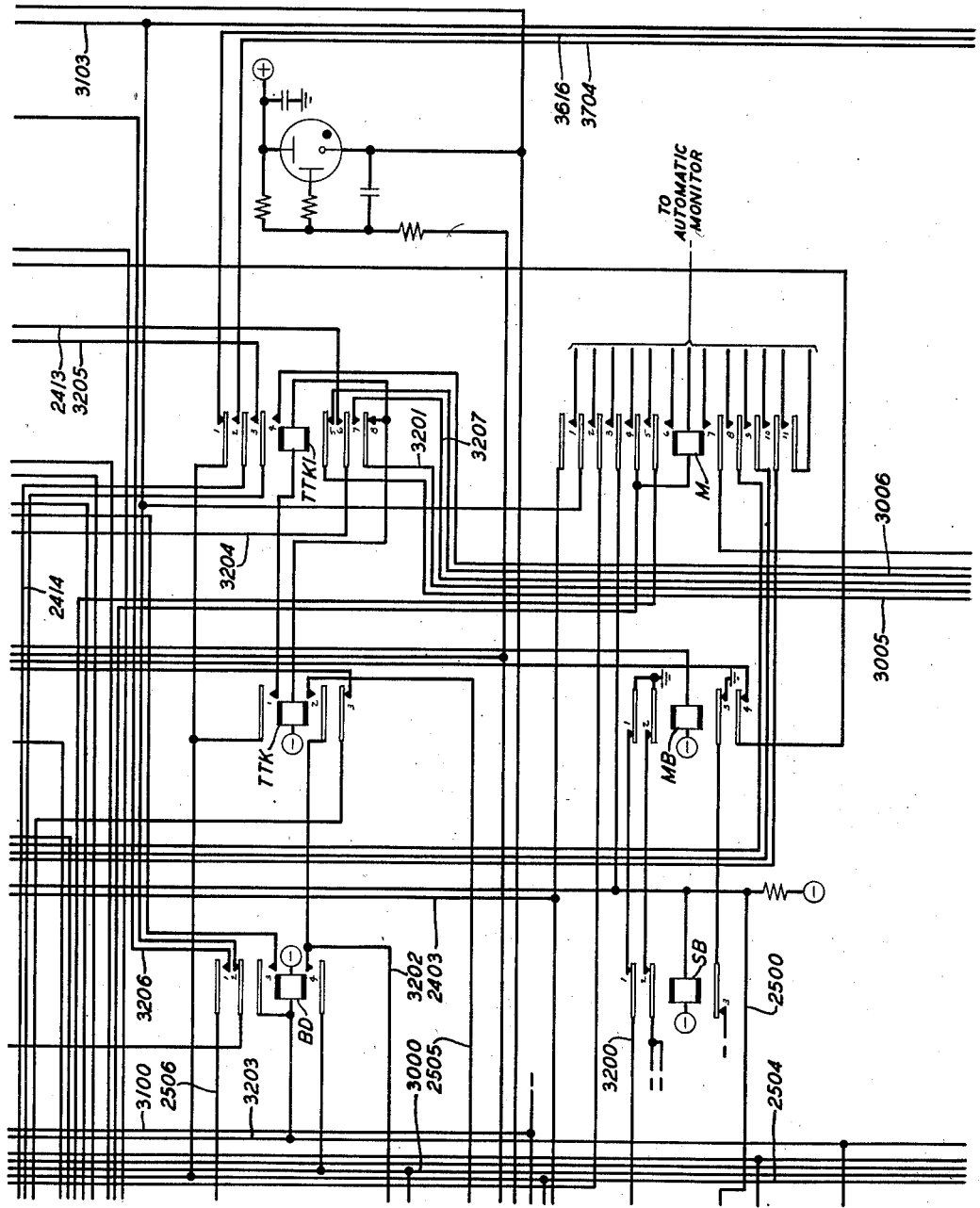
Figure 33:
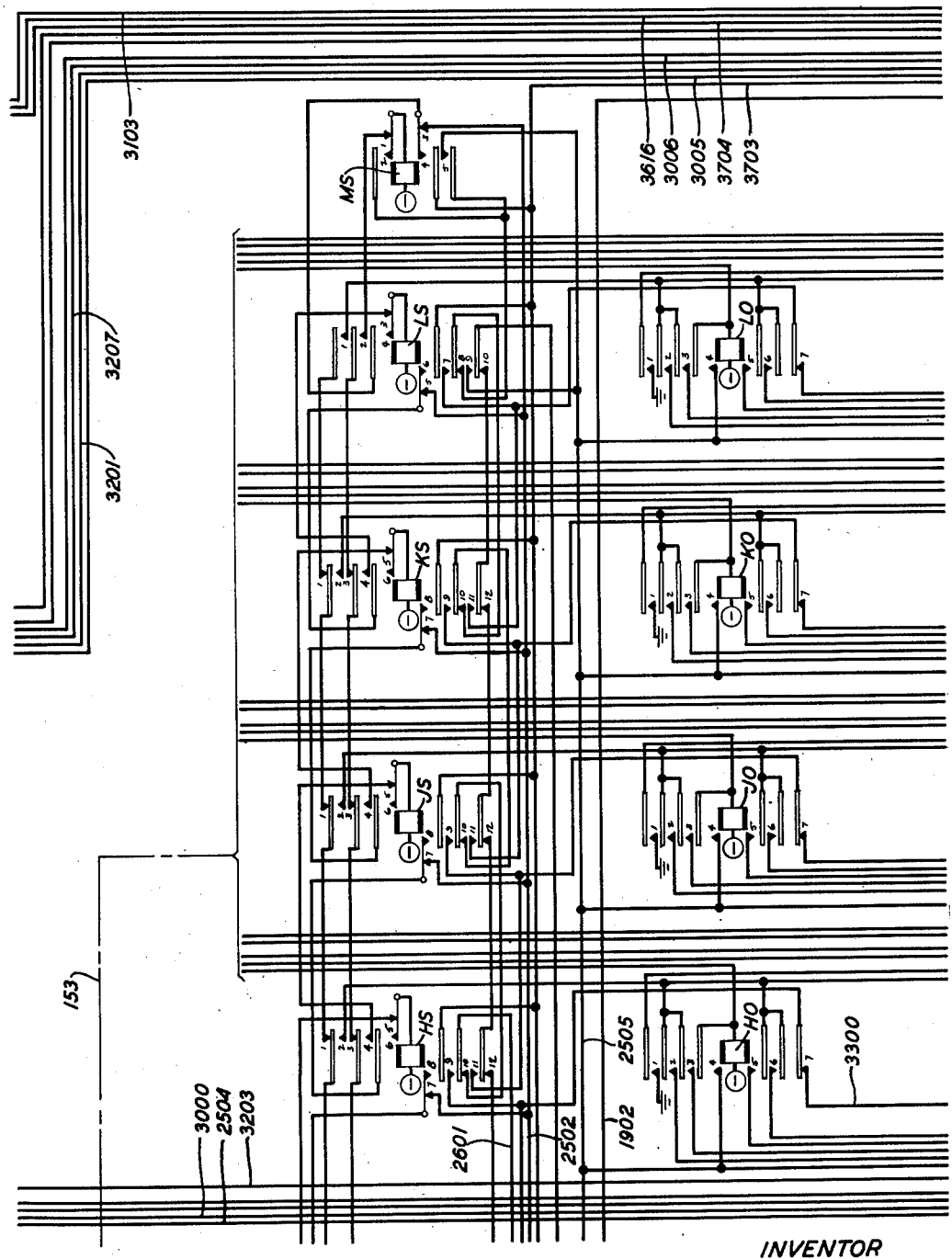
Figure 34:
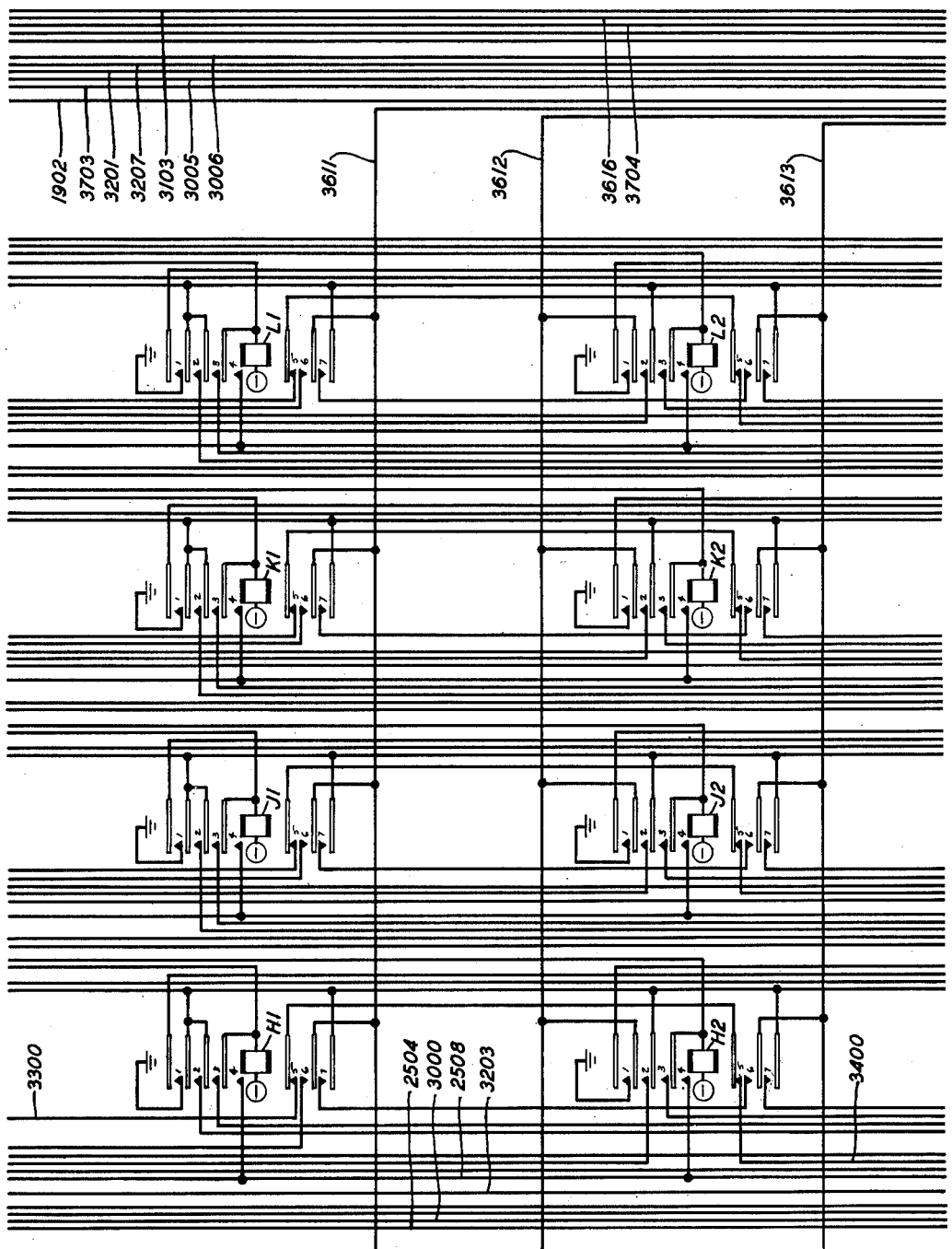
Figure 35:
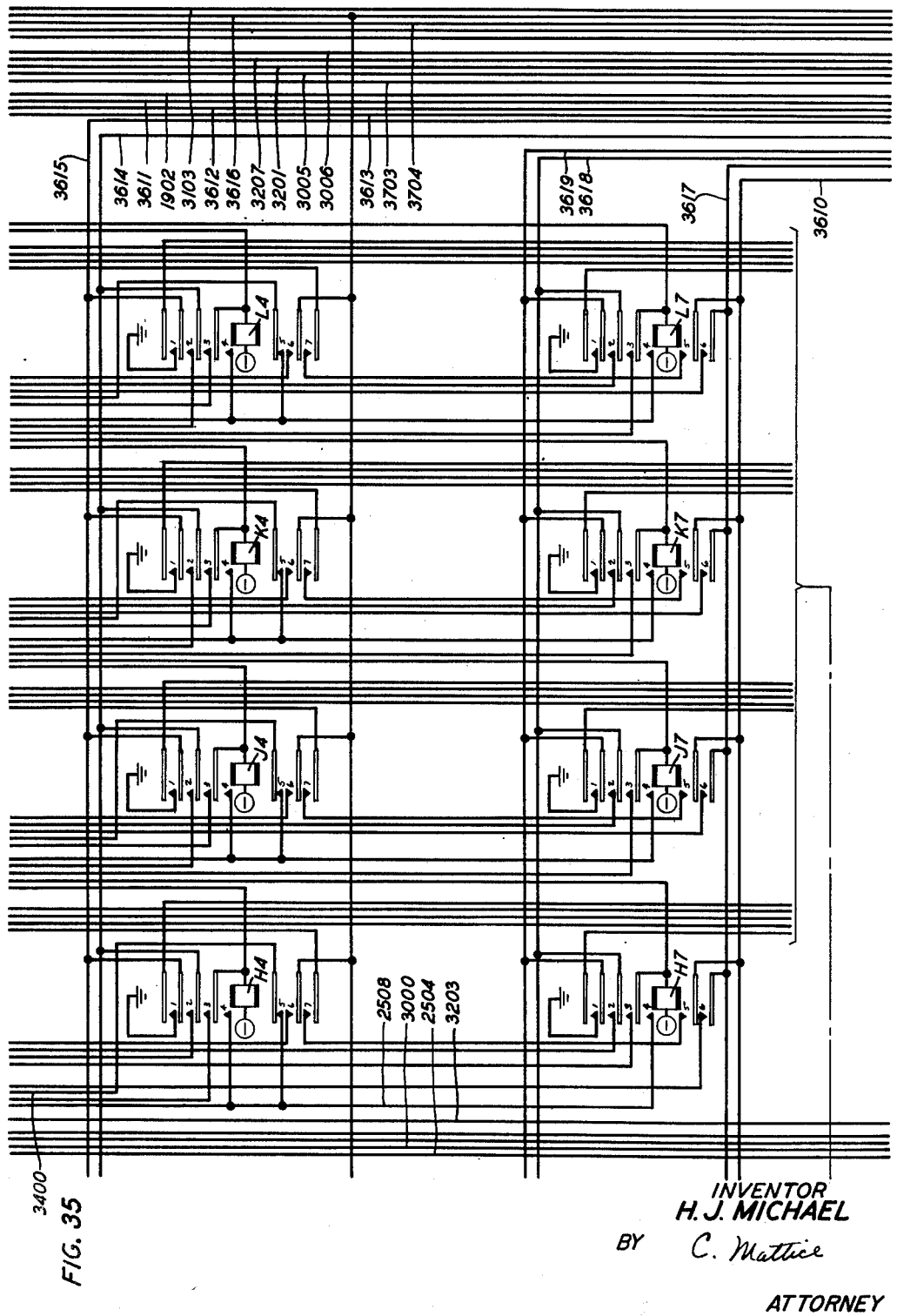
Figure 38:
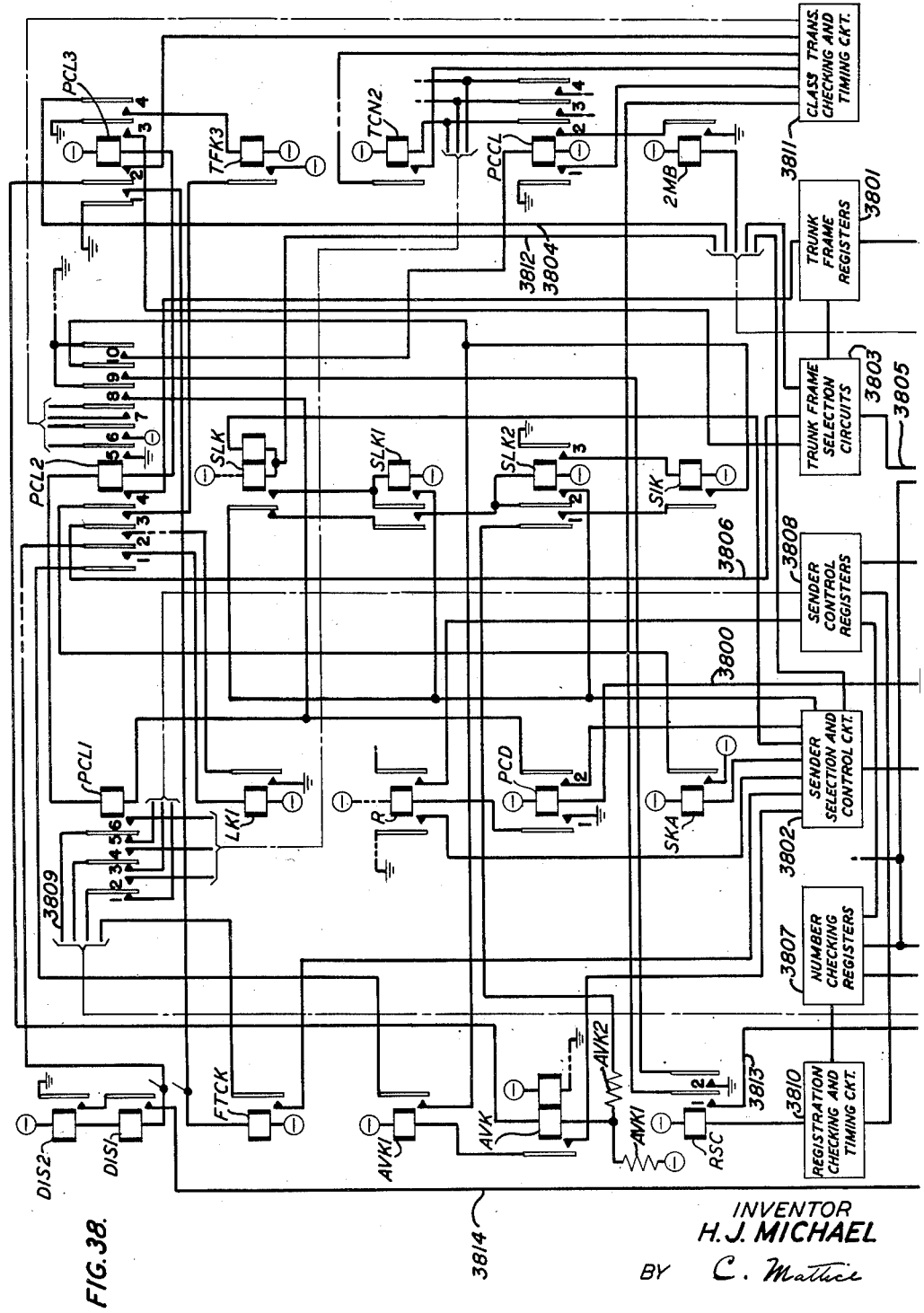

Figs. 19 to 21, 25 to 28, and 30 to 37 show a dial pulsing outgoing sender;

Fig. 24 shows the sender link and a part of the outgoing sender;

Fig. 38 shows that part of the marker concerned with pulse conversion; and

Fig. 39 is a diagram showing the manner in which Figs. 1 to 38 are to be arranged.

In the drawing, functional letter designations have been used, while in the specification these designations are followed by the number of the figure in which the designated equipment appears, the number being enclosed in parentheses. For a detailed description of a complete telephone system with which the circuits of the present specification function, reference is made to the above-identified patent to A. J. Busch. Portions of the system disclosed herein are disclosed and claimed in the copending application of Michael-Whitney, Ser. No. 133,382, filed December 16, 1949, now Patent No. 2,596,584, granted May 13, 1952.

General description

The trunk circuit of Figs. 2, 9, 10 and 18, located at a cross-bar office of the type shown in the above-mentioned Busch patent may be used as a part of four kinds of connections between that office and a step-by-step office, namely an incoming call for a subscriber at the cross-bar office, an incoming call for a subscriber at a third office for which the cross-bar office acts as a tandem office, an outgoing call originated by a subscriber at a third office, the cross-bar office acting as a tandem office and an outgoing call originated by a toll operator located at the cross-bar office. The trunk circuit might be used in connection with a call originated by a subscriber located at the cross-bar office, but would probably not be so used since simpler, less expensive trunk circuits would serve the purpose better.

The trunk circuit accordingly appears at three points in the office, namely, on a trunk link frame, on a line link frame and at an operator's position.

When the trunk circuit is seized for an incoming call, it operates a register link to connect itself with an idle dial-type incoming register, which receives the designation of the wanted line and in turn operates a marker connector to connect itself with an idle marker to which it transfers the received designation. The marker determines from this designation whether the call is to be terminated at the cross-bar office or at some third office. In the former case it seizes the trunk link appearance of the trunk circuit, locates and tests the wanted line and, if the line is idle, operates a set of switches to connect the trunk circuit with the line. In the latter case, the marker seizes the line link appearance of the trunk, identifies the wanted office, tests for an idle trunk outgoing to that office and sets up a connection between the two trunks.

For an outgoing call, when the marker finds this trunk to be the preferred idle trunk, it also selects an idle dial-type outgoing sender, connects with the selected sender and sets up a connection between the selected sender and the trunk. It then transfers the designation which it received from an incoming register to the sender, and connects the incoming trunk with the trunk link appearance of this trunk. The sender then operates in connection with the trunk circuit to transmit the designation of the wanted line to the step-by-step office.

When a toll operator, whose position is equipped with a multifrequency key-set, seizes the trunk for an outgoing call, the trunk circuit first connects itself with a multifrequency incoming register which registers the designation set up by the operator on her key-set, and calls in a marker. The marker receives a special class indication, in response to which it selects an idle dial-type outgoing sender, connects it with the trunk circuit, and transfers the designation from the incoming register to the outgoing sender, without performing any switch controlling functions. The outgoing sender then operates as above to transmit the designation to the step-by-step office.

*Incoming call*

An incoming call will be described first. When the toll operator at the step-by-step office, indicated at the lower left corner of Fig. 1, seizes this trunk by inserting the plug 100 of a cord circuit at her position into jack 101, the trunk circuit 102 responds to transmit a signal by way of the composite signal circuit 103 at the step-by-step office and the composite signal circuit 104 at the cross-bar office, which results in the connection of ground to conductor 200 completing a circuit over contact 11 of relay TT(2), conductor 201 to battery through the winding of relay E(10).

Relay E(10) operates in this circuit and at its contact 1 connects ground to conductor 1005, completing a circuit over contact 2 of relay CO(2), contact 6 of relay SG(2), conductor 204, to battery through the winding of relay MB(10). Relay E(10) also closes a circuit which may be traced from ground, contact 1 of relay F(10), conductor 202, contact 3 of relay SG(2), contact 4 of relay SL(2), conductor 1000, contact 4 of relay E(10) to battery through the winding of relay IN(10). Relay IN(10) operates in this circuit to indicate the presence of an incoming call and closes a supplementary circuit for operating relay MB(10) from ground over its contact 9 to conductor 204 and battery through the winding of relay MB(10). The circuit for operating relay IN(10) extends over normally closed contacts of relays SL(2), SG(2) and F(10) to prevent its operation if the trunk has just been seized for use by a local toll operator, for use with an outgoing call, or by the marker, as will appear hereinafter.

When the trunk is idle, ground is connected over contact 4 of relay MB(10) to conductor 1001, and the winding of relay F(10) is connected over contact 2 of relay MB(10) to conductor 1002. These conductors extend through cable 150 to the trunk link connector where the marker uses them in selecting a trunk frame having an idle trunk and for selecting an idle trunk. With relay MB(10) operated, these circuits are opened to mark the trunk busy to the marker.

Relay MB(10) at its contact 5 completes a circuit from ground through resistance W(10) and WI(10) to battery and at contact 10 extends a connection from the junction of resistances W(10) and WI(10) over conductor 1003, contact 2 of relay SL(2) and conductor 203 to the sleeve of jack 120 to mark the trunk busy to the toll operator. Relay MB(10) also connects battery through resistance BL(10) to conductor 1004 to mark the trunk busy at the lamp indicator and at its contact removes ground from conductor 1005 leading to the group busy circuit.

Relay E(10) also closes a circuit from ground over its contact 5 to battery through the winding of relay EA(10). Relay EA(10) connects ground over its contact 2, conductor 1007, contact 5 of relay SG(2), and conductor 205 to resistance J(10) to prevent condenser G(10) from charging.

With relay MB(10) operated, relay IN(10) locks in a circuit from battery through its winding and over its contact 4, contact 3 of relay G(10) to ground at contact 7 of relay MB(10). Relay IN(10) closes a circuit from battery through resistance lamp M(18), conductor 1800, contact 3 of relay RV(2), conductor 206, contact 2 of relay IN(10), contact 1 of relay RD(10), conductor 1008 contact 7 of relay BY(9), to conductor 909, in shunt of ground through resistance M(9) and thence over contact 9 of relay TT(2) to conductor 207 leading to the composite signal circuit 104, resulting in a stop-dial signal at the operator's position in the step-by-step office.

At its contact 3, relay IN(10) connects +130-volt battery to electrode 1 of tube G(10), to prepare the tube for subsequent operation. At its contacts 5, relay IN(10) disconnects the windings of relay SL(2) from the sleeve of jack 120 to prevent the local toll operator from breaking in on an established connection, should she disregard the busy indication.

In addition, relay IN(10) closes a circuit from battery through resistance ST(2), contact 4 of relay CO(2), conductor 208, contact 6 of relay IN(2) to the start conductor 1009 which extends through cable 151 to the register link 105 which serves dial type incoming registers. Link 105 operates to select an idle dial type incoming register such as register 106 and connects it with the trunk. For a complete disclosure of a register link, reference may be made to the above-identified Busch patent. A dial type incoming register receives the incoming pulses in substantially the same way as the originating register shown in the Busch patent and in its relations with the marker is the same as the revertive type incoming register shown in that patent.

When the incoming register 106 is ready to receive pulses, it connects ground through the register link 105 and cable 151 to conductor 209 and battery through the winding of relay CO(2). Relay CO(2) operates and locks over its contact 3 and conductor 210 to ground at contact 7 of relay IN(10). At its contact 4, relay CO(2) disconnects battery from start conductor 1009, leaving the register link 105 hold under the control of the register 106. At its contact 1, relay CO(2) connects ground to conductor 211 which extends through cable 151 and the link 105 to the register 106 to inform the register 106 that relay CO(2) has operated. At its contact 6 relay CO(2) connects ground to conductor 204 to hold relay MB(10) operated to hold the trunk circuit busy until the register disconnects, in case the call is abandoned.

The register 106, when first connected with the trunk, connects ground to conductor 901, which extends through resistance DP(9), conductor 1006, contact 2 of relay CO(2), contact 6 of relay SG(2) to conductor 204, which is also grounded over contact 9 of relay IN(10), and connects battery through the pulsing relay of the register to conductor 237 which extends over contact 8 of relay RV(2) to battery through the winding of that relay. When relay CO(2) operates, conductor 901 is disconnected from ground on conductor 204 and a measured time interval thereafter, the register reverses the connection of battery and ground to conductors 901 and 237. With ground connected to conductor 237, relay RV(2) operates, locking over its contact 9, conductor 231, contact 3 of relay RD(10), conductor 1031, to ground at contact 8 of relay SG(2). Since relay E(10) is operated, ground is connected over conductor 1006 and through resistance DP(9) to conductor 901 to operate the pulsing relay of the register.

Relay RV(2) at its contact 1 disconnects battery through resistance lamp M(18) from conductor 206 which extends as above traced to conductor 207 leading to the composite signal circuit 104 and connects ground to that conductor, which acts as a start dial signal to the originating office.

When the operator operates her dial 107, pulses are transmitted over conductor 209, releasing relay E(10) at each operation of the dial contact, in turn opening the circuit of the pulsing relay in the incoming register. In this manner the number of the wanted line is registered in the incoming register 106.

When dialing is completed, a relay is operated in the register 106 to initiate the operation of the marker connector 108 to connect the incoming register 106 with an idle marker part of which is shown in Fig. 38. This relay also connects ground to conductor 902, operating relay RD(10) in the trunk circuit. Relay RD(10) locks over its contact 6 and conductor 905 to ground at contact 8 of relay IN(10). Relay RD(10) at its contact 1 disconnects conductor 1008, which extends as previously traced to conductor 207 leading to the composite signal circuit 104, from the ground supplied over contact 2 of relay IN(10) and contact 4 of relay RV(2) and at its contact 2 extends that conductor over conductor 1010, contact 7 of relay LT(9), conductor 993 to ground over contact 1 of supervisory relay SV(18). At its contact 3, relay RD(10) opens the locking circuit of relay RV(2) permitting that relay to release. At its contact 7, relay RD(10) connects ground through resistance S(10) to conductor 1011 which leads through cable 150 to the trunk link frame to hold the switches operated if the call is terminated locally.

*Locally terminated call*

Assuming first that the incoming call is for a subscriber located at the cross-bar office, the marker will determine this fact from the designation transferred to it from the incoming register 106 and will seize the trunk link connector 110 serving trunk link frame 9 to which this trunk is connected. It then connects negative battery through the marker connector 108, the incoming register 106 and cable 151 to conductor 904, windings of relay IF(18), conductor 1811 to ground at contact 8 of relay RD(10). Relay IF(18) is so designed that it closes its lower contacts 2 and 3 in response to negative battery connected to conductor 904 and closes its upper contact 1 in response to positive battery connected to conductor 904. The closure of contact 2 by relay IF(18) completes a circuit from battery through resistance L(18) to ground through the winding of relay LF(18). Ground over contact 3 of relay IF(18) completes a circuit over conductor 1801 to battery through the winding of relay LT(9).

Relay LF(18) connects ground to conductor 1802, leading through cable 150 to the trunk link connector 110 to operate an auxiliary relay which associates the trunk with the marker and operates multicontact relays to give the marker access to the trunk link switches. Relay LF(18) also prepares other circuits for control by the marker.

Relay LT(9) operates in the circuit above traced and locks over its contact 5 and conductor 905 to ground at contact 8 of relay IN(10). It closes through the talking circuit which will be traced hereinafter and at contacts 6 and 7 transfers the control of conductor 207 from ground at contact 1 of relay SV(18) to ground at contact 2 of relay CS(9).

In the meantime the marker has determined the location of the called line, seized the line link frame on which the line is located, determined whether the line is busy or idle and, assuming that the line is idle, has tested for and selected an idle channel for connecting the called line with the trunk, after which it causes the release of the register 106.

Figure 1:
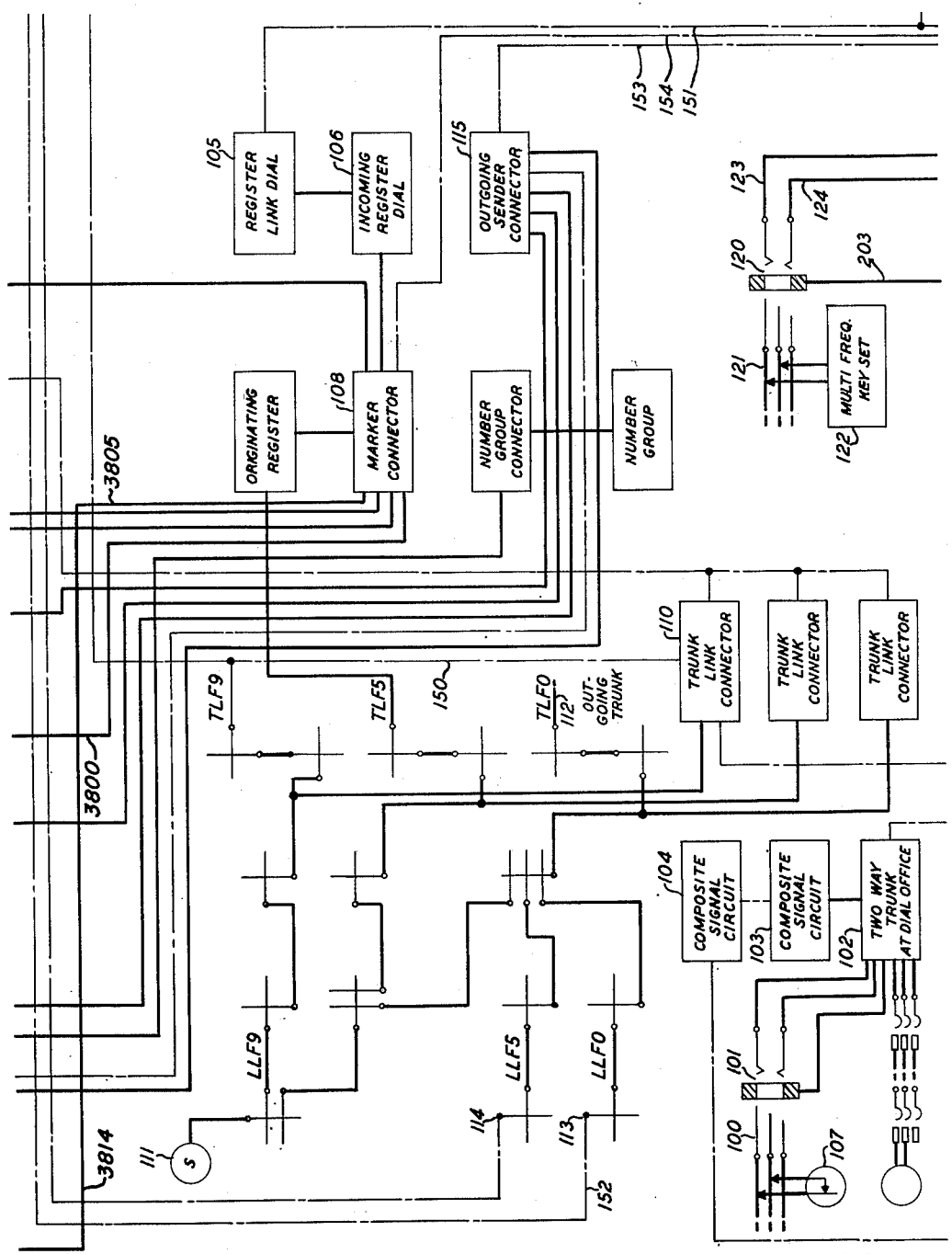
Fig. 1 shows in diagrammatic form the switches, control circuits, and an operator's position of a cross-bar system, together with certain equipment at a step-by-step office.
Figure 2:
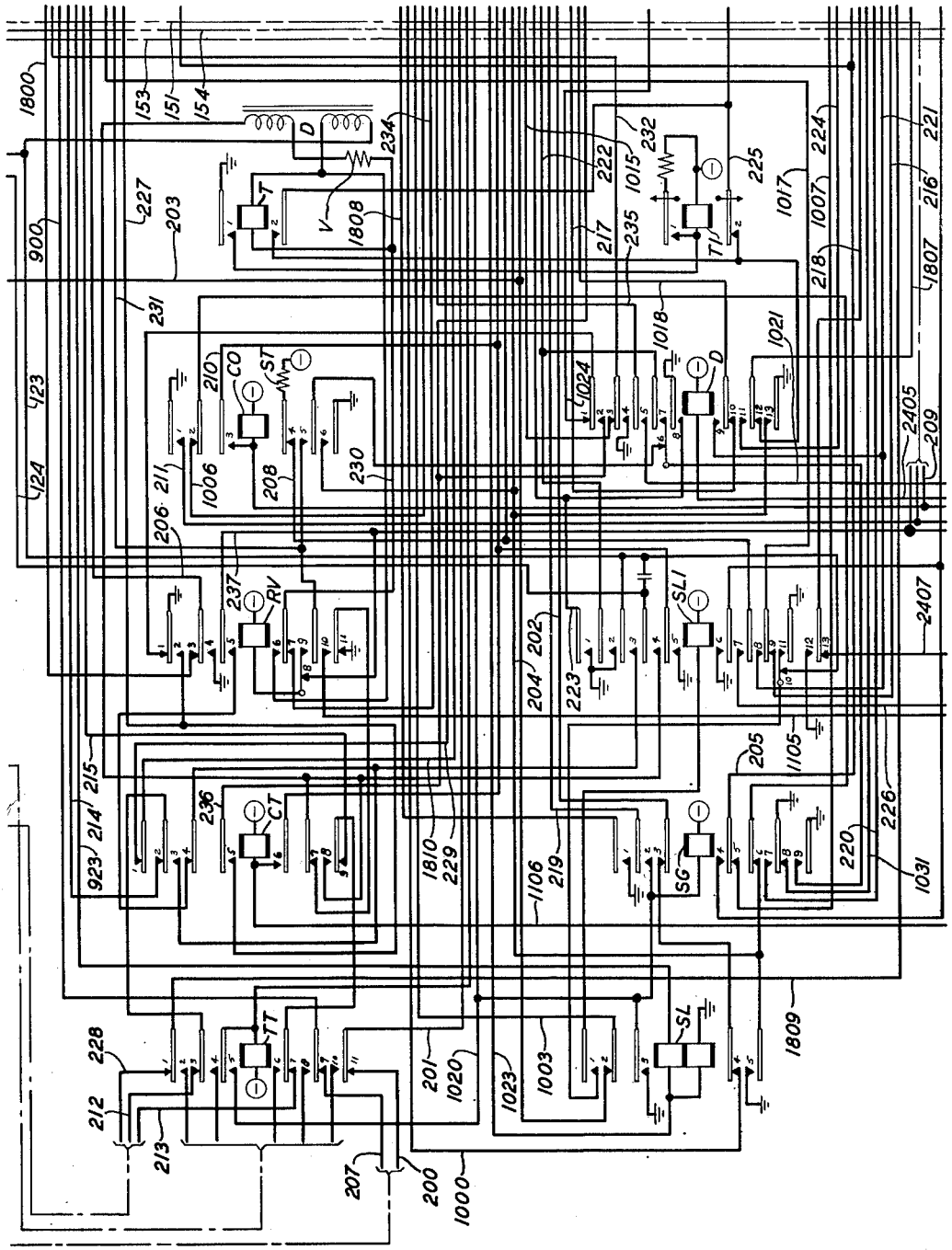
Figs. 2, 9, 10 and 18 show the two-way trunk circuit.
Figure 3:
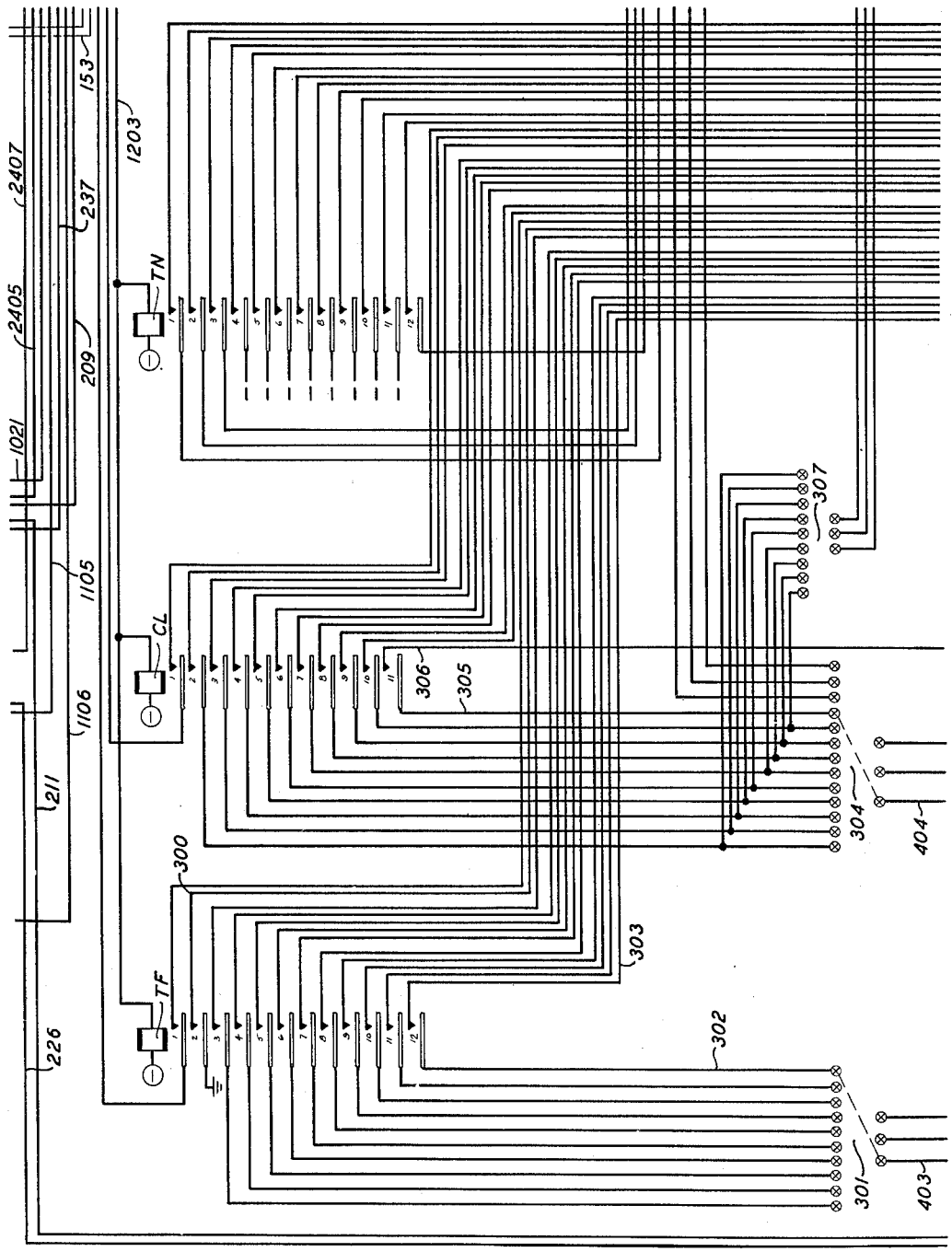
Figs. 3, 4, 11 and 12 show the register connector.
Figure 4:
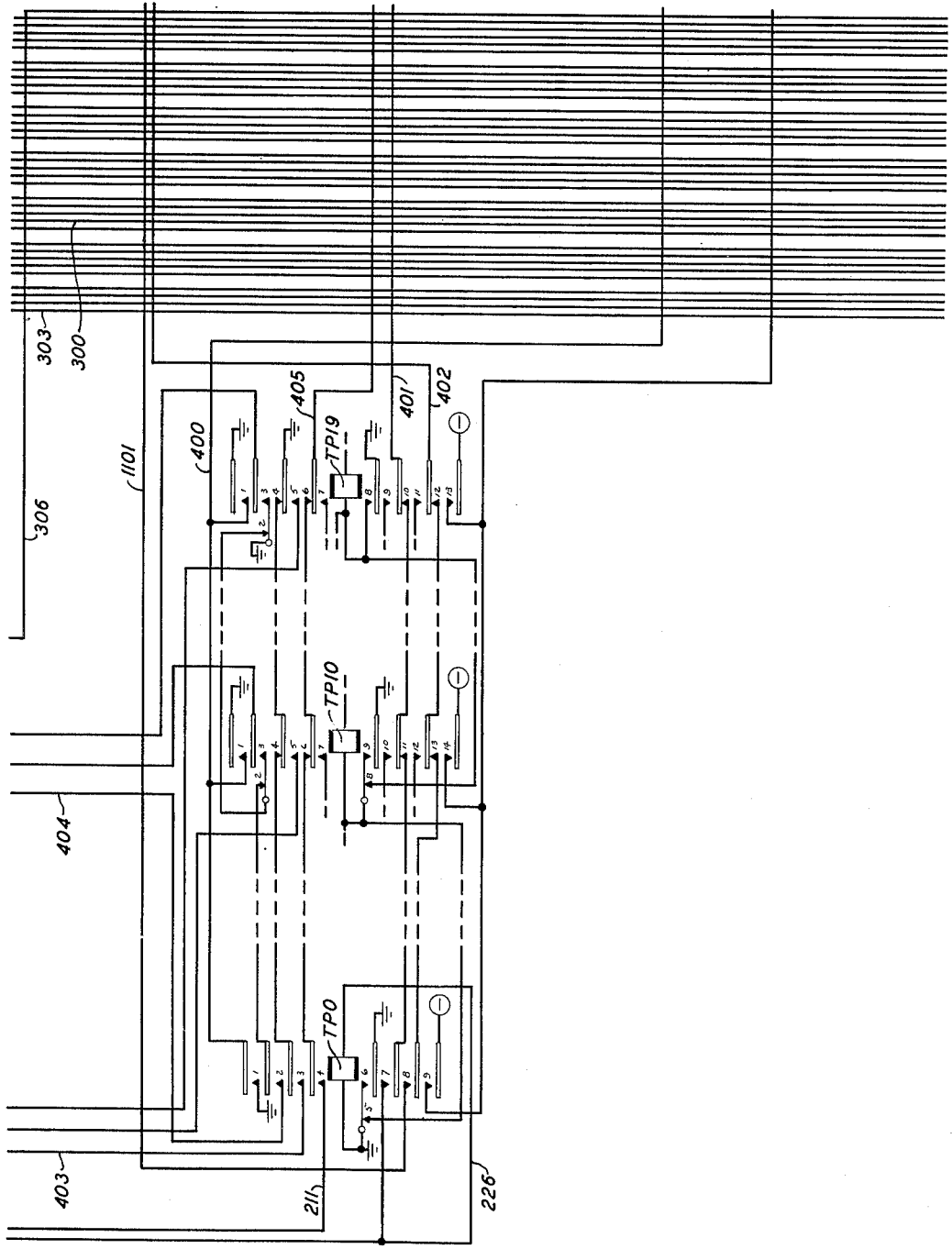
Figure 5:
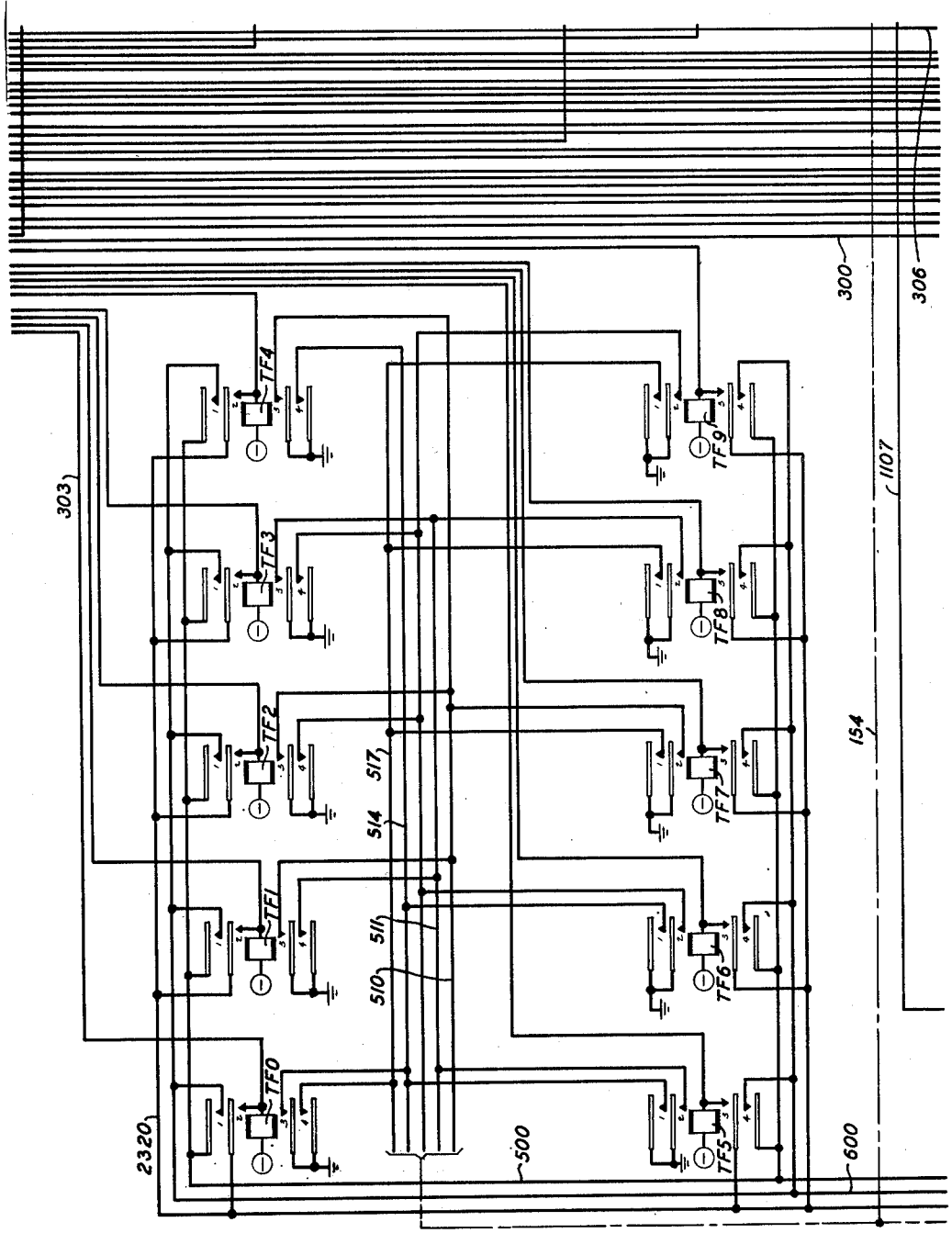
Figs. 5 to 8, 13 to 16, 22, 23 and 29 show a multi-frequency incoming register.
Figure 6:
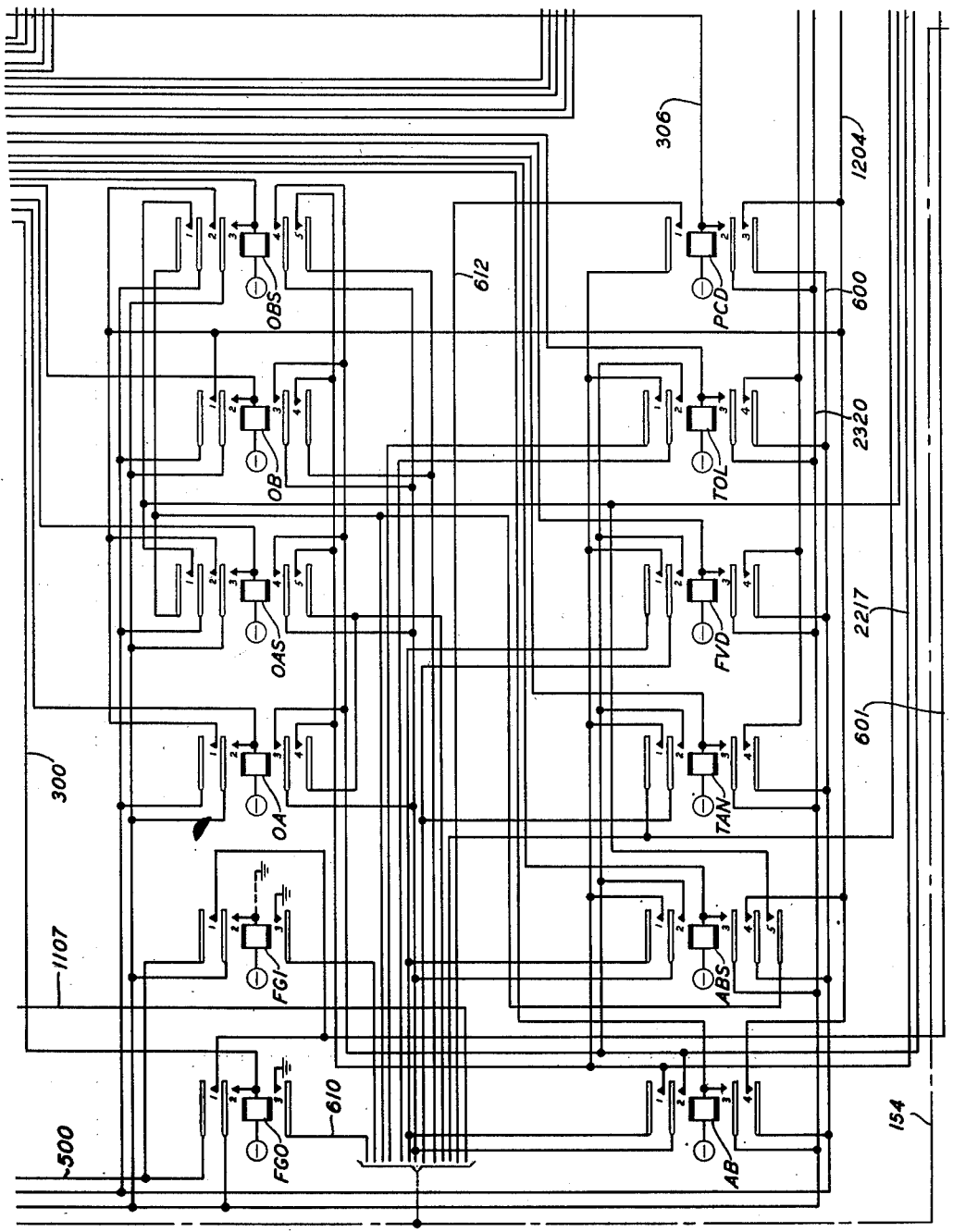
Figure 7:
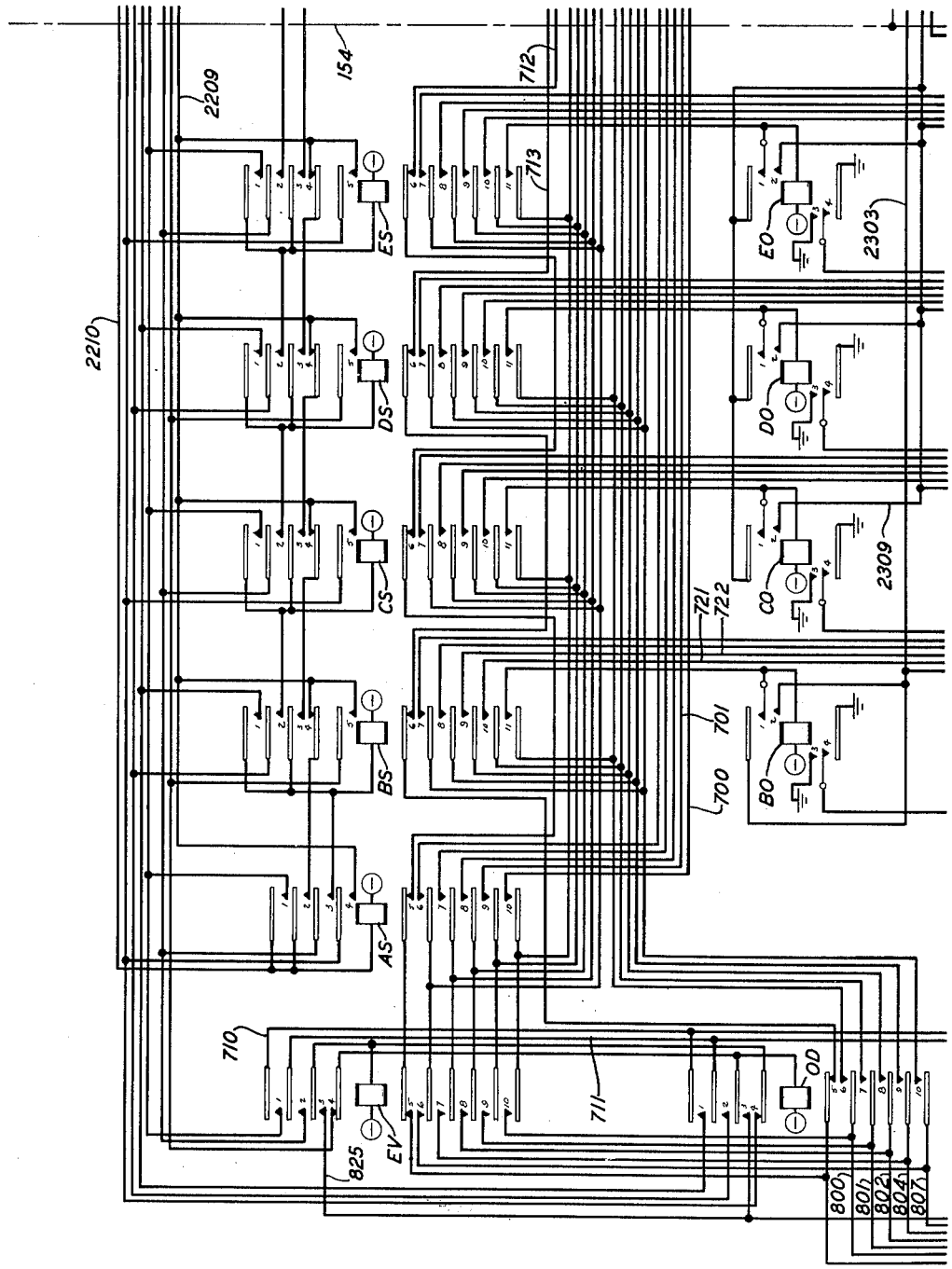
Figure 8:
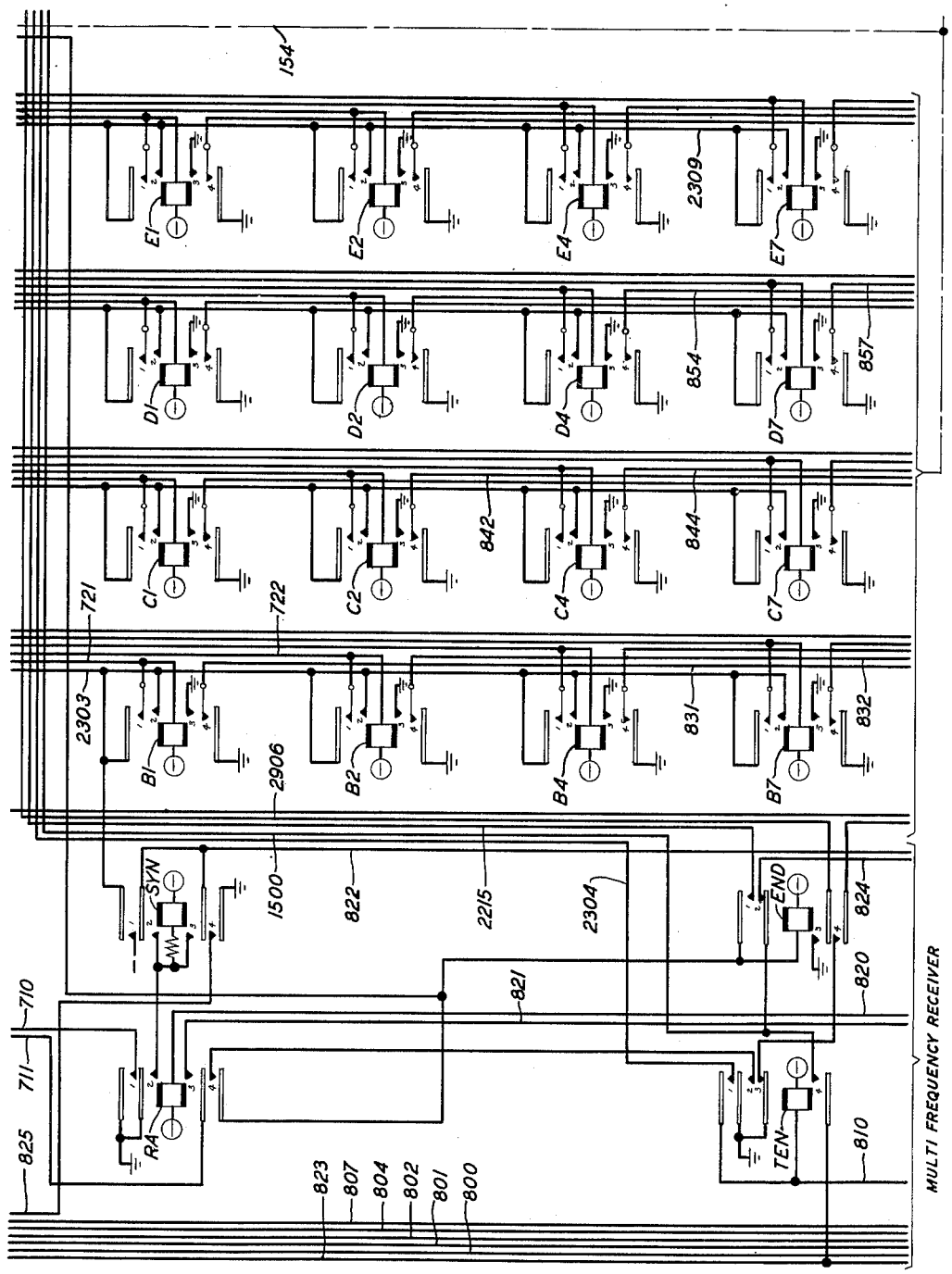
Figure 9:
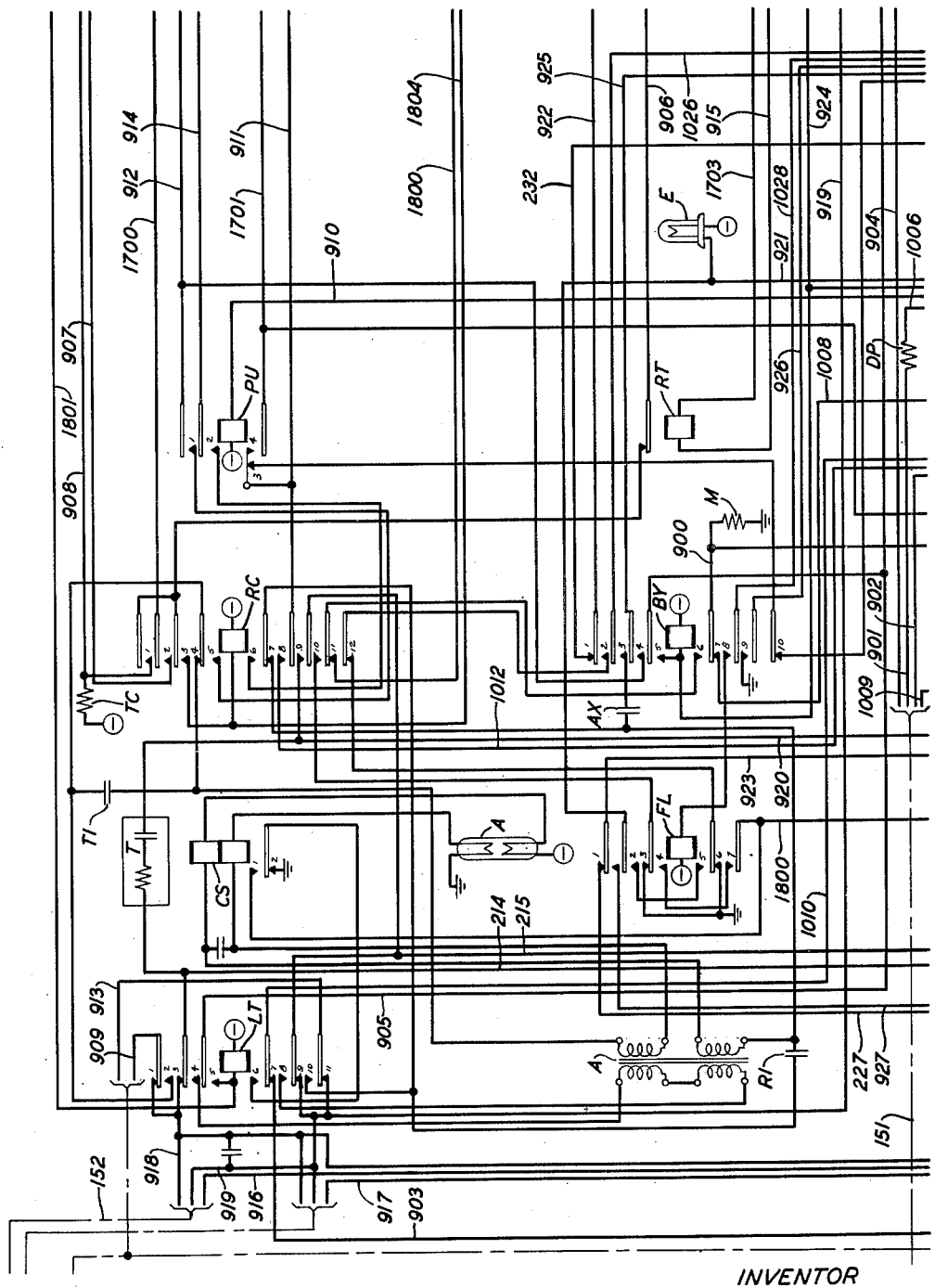
Figure 10:
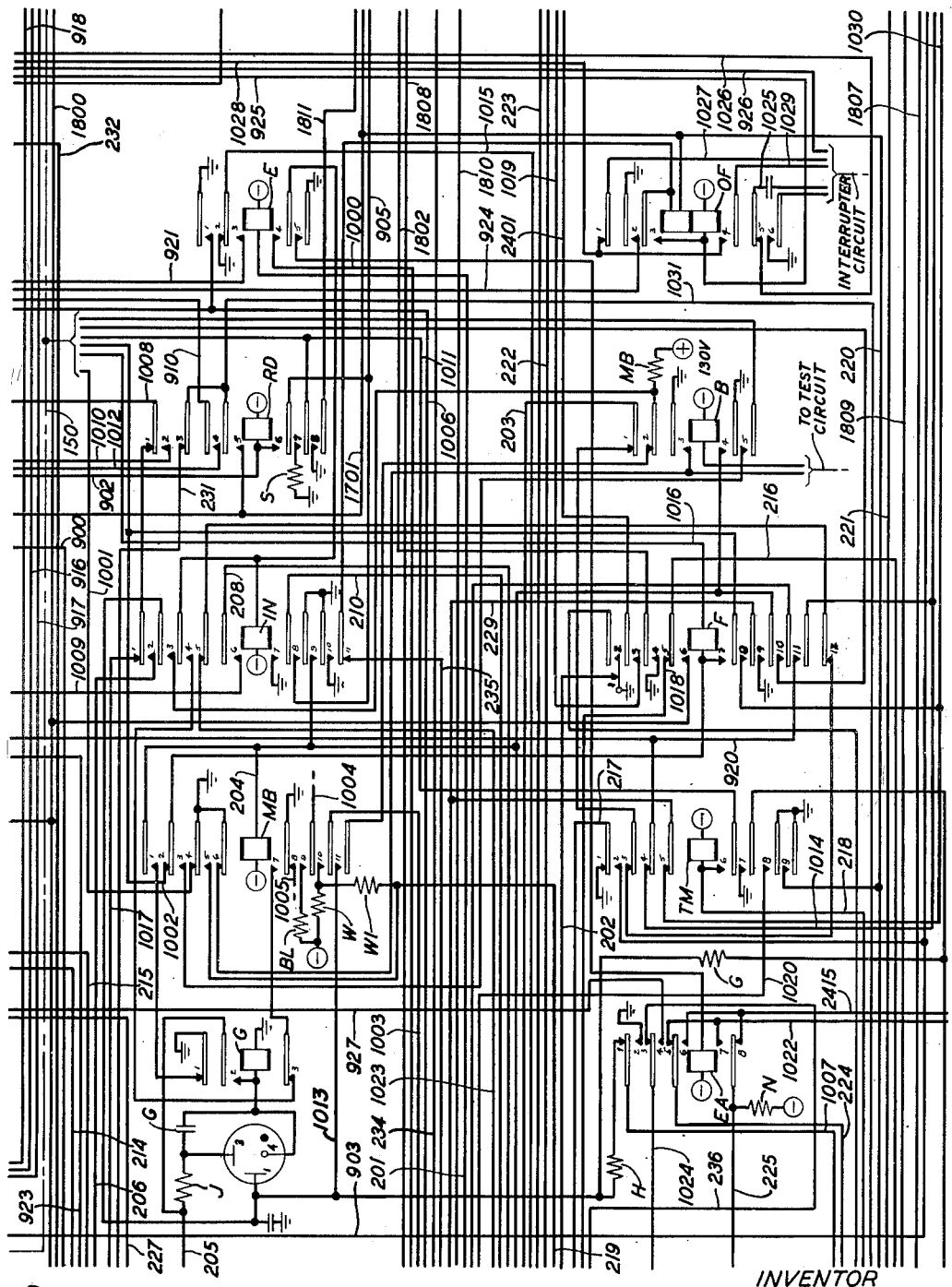
Figure 11:
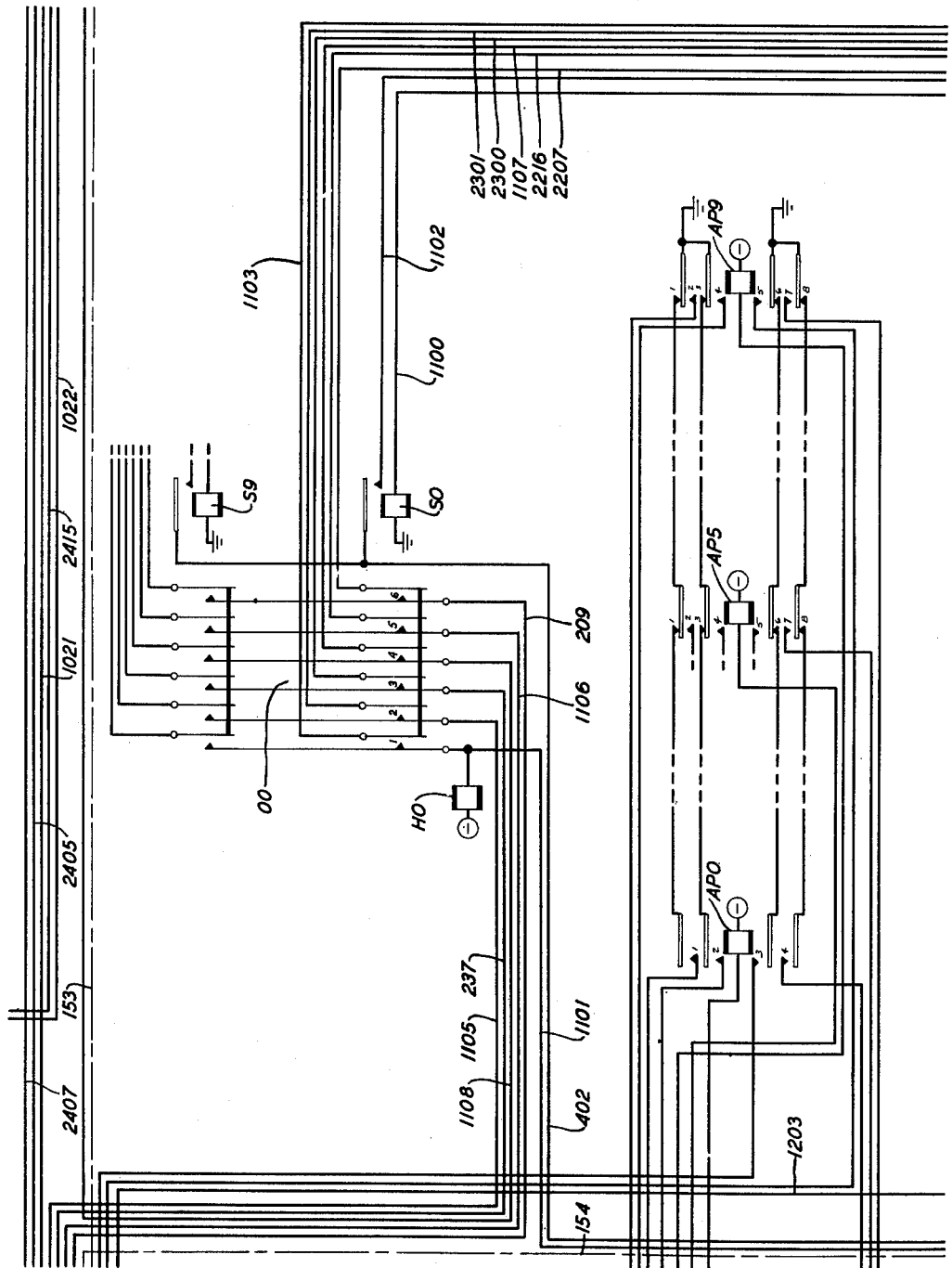
Figure 12:
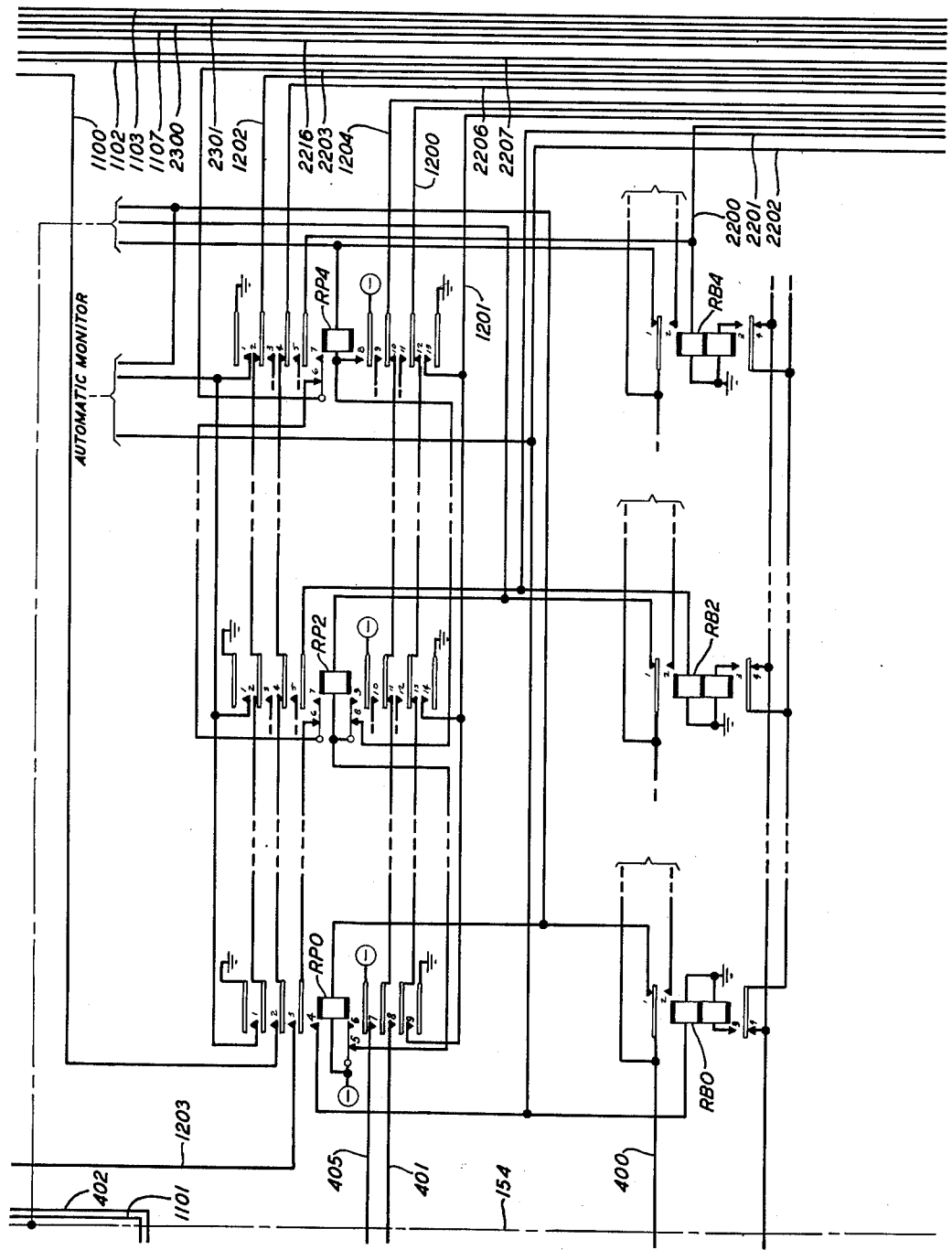
Figure 13:
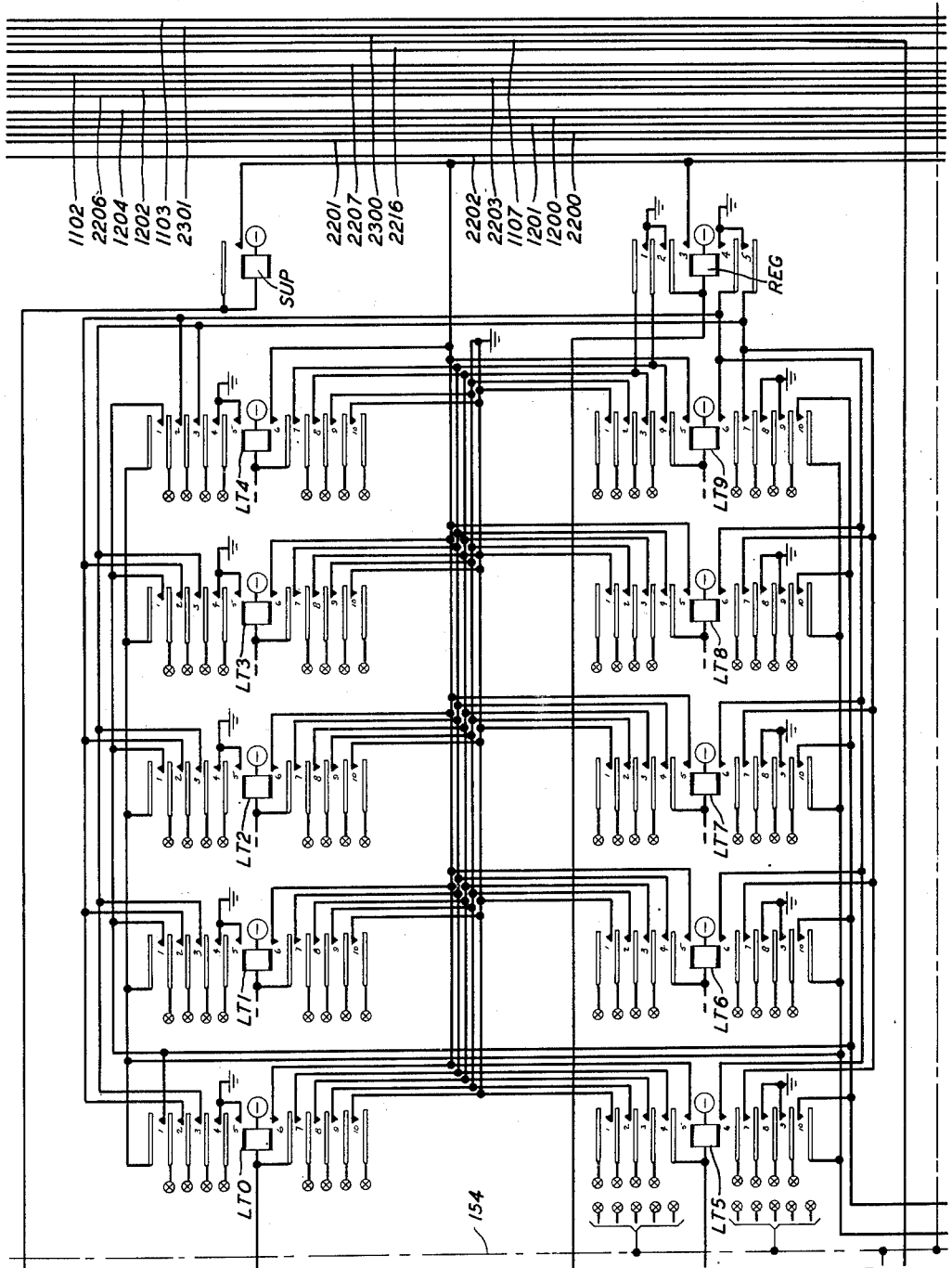
Figure 14:
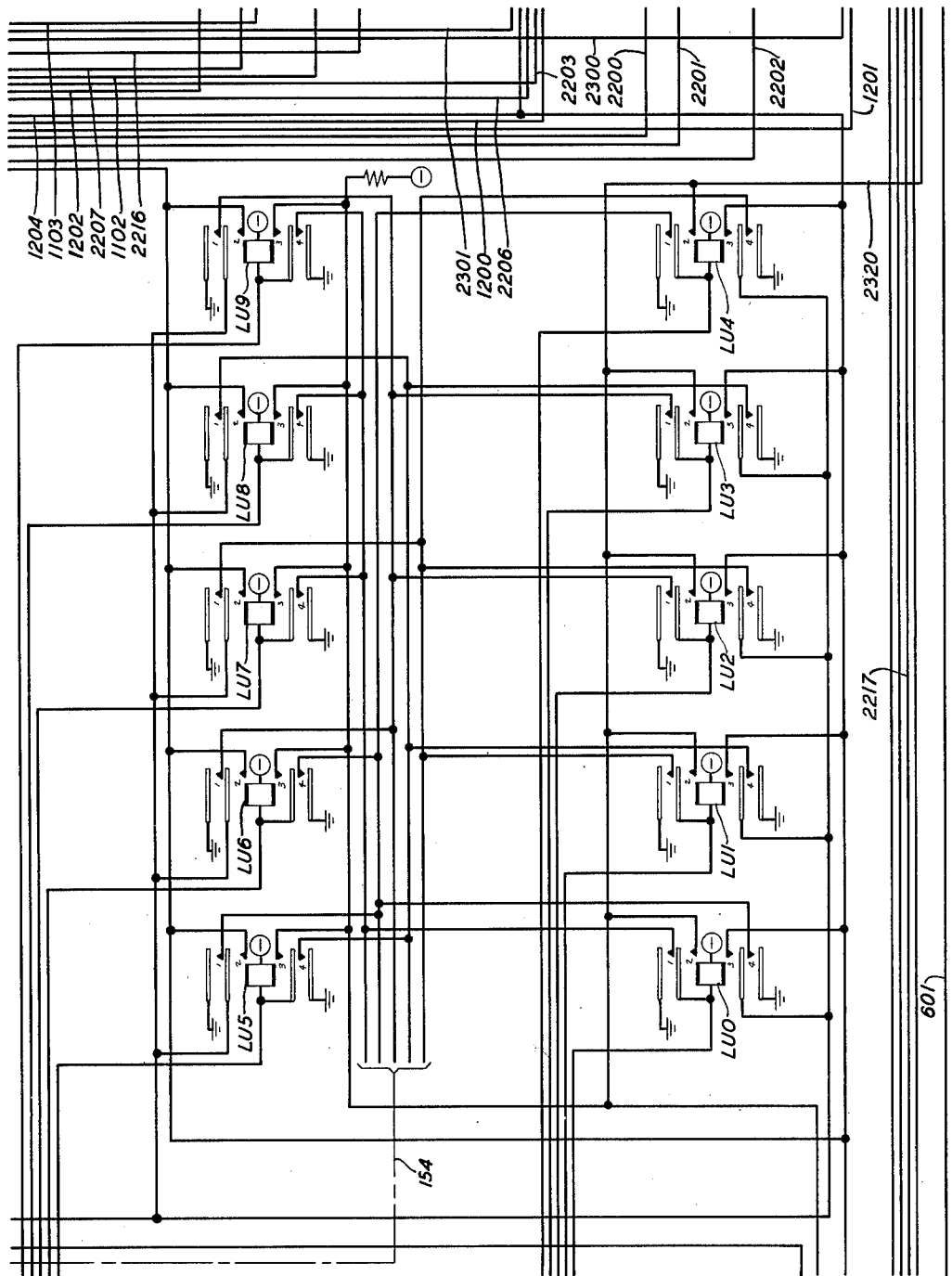
Figure 15:
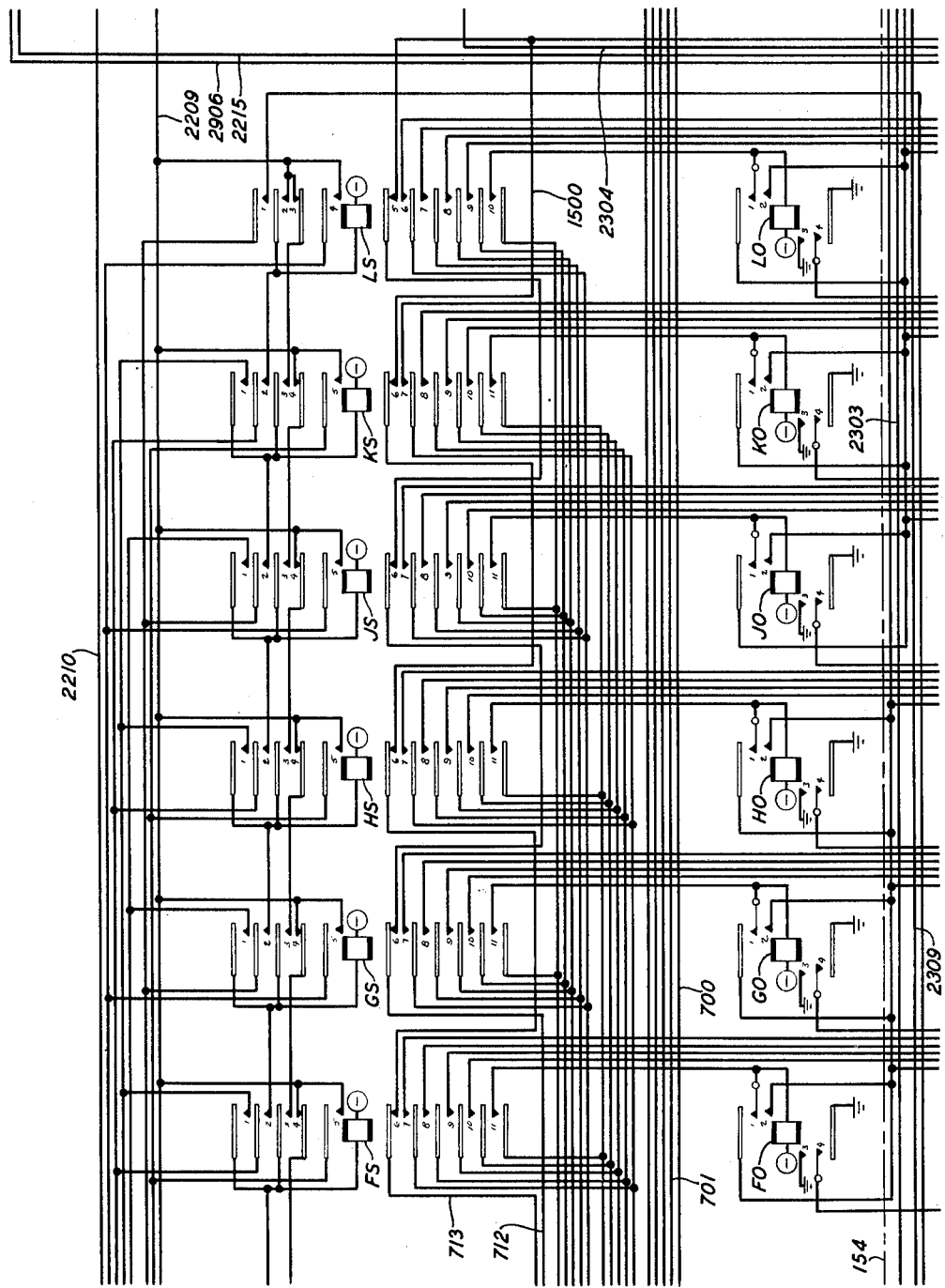
Figure 16:
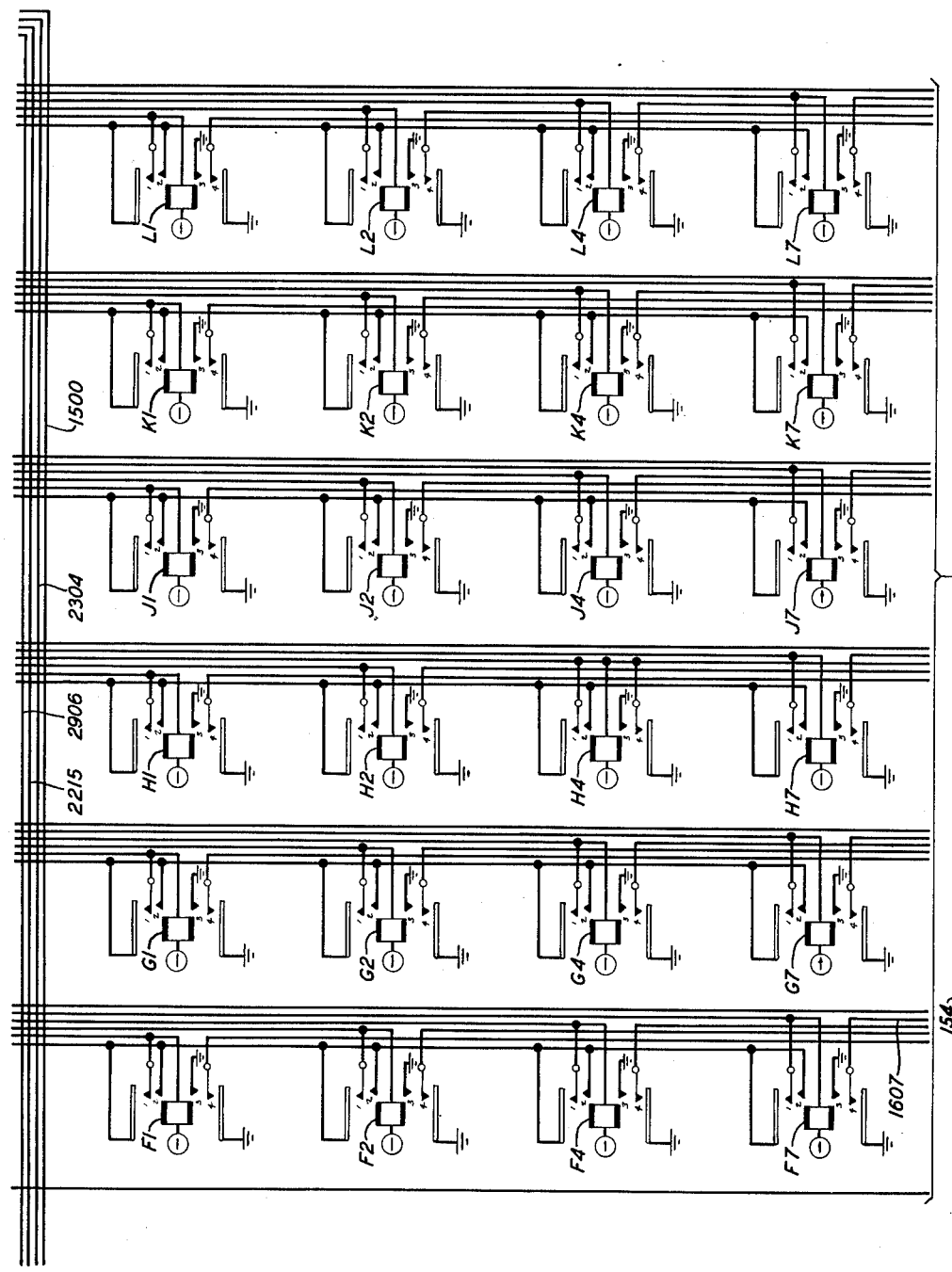
Figure 17:
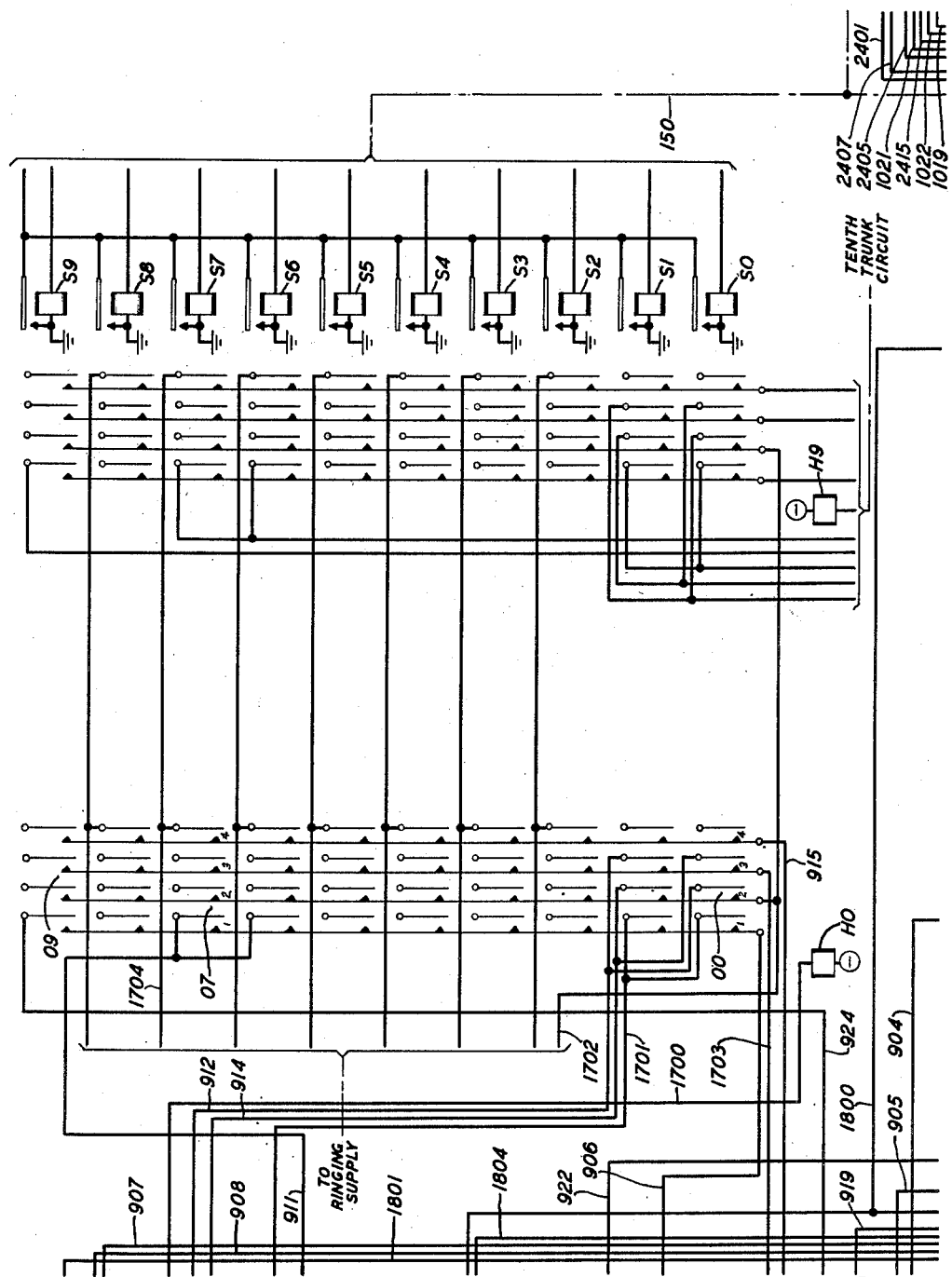
Fig. 17 shows a ringing selection switch.
Figure 18:
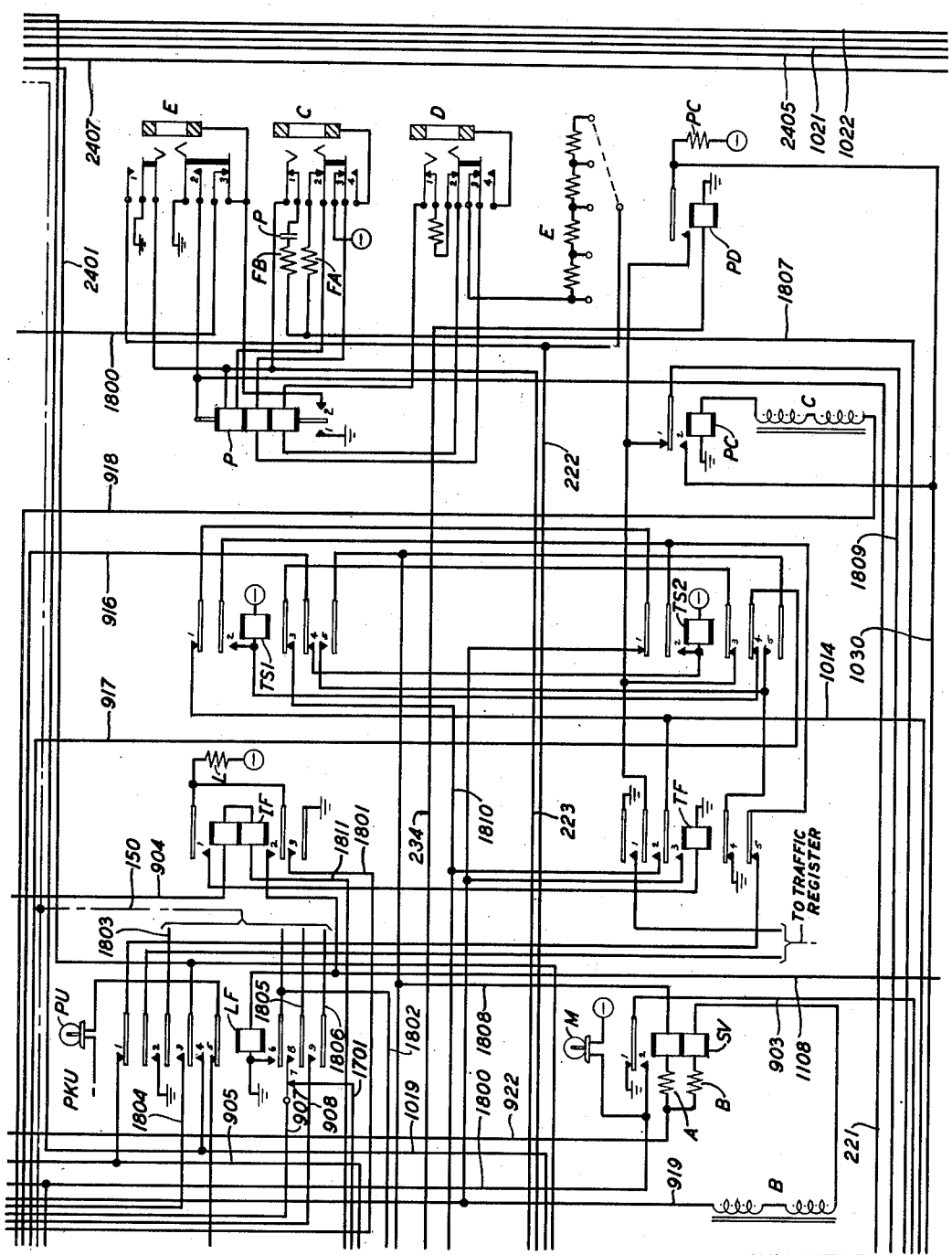
Figure 19:
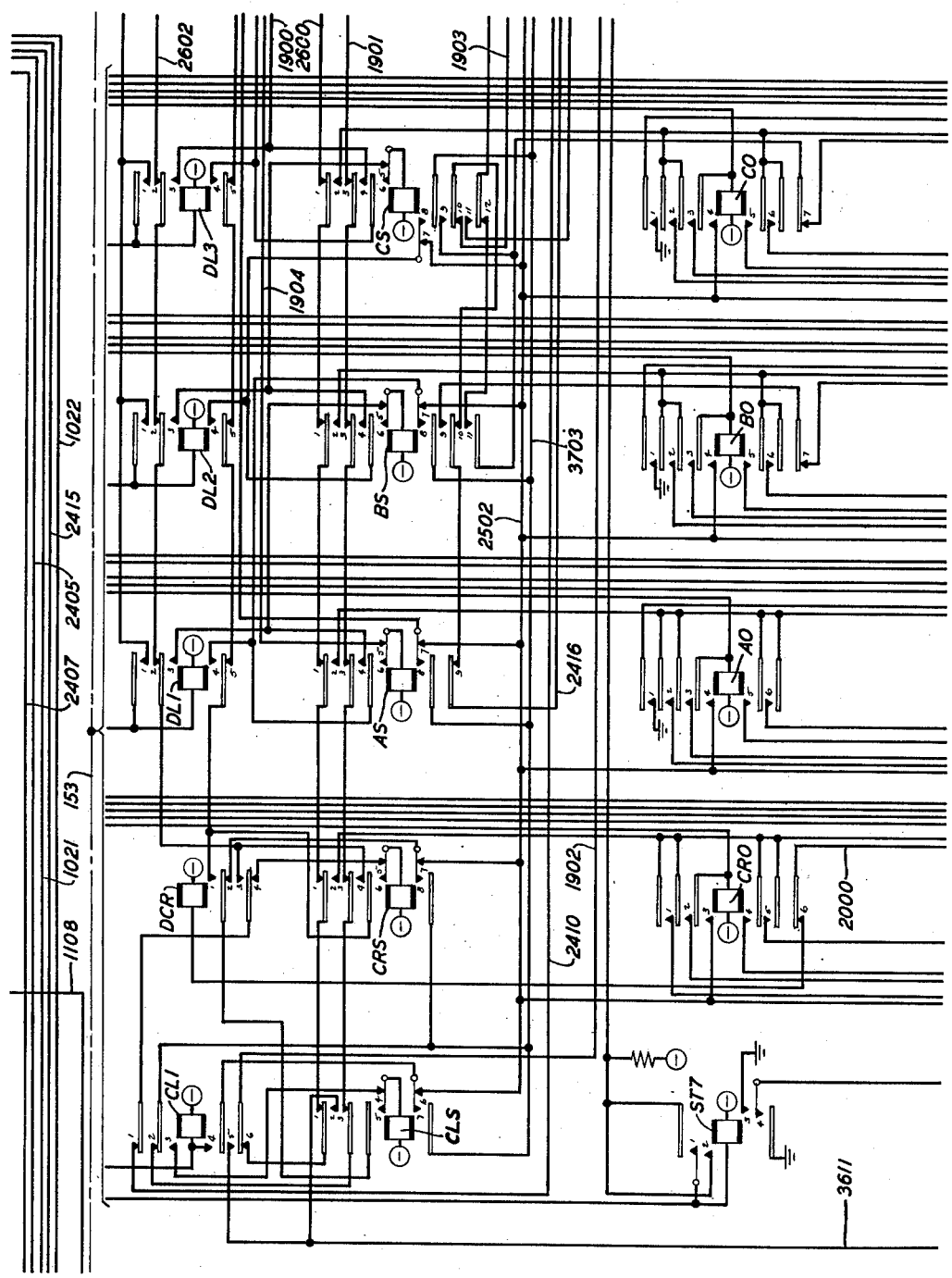
Figure 20:
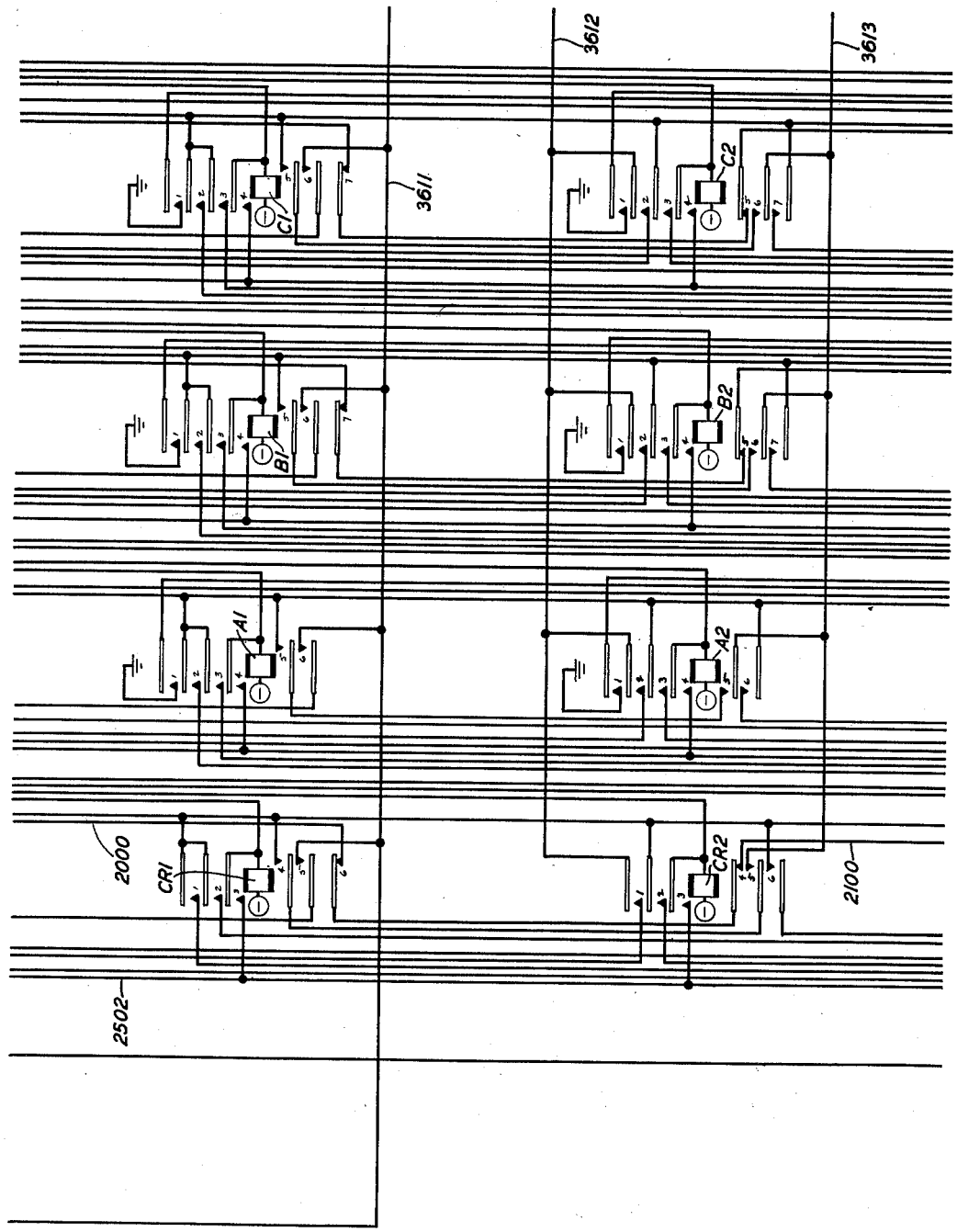
Figure 21:
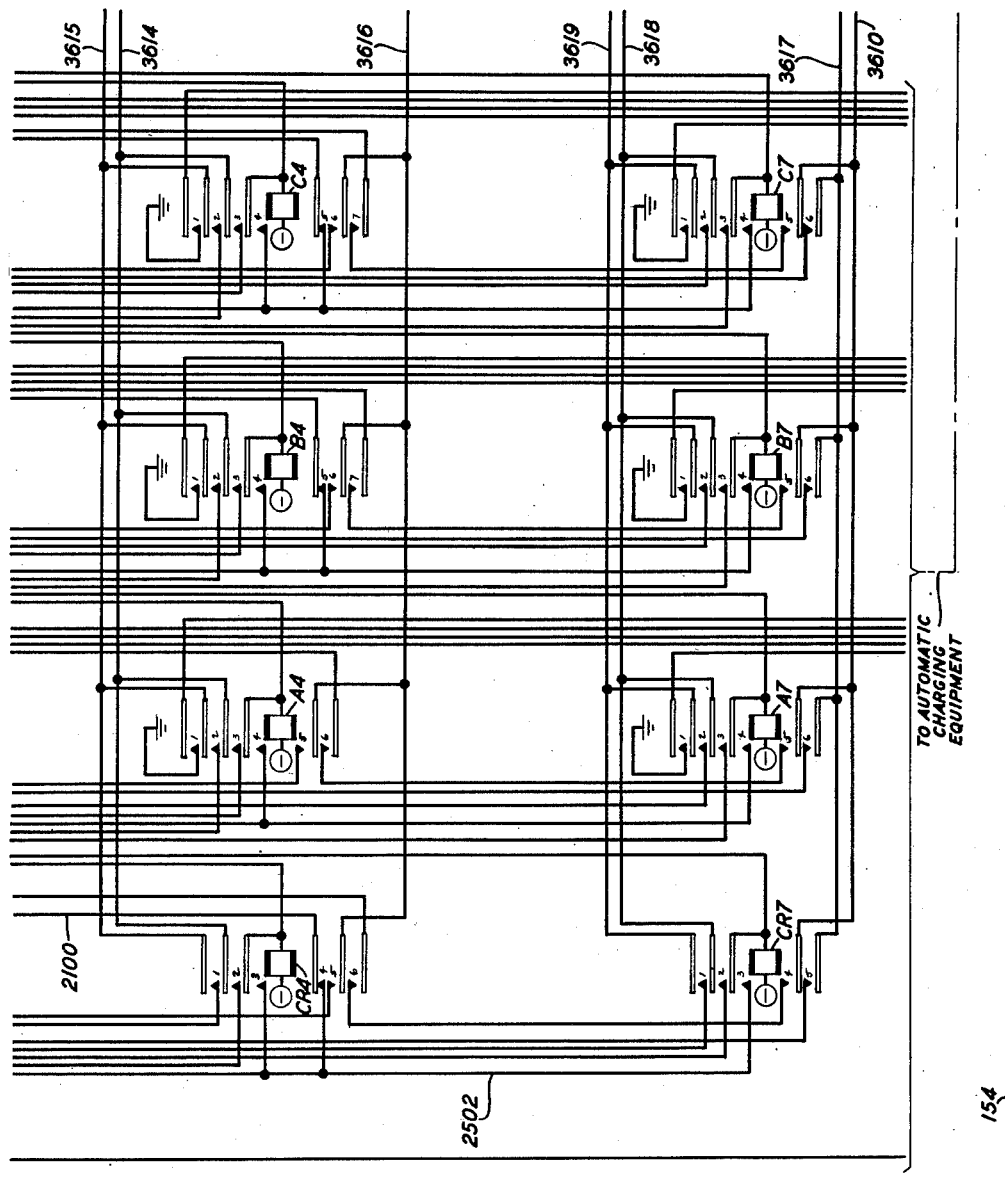
Figure 22:
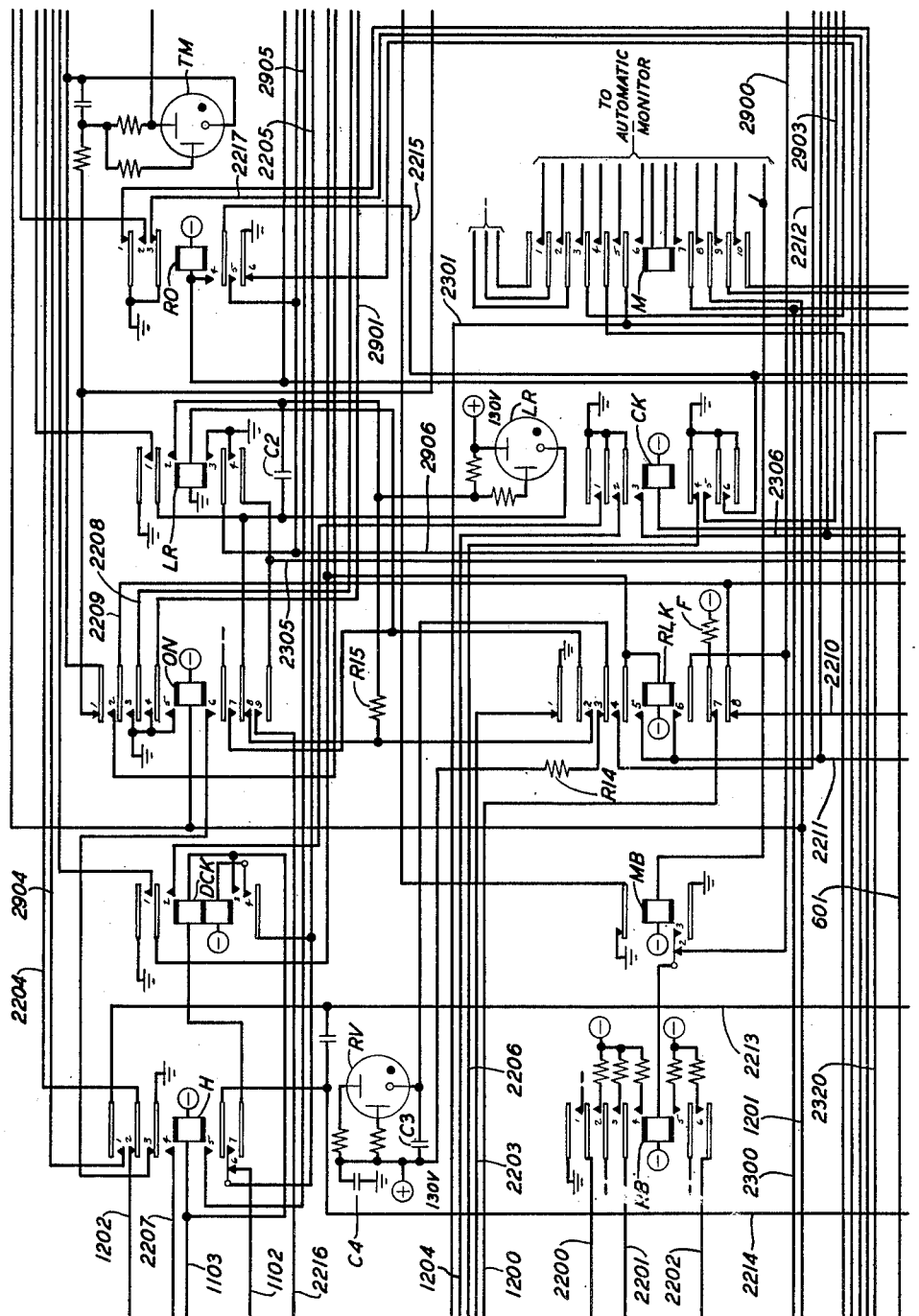
Figure 23:
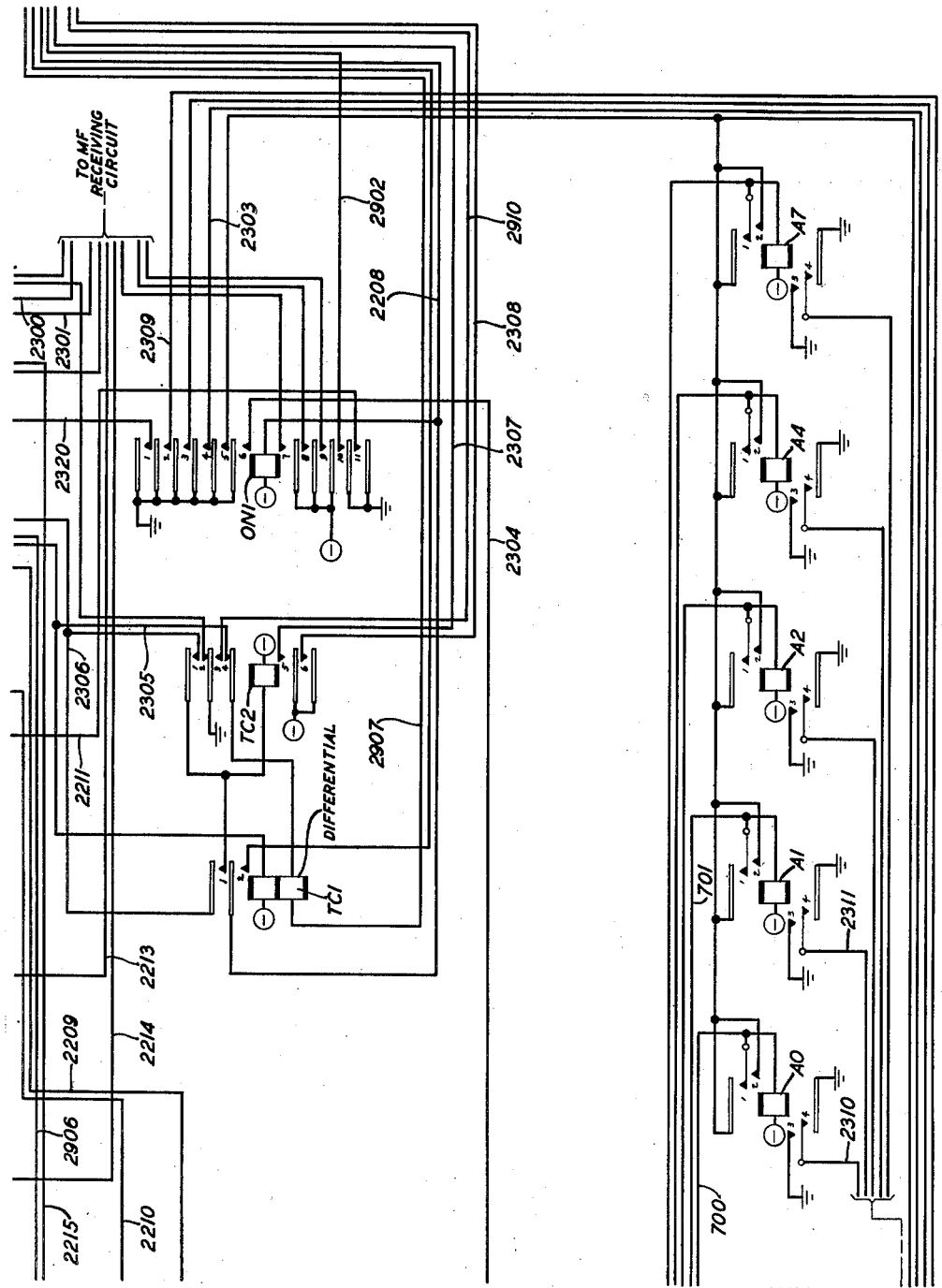

Having determined the nature of the ringing current required for signalling the wanted line, the marker operates one of the select magnets, for example magnet S7(17) of the ringing switch of Fig. 17 to select the proper ringing current and operates one of the select magnets S0(17) or S1(17) to prepare for connecting the selected ringing current to the tip or ring conductor as required. Assuming that the called line is an individual line, magnet S0(17) will be operated.

The marker then connects ground to conductor 1803, completing a circuit over contact 3 of relay LF(18), conductor 1804, to battery through the winding of relay RC(9). With relay RC(9) operated, the circuit for the hold magnet individual to this trunk in the ringing switch is extended to the marker. This circuit may be traced from battery through the winding of hold magnet H0(17), conductor 1700, contact 2 of relay RC(9), conductor 907, contact 8 of relay LF(18) to conductor 1805 leading to the marker, where it is extended to ground. The hold magnet HO(17) operates, closing cross-point 00(17) and 07(17) which were prepared by select magnets S0(17) and S7(17). With these cross-points closed, relay RC(9) locks over its contact 3, contact of relay RT(9), conductor 906, contact 1 of cross-point 00(17), conductor 1701, contact 5 of relay RD(10), conductor 1031 to ground at contact 8 of relay SG(2). This locking ground extends back to the marker to inform it that the ringing switch has operated and relay RC(9) has locked. In addition, battery through resistance TC(9) was connected over conductor 908 and contact 9 of relay LF(18) to conductor 1806 leading to the marker when relay LF(18) operated, and with relay RC(9) operated, ground from its locking circuit is connected to conductor 908 in shunt of the battery through resistance TC(9) to satisfy a condition in the marker not required by this trunk.

When the marker has completed its functions, it releases relay IF(18), in turn releasing relay LF(18) and the auxiliary relay at the trunk link frame, thereby connecting the trunk through to the trunk link switches, and completing the connection to the called line, for example line 111, through the trunk link frame and the line link frame. The switches are held operated by ground through resistance S(10) connected to conductor 1011 over contact 7 of relay RD(10). With relay LF(18) released, the circuit for the hold magnet HO(17) is transferred from conductor 1805 leading to the marker to conductor 1701 which is grounded over contact 5 of relay RD(10), holding the ringing switch cross-points closed.

With relay RC(9) operated, the closure of cross-point 07(17) corresponding to a single ring code, completes a circuit for pick-up relay PU(9) which may be traced from battery through the winding of that relay, conductor 910, contact 4 of relay RD(10), conductor 1012, contact 8 of relay RC(9), conductor 911, contact 1 of cross-point 07(17), contact 1 of cross-point 00(17), conductor 1701 to ground over contact 5 of relay RD(10). Relay PU(9) operates and locks over the circuit as above traced to conductor 911 and thence over its contact 4 directly to grounded conductor 1701.

With relays LT(9), RC(9) and PU(9) operated, the tip conductor of the called line, which is connected through the switches to conductor 909, is extended over contact 2 of relay LT(9), contact 5 of relay RC(9), contact 1 of relay PU(9), conductor 912, contact 2 of cross-point 00(17) to ringing ground over conductor 1702, while the ring conductor of the called line, which is connected through the switches to conductor 913, is extended over contact 10 of relay LT(9), contact 6 of relay RC(9), contact 2 of relay PU(9), conductor 914, contact 3 of cross-point 00(17), conductor 1703, winding of relay RT(9), conductor 915, contact 4 of cross-point 07(17) to the selected source of ringing current over conductor 1704.

Ringing current is supplied to the called line over the above-traced circuit, while audible ringing is furnished to the originating end by means of condensers T1(9) and R1(9). When the called subscriber answers, the lowered impedance across the line causes relay RT(9), which is included in the above-traced ringing circuit, to operate. Relay RT(9) opens the locking circuit for relay RC(9) which releases, in turn releasing relay PU(9) and hold magnet HO(17), thereby releasing the ringing switch.

With relay LT(9) operated and relay RC(9) released, the terminating end of the talking circuit may be traced from conductors 909 and 913, leading toward the called line, over contacts 2 and 10 of relay LT(9), contacts 4 and 7 of relay RC(9), through the right windings of repeating coil A(9) and the windings of relay CS(9) and resistance lamp A(9) to ground and battery. The incoming end of the talking circuit may be traced from conductors 212 and 213 incoming from the step-by-step office, over contacts 3 and 7 of relay TT(2), contacts 2 and 9 of relay CT(2), conductors 214 and 215, contacts 4 and 8 of relay LT(9) to the left windings of repeating coil A(9).

Relay CS(9) operates in series with the called line, disconnecting ground from the signaling circuit extending to conductor 207 at its contact 2 and at its contact 1 connecting battery supplied through resistance lamp M(18) and over conductor 1800 to the signaling circuit, as an indication that the called line has answered.

At the end of the conversation, when the called subscriber hangs up, relay CS(9) releases, again connecting ground to the signaling circuit as a disconnect signal to the step-by-step office. When disconnection takes place at that office, ground is removed from conductor 200, releasing relay E(10) and in turn relay EA(10).

The release of relay EA(10) starts a timing operation by disconnecting ground from conductor 205. Condenser G(10) is permanently connected across the control gap, electrodes 3 and 4, of gas-filled tube G(10), the winding of relay G(10) being also connected between ground and the terminal of condenser G(10) connected to electrode 4 of tube G(4). With relay IN(10) operated, +130-volt battery through resistance MB(10) is connected over contact 3 of relay IN(10) to conductor 1013 and the anode 1 of tube G(10). When relay EA(10) releases, +130-volt battery on conductor 1013 is connected through resistance H(10) over contact 1 of relay EA(10), conductor 1007, contact 5 of relay SG(2) conductor 205 and through resistance J(10) to the terminal of condenser G(10) which is connected to electrode 3 of tube G(10). Since condenser G(10) is now connected between +130 volt battery and ground connected to the winding of relay G(10) the condenser now charges and after a predetermined interval the voltage across the condenser reaches the breakdown voltage of tube G(10) causing that tube to become conducting and permitting relay G(10) to operate across the main gap, electrodes 1 and 4, of tube G(10). Relay G(10) locks over its contact 2 to +130 volt battery connected as above traced to conductor 205, at the same time closing a discharge circuit for condenser G(10) through resistance J(10). At its contact 3, relay G(10) opens the locking circuit of relay IN(10) which releases, opening the operating circuit for relay MB(10). At its contact 1 relay G(10) opens the locking circuit of relay MB(10). Relay IN(10) on releasing, also releases relays RD(10), LT(9) and CO(2), relay CO(2) in turn opening a holding circuit for relay MB(10) so that relay MB(10) may now release, to restore the idle condition to the trunk.

*Through call*

Assuming, on the other hand, that the wanted line is located at an office to be reached through the cross bar office, the marker will recognize this fact from the registered designation and will connect positive battery to conductor 904, energizing relay IF(18) in a direction to close its contact 1, thereby completing a circuit from battery through resistance L(18), contact 1 of relay IF(18) to ground through the winding of relay TF(18). Under this condition, relay LT(9) is not operated, nor is the auxiliary relay operated at the trunk link frame.

The marker proceeds to select one of the two line link frame appearances 113 and 114 of the trunk and connects ground to the sleeve conductor of the selected appearance, for example, conductor 916, of appearance 113, completing a circuit over contact 4 of relay TS1(18) to battery through the winding of relay TS2(18).

The marker then tests for an idle trunk leading to the office of the wanted line, for example, trunk 112, and tests for and operates the line link and trunk link switches of an idle channel by which to connect the incoming trunk with the outgoing trunk. If no such channel is available, the marker releases the first line link appearance 113, disconnecting ground from conductor 916 and releasing relay TS2(18). The marker then seizes the second line link appearance 114, grounding conductor 917 and completing a circuit over contact 4 of relay TS2(18) to battery through the winding of relay TS1(18), after which it connects the appearance 114 to an idle trunk outgoing to the desired office.

When this connection has been completed, relay IF(18) is released, in turn releasing relay TF(18). With relay TF(18) released, a locking circuit is closed for relay TS2(18), assuming that the first connection was successfully completed, which extends from battery through the winding of relay TS2(18) and over its contact 2, contact 5 of relay TF(18), contact 1 of relay LF(18), conductor 905 to ground at contact 8 of relay IN(10). This locking ground extends back to conductor 916 to hold operated the line link and trunk link switches.

The talking circuit may be traced through the trunk circuit from conductors 212 and 213 incoming from the step-by-step office, over contacts 3 and 7 of relay TT(2), contacts 2 and 9 of relay CT(2), conductors 214 and 215, contacts 3 and 9 of relay LT(9) to conductors 918 and 919 leading through cable 152 to the line link appearance 113 of the trunk, whence they extend through the line link switches and trunk link switches to the outgoing trunk 112.

Normally, the repeater termination network T(9) is connected to conductor 214 and over conductor 920, contact 4 of relay TM(10), conductor 1014, contact 1 of relay TS1(18), contact 1 of relay TS2(18) to conductor 919. With either relay TS1(18) or TS2(18) operated, this termination is opened, but relay TF(18) at its contact 3 closes a parallel path to hold the termination closed until it is released by the marker when the connection is established. Similarly, a pad control circuit, to be described hereinafter, normally closed over back contacts of relays TS1(18) and TS2(18) is opened when either of these relays operate, but is held closed at contact 2 of relay TF(18) until the latter relay releases.

Supervision is obtained by means of double wound balanced relay SV(18). With relays E(10) and TS2(18) operated, the upper winding of relay SV(18) is included in a circuit from battery through resistance lamp E(9), conductor 921, contact 3 of relay E(10), conductor 1015, contact 3 of relay D(2), conductor 232, contact 1 of relay BY(9), conductor 922, resistance A(18) upper winding of relay SV(18), contact 5 of relay TS2(18) to ground at contact 4 of relay TF(18). The lower winding of relay SV(18) is connected in a circuit from battery as above traced to conductor 922, resistance B(18), lower winding of relay SV(18), winding of retard coil B(18), to the ring conductor 919 of the selected line link appearance whence it extends through the line link and trunk line switches to the outgoing trunk. Ground applied to conductor 919 when the called subscriber answers, operates relay SV(18) connecting battery through resistance lamp M(18) over contact 2 of relay SV(18) to conductor 903 and thence as previously traced to conductor 207 to signal the originating office.

If the called end disconnects first, relay SV(18) releases, disconnecting battery through resistance lamp M(18) from conductor 207 and connecting ground thereto as a disconnect signal.

When the calling end disconnects, relay E(10) releases, in turn releasing relay EA(10). As previously described, the release of relay EA(10) causes tube G(10) to break down after an interval, operating relay G(10). The operation of relay G(10) releases relay IN(10) which in turn releases relay TS2(18), RD(10), and CO(2). With relay IN(10) released and relay G(10) operated, relay MB(10) releases, in turn releasing relay G(10) and restoring the trunk to normal.

If relay E(10) releases, prior to release at the called end, it disconnects battery through resistance lamp E(9) from the windings of relay SV(18) and connects ground thereto as a disconnect signal to the called office.

Outgoing call through switches

As above mentioned, the trunk shown may be used to extend calls to the step-by-step office. When it is to be used in connection with a call originated at a distant office and to be completed through the switches and over the trunk shown, the marker will first look for the ground connected over contact 4 of relay MB(10) to conductor 1001 when the trunk is idle, to identify trunk link frame 9 as having an idle trunk outgoing in the desired direction.

Having selected the trunk link frame 9 and operated the associated trunk link connector 110, the marker connects ground to conductor 102, then tests conductor 1016 for the applied ground which extends from conductor 1002, over contact 2 of relay MB(10) and through the winding of relay F(10) to conductor 1016 if the trunk is idle. If this trunk is preferred, battery is then connected to conductor 1016 causing relay F(10) to operate and lock directly to conductor 1002, independent of relay MB(10).

Relay F(10) at its contact 4 connects ground to conductor 1002 to operate the auxiliary relay at the trunk link connector 110 to give the marker access to the trunk and to the switches by which the connection may be established.

In addition, relay F(10) at its contact 9 closes a circuit for operating relay MB(10) to mark the trunk busy. At its contact 1 relay F(10) opens the circuit of relay IN(10) and at its contact 12 opens the circuit of relay SL(2), which will be traced hereinafter, to prevent the seizure of the trunk for an incoming call or by an operator. Relay F(10) also connects ground over its contact 2 to conductor 205 to hold condenser G(10)

discharged. At its contact 11, relay F(10) closes a path for holding the network T(9) across the line and at contact 8 closes the pad control path.

Relay F(10) also transmits a seizure signal to the step-by-step office. With the trunk idle, signal conductor 207 is connected to ground over contact 9 of relay TT(2), conductor 900, contact 7 of relay BY(9), conductor 1008, contact 1 of relay RD(10), contact 1 of relay IN(10), conductor 1017, contact 9 of relay SL1(2), conductor 216, contact 5 of relay F(10), conductor 1018, contact 10 of relay D(2), conductor 217 and contact 1 of relay TM(10). When relay F(10) operates it opens this circuit at its contact 5, disconnecting ground from conductor 207, and at its contact 6 extends that conductor over conductor 1800 to battery through resistance lamp M(18) as a seizure signal.

In the meantime the marker has selected an outgoing sender arranged to transmit dial type pulses and has operated the outgoing sender connector 115 which connects the sender with the marker over a plurality of conductors indicated by cable 153.

The marker recognizes an idle outgoing sender by the presence of ground on conductor 3200 which is connected thereto over contacts 1 of relays MB(32) and SB(32).

It sets up in the sender a class of call indication by operating one of the class relays CL1(19), CL2(24), CL3(24), CL4(30), CL5(37) and CL6(30). It transfers the designation of the wanted line as received by an incoming register to the register relays of Figs. 19, 20, 21, 26, 27, 28, 33, 34 and 35, operating two of the five relays constituting each digit register employed. For example, to record the digit 6 in the A register, relays A2(20) and A4(21) are operated. The sender is equipped to register and send out a maximum of eleven digits, which would be made up of three toll directing digits, three local code digits, four numerical digits and one stations digit. In addition, for certain routes it may be required to send an arbitrary directing code digit, which is registered on relays CR0(19) to CR7(21). Designations having less than the maximum number of digits will be set up on the sender registers starting with the A register and using as many of the succeeding registers as there are digits. Where more digits are recorded than are to be sent out, for example, where the marker uses the recorded code for selecting the trunk but only the numerical digits are to be transmitted, one of the delete relays DL1(19) to DL6(26) is operated.

Assuming that the step-by-step office has the designation ADams 4, and that the wanted number located at that office is 1360, relays A0(19), A2(20), B1(20), B2(20), C0(19), C4(21), D0(26), D1(27), E1(27), E2(27), F2(27), F4(28), G4(28), G7(28) and DL3(19) will be operated. Since the trunk circuit shown is a two-way trunk, class relay CL2(24) will be operated.

When the marker seizes the sender, it connects ground to conductor 2400, operating relay ON1(25), which at its contact 7 connects ground to conductor 2500, operating relay SB(32) to mark the sender busy. Relay ON1(25) supplies locking ground for the class and register relays to render them independent of the marker. In addition, the marker operates the select magnet S0(24) individual to the selected sender in the sender link. Magnet S0(24) closes a circuit from battery through hold magnet H0(24), which is individual to the trunk shown, conductor 2401, contact 3 of relay F(10) in the trunk circuit, conductor 1019, contact of magnet S0(24) to conductor 2402 leading through cable 150 and the trunk link connector to ground in the marker, operating the hold magnet to close cross-point 00(24), connecting the sender with the trunk. With the cross-point closed, the operating ground for magnet H0(24) is extended over contact 1 of cross-point 00(24), and conductor 2403 to battery through the winding of relay ON(25) in the sender.

Relay ON(25) provides other locking grounds and a holding circuit for relay ON1(25) and closes a circuit from ground over its contact 3, conductor 2501, contact 5 of relay EP(24), conductor 2404, contact 6 of relay R0(31) to battery through the winding of relay CT(31). A parallel circuit extends from conductor 2404 over contact 3 of cross-point 00(24), conductor 2405 to battery through the winding of relay D(2) in the trunk circuit. Relay D(2) connects ground to conductor 204 to hold relay MB(10) operated.

Having operated the sender link, the marker grounds conductor 2406, completing a circuit over contact 2 of cross-point 00(24), conductor 2407, contact 13 of relay SL1(2), conductor 218 to battery through the winding of relay TM(10). Relay TM(10) operates in this circuit and locks over its contact 6 to conductor 1011 which is now grounded at the trunk link connector and is later grounded by the incoming trunk. At its contact 8, relay TM(10) connects ground to conductor 1020, completing a circuit to battery through the winding of relay SG(2). Relay SG(2) operates in this circuit and locks over its contact 2 and conductor 219 to ground at contact 5 of relay MB(10). Relay TM(10) at its contact 4 opens one path for holding network T(9) across the trunk and at contact 5 opens one path in the pad control circuit but parallel paths are closed at this time over contacts 11 and 8 of relay F(10) respectively. In addition, with relays TM(10) and SG(2) operated, ground is connected to conductor 205, to hold condenser G(10) discharged, over contact 4 of relay SG(2) and contact 7 of relay TM(10).

With relays TM(10) and SG(2) operated, ground is connected over contact 7 of relay SG(2) or contact 9 of relay TM(10) to conductor 220 which extends through the upper winding of relay OF(10), contact 11 of relay IN(10), conductor 235, contact 5 of relay D(2), conductor 1021, contact 4 of cross-point 00(24), conductor 2408, contact 2 of relay R0(31), contact 6 of relay CT(31) to battery through the winding of relay LR(31). Relay LR(31) operates and closes a locking circuit for relay ON(25) which may be traced from battery through the winding of relay ON(25), conductor 2403, contact 1 of relay LR(31), conductor 3100 to ground at contact 2 of relay ON(25).

When the marker has checked that the information has been properly transferred to the sender and has operated the switches to complete the connection between the incoming trunk and the trunk shown, it connects ground to conductor 2409, operating relay AV(24). Relay AV(24) locks over its contact 2 and conductor 2400 to ground at contact 1 of relay ON(25).

When relay ON(25) operates, since no registration had been set up on the auxiliary digit relays CR0(19) to CR7(21), a circuit was closed from ground at contact 10 of relay ON1(25), conductor 2502, contact 4 of relay CR4(21), conductor 2100, contact 4 of relay CR2(20), contact 6 of relay CR1(20), conductor 2000, contact 6 of relay CR0(19) to battery through the winding of relay DCR(19). When relay AV(24) operates, it closes a circuit from ground on conductor 2502, contact 2 of relay TT1(25), conductor 2503, contact 3 of relay AV(20), conductor 2410, contact 1 of relay CL1(19), contact 3 of relay DCR(19), contact 2 of relay DL1(19), contact 2 of relay DL2(19), contact 3 of relay DL3(19), conductor 1999, contact 5 and winding of relay DS(26) to battery. Relay DS(26) operates in this circuit and locks over its contact 6 and contact 7 of relay ES(26) to ground on conductor 2502, preparing for the transmission of the first digit.

After operating relay AV(24) in the sender, the marker releases relay F(10) in the trunk which in turn releases the auxiliary relay in the trunk link connector and connects the incoming trunk through to the outgoing trunk.

When relay ON(25) operates, indicating that the trunk and sender have been connected together, the sender starts a timing operation to measure a predetermined interval before making trunk test in order to allow time for the trunk seizure signal to be received at the distant office and responded to.

This timing circuit employs the same pulse generator relays as are used for transmitting the designation, which includes the timing relay PG(30), the pulsing relay P(30) and the checking relay CKP(30). Relay PG(30) is a non-biased polarized relay and the windings of relays P(30) and CKP(30) are connected in series with its lower winding.

Relay ON(25) in operating connects ground over its contact 4 to conductor 2504, completing a circuit over contacts 2 and 1 of relay CL4A(30), contact 1 of relay CL5A(30), resistances A(30) and B(30), contact 4 of relay CL5A(30), resistance BA(30) to battery. Reduced battery potential obtained from the point between resistances B(30) and BA(30) is connected over contact 4 of relay SL4A(30) through the windings of relay P(30) and relay CKP(30), lower winding of relay PG(30), conductor 3000, contact 9 of relay TT1(25), contact 1 of relay TT2(25), conductor 2505, contact 2 of relay W(37), contact 2 of relay SP1(37) to ground over conductor 2504. Battery through resistance BE(30) is also connected to conductor 3000 but is shunted by the ground connected to conductor 3000 as above traced. A circuit also extends from conductor 3000 through upper winding of relay PG(30), and condenser PG(30) to conductor 2504, condenser PG(30) being discharged with ground connected to both conductors. The upper winding of relay PG(30) is also connected through condenser PG1(30), resistance P(30) and over contact 2 of relay CL4A(30) to ground on conductor 2504. Relays PG(30), P(30) and CKP(30) operate in this circuit, being so energized that relay PG(30) closes its contact 2, relay P(30) closes its contact 1 and relay CKP(30) closes its contact 1.

Relay ON(25) also closes a circuit from ground at its contact 6 over contact 1 of relay TT1(25) to battery through the winding of relay TT2(25), operating the latter relay. As soon as relay TT2(25) operates, it disconnects ground from conductor 3000 and the direction of current flow in the lower winding of relay PG(30) and the windings of relays P(30) and CKP(30) is reversed, relays P(30) and CKP(30) closing their contacts 2. However, condensers PG(30) and PG1(30) now charge through the upper winding of relay PG(30), this charging current opposing the current flowing through the lower winding and holding contact 2 closed for a time. When the charging current dies down, relay PG(30) closes its contact 1. Ground from conductor 2504 is now connected over contact 1 of relay PG(30) to conductor 3000 in shunt of battery through resistance BE(30) and relay PG(30) tends to open its contact 1, but condensers PG(30) and PG1(30) are now discharging and the discharge current delays the opening of contact 1. When contact 1 opens, the previously traced circuits become effective and relays PG(30), P(30) and CKP(30) alternately close their contacts 1 and 2 as long as the steady ground is removed from conductor 3000.

Figure 36:
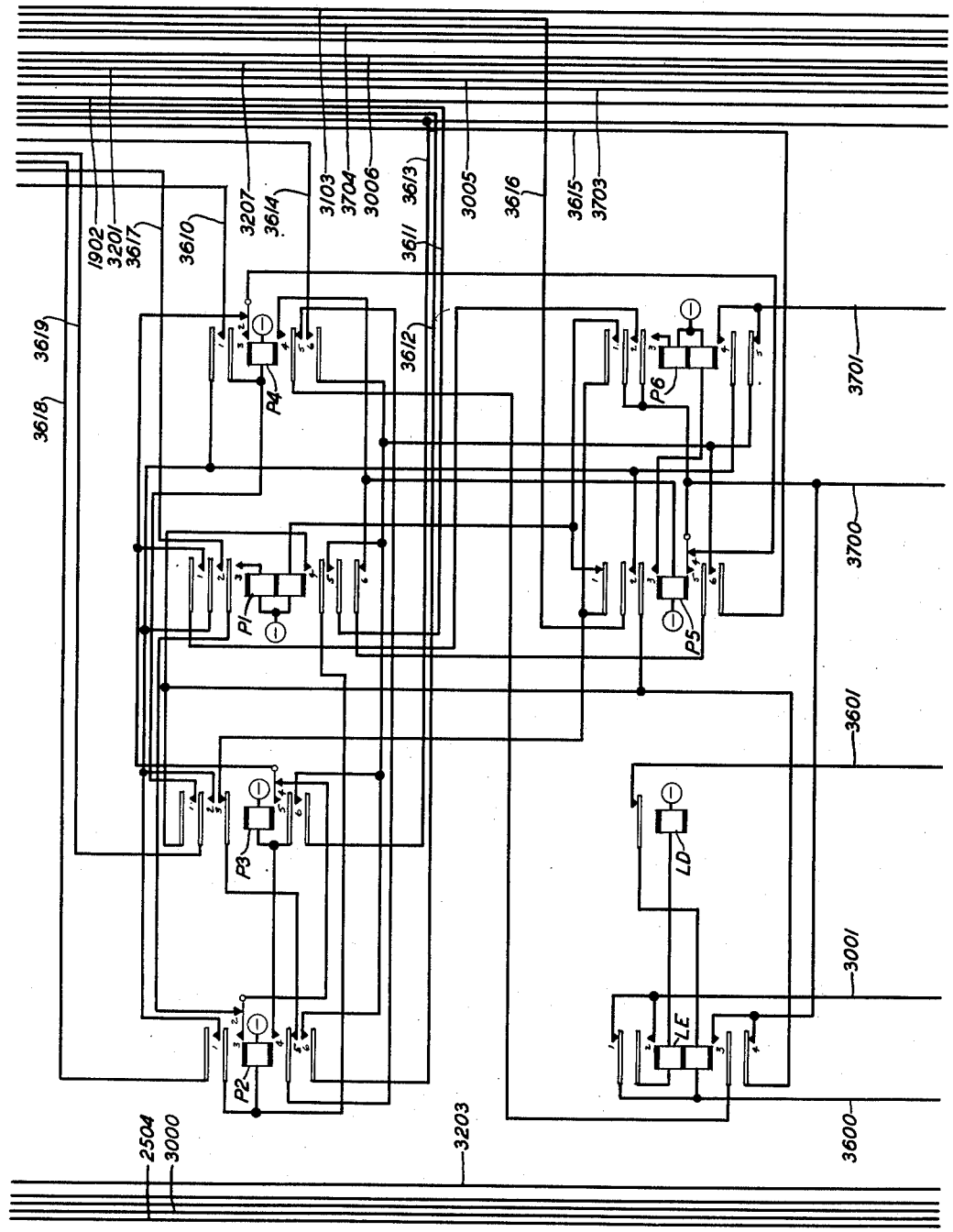
Figure 37:
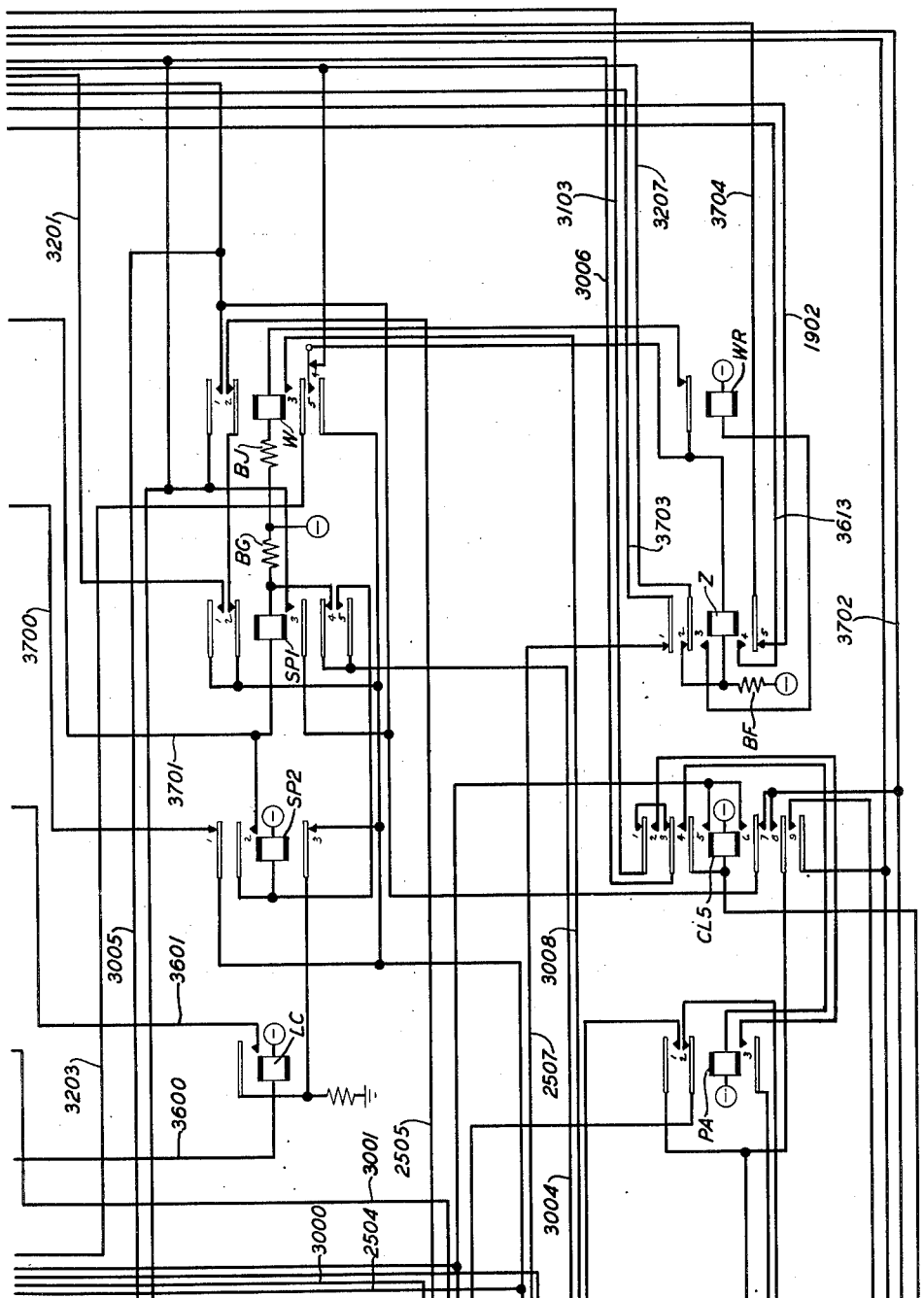

Relay P(30) is ineffective at this time, its contact being shunted by contact 5 of relay TTK1(32), but relay CKP(30) controls the pulse counting relays of Fig. 36. Each time that relay CKP(30) closes its contact 1 it closes a circuit from ground on conductor 2504, contact 1 of relay CKP(30), to conductor 3001. The first connection of ground to conductor 3001 completes a circuit over contact 1 of relay LE(36), conductor 3000 to battery through the winding of relay LC(37). Relay LC(37) operates, closing a locking circuit for itself which extends from conductor 3600, through the lower winding of relay LE(36), contact of relay LD(36), conductor 3601, contact of relay LC(37), contact 3 of relay SP2(37), to ground on conductor 2504. Relay LE(36) does not operate, being shunted by the operating circuit of relay LC(37) until relay CKP(30) opens its contact 1.

The second closure of ground to conductor 3001 completes a circuit over contact 2 and through the upper winding of relay LE(36) to battery through the winding of relay LD(36). Relay LD(36) operates and opens the circuit of relay LC(37) but relay LE(36) is held operated. When relay CKP(30) removes ground from conductor 3001, relays LE(36) and LD(36) release. Thus, relay LE(36) is operated at the end of each odd pulse from relay CKP(30) and released at the end of each even pulse from relay CKP(30).

With relay SP2(37) unoperated, ground from conductor 2504 is extended over contact 1 of relay SP2(37) to conductor 3700. When relay LE(36) operates for the first time it connects ground on conductor 3700 over its contact 3, contact 5 of relay P4(36), contact 5 of relay P2(36), contact 3 of relay P3(36), contact 1 of relay P5(36) to battery through the lower winding of relay P1(36). Relay P1(36) operates and locks in a circuit from battery through its upper winding and over its contact 3, contact 2 of relay P2(36), contact 4 of relay P3(36), contact 2 of relay P4(36), contact 4 of relay P5(36) to ground on conductor 3700.

When relay LE(36) releases at the end of the second pulse it connects ground on conductor 3700, over its contact 4, contact 4 of relay P1(36) to battery through the winding of relay P2(36). Relay P2(36) locks over its contact 3 and thence over contact 4 of relay P3(36), contact 2 of relay P4(36), contact 4 of relay P5(36) to ground on conductor 3700. At its contact 2, relay P2(36) opens the locking circuit of relay P1(36), causing that relay to release.

The third pulse from relay CKP(30), reoperating relay LE(36) causes the operation of relay P3(36) and the release of relay P2(36). Similarly, relays P4(36), P5(36) and P6(36) operate in response to the fourth, fifth and sixth pulses, relay P4(36) releasing relay P3(36) and relay P5(36) releasing relay P4(36). Relay P5(36) locks over contact 6 of relay P1(36) and its own contact 5 to conductor 3700. The sixth pulse operates relay P6(36) which locks in a circuit from battery through its upper winding and over its contact 3 to ground on conductor 3700.

With relays P5(36) and P6(36) operated, a circuit is closed from battery through resistance BG(37), winding of relay SP1(37), conductor 3701, contact 4 of relay P6(36), contact 2 of relay P5(36), conductor 3616, contact 1 of relay TTK1(32) to ground over conductor 2504. While relay CKP(30) is closing its contact 2, following the sixth pulse, it connects ground to conductor 3004 and contact 4 of relay SP1(37) to resistance BG(37) in shunt of the winding of relay SP1(37). At the beginning of the next or seventh pulse, this ground is removed and relay SP1(37) operates and closes a circuit from battery through the winding of relay SP2(37) over contact 5 of relay SP1(37) to conductor 3004 so that, at the end of the seventh pulse, when relay CKP(30) again grounds conductor 3004, relay SP2(37) operates.

Relay SP1(37) at its contact 3 connects conductors 3005 and 3006 together to short circuit the contact of relay P(30) and hold that relay ineffective. Relay SP1(37) also closes a circuit from battery through the winding of relay TTK(32), contact 8 of relay TTK1(32), conductor 3201, contact 1 of relay SP1(37) to ground on conductor 2504.

Relay TTK(32) operates and locks in a circuit from battery through its winding and the winding of relay TTK1(32), contact 1 of relay TTK(32) to ground on conductor 2504. Relay TTK1(32) cannot operate, being shunted by the operating circuit of relay TTK(32).

Relay SP2(37), when operated as above described, extends the winding of relay SP1(37) over contact 2 of relay SP2(37) and contact 5 of relay SP1(37) to conductor 3004 to hold relay SP1(37) operated under the control of relay CKP(30). At its contact 1, relay SP2(37) disconnects ground from conductor 3700, releasing relays P5(36) and P6(36) and opening the original operating circuit for relay SP1(37).

When relay CKP(30) next closes its contact 2, relays SP1(37) and SP2(37) release, permitting relay TTK1(32) to operate. With relay SP1(37) released and relay TTK(32) operated, ground from conductor 2504 is extended over contact 2 of relay SP1(37), contact 2 of relay W(37), conductor 2505, contact 2 of relay TTK(32), conductor 3202, contact 9 of relay TT1(25) to conductor 3000 to stop the pulsing operation of relay PG(30).

When relays TT2(25) and AV(24) are operated as above described, a circuit is closed from battery through the winding of relay TGT(31), conductor 3102, contact 5 of relay CL3(24), contact 8 of relay AV(24), conductor 2412, contact 2 of relay TT2(25), contact 2 of relay SG(25) to ground at contact 6 of relay ON(25). Relay TGT(31) is slow to operate and, after an interval, with relay TTK1(32) operated, closes a circuit from battery through the winding of relay BD(32), conductor 3203, contact 7 of relay CL2(24), conductor 2413, contact 6 of relay TTK1(32), conductor 3204, contact 1 of relay TGT(31), conductor 2506 to ground at contact 6 of relay ON1(25). Relay BD(32) at its contact 4 closes a substitute connection between conductors 3202 and 3000 to hold relay PG(30) inoperative and at its contact 2, opens a short circuit around the windings of relays TG(31) and OF(31) to prepare for trunk test.

In the trunk circuit, with relay D(2) operated and relay F(10) released, the signalling conductor 207 extends over contact 9 of relay TT(2), conductor 900, contact 7 of relay BY(9), conductor 1008, contact 1 of relay RD(10), contact 1 of relay IN(10), conductor 1017, contact 9 of relay SL1(2), conductor 216, contact 5 of relay F(10), conductor 1018, contact 9 of relay D(2), conductor 221 to the armature of relay P(18). As soon as relay D(2) operates it closes a circuit from ground over contact 9 of relay SG(2), contact 7 of relay D(2), conductor 222, through resistances E(18), contact 3 of jack D(18), middle winding of relay P(18), contact 3 of jack C(18) to battery, energizing relay P(18) in a direction to close its contact 2. Therefore conductor 207 is further extended over contact 2 of relay P(18), contact 3 of jack E(18), conductor 1800 to battery through resistance lamp M(18).

The talking conductors 212 and 213 outgoing to the step-by-step office extend over contacts 3 and 7 of relay TT(2), contacts 2 and 9 of relay CT(2), conductors 214 and 215, contacts 3, 1 and 9, 11 all of relay LT(9) to conductors 989 and 913 leading to the trunk link frame and through the switches to the incoming trunk. Supervision to and from the originating office is obtained by relay SV(18). The left sides of the windings of this relay are connected over conductor 922, contact 1 of relay BY(9), conductor 232 to ground over contact 4 of relay D(2). The right side of the upper winding of relay SV(18) is connected over conductor 1808 to ground at contact 1 of relay SG(2), while the right side of the lower winding of relay SV(18) is connected through coil B(18) over conductor 919 and contact 11 of relay LT(9) to conductor 913 and thence to the originating office. However, with relay D(2) operated, relay SV(18) is ineffective.

The upper, operating winding of relay P(18) is included in a circuit from ground at contact 8 of relay D(2), conductor 223, winding of relay P(18), contact 2 of jack C(18), resistance FA(18), conductor 1807, contact 11 of relay D(2), conductor 224, contact 5 of relay EA(10), conductor 1022, contact 6 of cross-point 00(24), conductor 2411, contact 3 of relay CT(31), contact 2 of relay LR(31), conductor 3101, contact 7 of relay AV(24), conductor 2414, contact 3 of relay TTK1(32), conductor 3205, windings of relays TG(31) and OF(31), conductor 3103, contacts 1 and 3 of relay CL5(37), conductor 3006, contact 1 of relay P(30) which is held closed at this time, conductor 3005, contact 7 of relay CL5(37), conductor 3702, contact 5 of relay CL6(30), contacts 6 and 1 of relay CL4(30), contact 1 of relay CL6(30), conductor 3007, contact 5 of cross-point 00(24), conductor 2415, contact 8 of relay EA(10) to battery through resistance N(10).

The completion of this circuit operates relay TG(31), which in turn completes a circuit from ground on conductor 2506, contact 1 of relay BD(32), conductor 3206, contact 2 of relay OF(31), contact of relay TG(31), contact 2 of relay WK(31), contact 4 of relay TGT(31), conductor 3104, to battery through the winding of relay TT1(25). Relay TT1(25) operates and locks over its contact 4 to ground on conductor 2506. At its contact 1, relay TT1(25) opens the circuit of relay TT2(25) which releases slowly, in turn releasing relay TGT(31), and relay BD(32).

Relay TT1(25) closes a circuit from ground on conductor 2502, contact 3 of relay TT1(25), conductor 2507, contact 1 of relay Z(37), conductor 3703, contact 2 of relay CL1(19), contacts 3 of relays CLS(19), CRS(19), AS(19), BS(19) and CS(19), conductor 1901, contact 4 of relay DS(26), which was operated as previously described, contact 5 and winding of relay ES(26) to battery. Relay ES(26) operates, locks over its contact 6 and contact 7 of relay FS(26) to ground on conductor 2502 and at its contacts 7 and 8 transfers the locking circuit of relay DS(26) from ground on conductor 2502 as previously traced to ground on conductor 3703.

With relay BD(32) released, a short circuit is closed at its contact 2 around the windings of relays TG(31) and OF(31), reducing the resistance in the pulsing circuit sufficiently to cause relay P(18) in the trunk circuit to close its contact 1, connecting ground to conductor 207 over the path previously traced.

With relay BD(32) released and relay TT1(25) operated ground is disconnected from conductor 3000, permitting relay PG(30) to again start pulsing, relays P(30) and CKP(30) also pulsing as previously described. Each time that relay P(30) opens its contact 1, relay P(18) in the trunk opens its contact 1 and closes its contact 2 to disconnect conductor 207 from ground and connect it to battery to transmit pulses to the step-by-step office where these pulses are used to control the step-by-step switches in the selection of the wanted line.

Relay CKP(30) controls relays LC(37), LD(36) and LE(36) which in turn operate the pulse counting relays P1(36) to P6(36).

Since it was assumed that the called line number is 1360 and that relays D0(26) and D1(27) were operated, as soon as relay P1(36) has operated a circuit is closed from battery through resistance BG(37), winding of relay SP1(37), conductor 3701, contact 5 of relay P6(36), contact 5 of relay P1(36), conductor 3611, contact 6 of relay D1(27), conductor 2700, contact 6 of relay D0(26), contact 2 of relay DS(26), conductor 2600, contacts 4 of relays CS(19), BS(19), AS(19), CRS(19) and CLS(19), contact 6 of relay CL1(19), conductor 1902, contact 5 of relay Z(37), conductor 3704, contact 2 of relay TTK1(32) to ground on conductor 2504.

As previously described, as long as relay CKP(30) holds its contact 2 closed, relay SP1(37) cannot operate, but when relay CKP(30) opens its contact 2, relay SP1(37) operates. Since relay TTK1(32) is operated, relay SP1(37) now closes a circuit from ground on conductor 2504, contact 1 of relay SP1(37), conductor 3201, contact 7 of relay TTK1(32), conductor 3207, contact 4 of relay W(37), normally closed contact of relay WR(37) to battery through the winding of relay W(37) and resistance BJ(37). Relay W(37) operates in this circuit and locks in a circuit from battery through resistance BJ(37), winding of relay W(37), contact of relay WR(37), contact 5 of relay W(37) to ground on conductor 2504. Relay W(37) also closes a circuit from battery through resistance BF(37) and the winding of relay Z(37), contact 5 of relay W(37) to ground on conductor 2504, but relay Z(37) cannot operate, being shunted by ground connected to conductor 3207, as traced for the operating circuit of relay W(37) which is connected over contact 2 of relay Z(37) to resistance BF(37) in shunt of the winding of relay Z(37).

Relay W(37) closes a circuit from ground on conductor 2506, contact 2 of relay PC(30), conductor 3008, contact 3 of relay W(37), conductor 3203 to battery through the winding of relay BD(32), operating the latter relay, which removes the shunt around relays TG(31) and OF(31) to check the polarity of the pulsing loop during the interdigital period.

Both relay SP1(37) and relay W(37) connect conductors 3005 and 3006 together in shunt of the contact of relay P(30) to prevent the transmission of further pulses. However, relays PG(30), P(30) and CKP(30) continue to pulse to measure an interdigital time interval. As described in connection with the preliminary timing, relay SP1(37) prepares a circuit for relay SP2(37) which operates when relay CKP(30) next closes its contact 2.

As previously described, relay SP2(37) opens the locking circuit for the pulse counting relays, allowing relay P1(36) to release. It closes a holding circuit for relay SP1(37) under the control of relay CKP(30). It also opens the holding circuit for relays LC(37) and LE(36) causing these relays to release. When relay CKP(30) opens its contact 2, relays SP1(37) and SP2(37) both release, opening the operating circuit of relay W(37) and permitting relay Z(37) to operate in the circuit above traced. Relay Z(37) disconnects ground from conductor 3703, thereby releasing relay DS(26).

With relay SP2(37) released, the pulse counting relays count the operations of relay CKP(30) as previously described and, with relay Z(37) operated, the operation of relay P3(36) closes a circuit from battery through the winding of relay SP1(37), conductor 3701, contact 5 of relay P6(36), contact 6 of relay P3(36), conductor 3613, contact 4 of relay Z(37), conductor 3704, contact 2 of relay TTK1(32) to ground on conductor 2504. Relay SP1(37) operates and closes the circuit previously traced from ground to conductor 3207 which now extends over contact 3 of relay Z(37) to battery through the winding of relay WR(37). Relay WR(37) opens the circuit of relay W(37) which releases, in turn releasing relay BD(32) in preparation for sending out the next digit. Relay Z(37) remains operated over contact 4 of relay W(37) under the control of relay SP1(37). Relay SP2(37) is operated as previously described, releasing relay P3(36), after which relays SP1(37), SP2(37), Z(37) and WR(37) release.

The release of relay Z(37) restores the digit control lead to the steering relay chain, where it is controlled by the E register, since steering relay ES(26) has been operated. It also closes the circuit for operating the next steering relay, in this case relay FS(26). The interrupter relays continue to pulse, the pulses being counted and controlled as described above. In the same manner as described, the remaining three digits are sent out with an interdigital pause between the digits.

In counting the digit 0, which is the last digit to be sent out, relay P6(36) is operated in response to the sixth pulse as previously described and, since it locks directly to conductor 3700, remains operated during the receipt of the remaining pulses. With relay P6(36) operated, ground connected over contact 3 of relay LE(36) at the end of the seventh pulse is extended over contact 5 of relay P4(36), contact 5 of relay P2(36), contact 3 of relay P3(36) and contact 1 of relay P6(36) to the winding of relay P1(36). Relay P1(36) in operating opens the locking circuit of relay P5(36) and the circuits for operating relays P2(36), P3(36) and P4(36) for counting the eighth, ninth and tenth pulses are the same as for operating these relays to count the second, third and fourth pulses.

When the sender starts to send out the last digit, steering relay HS(33) is operated and when that digit has been sent out, relay GS(33) releases as described for the operation of relay ES(26) and the release of relay DS(36). With relay GS(33) released, relay HS(33) operated, and no corresponding register relay operated, the sender recognizes that pulsing has been completed by the operation of end of pulsing relay EP(24) in a circuit which may be traced from battery through the winding of relay EP(24), conductor 2416, contact 9 of relay AS(19), contacts 10 of relays BS(19) and CS(19), conductor 1903, contacts 10 of relays DS(26), ES(26), FS(26) and GS(26), conductor 2601, contact 9 of relay HS(33), contact 7 of relay H0(33), conductor 3300, contact 5 of relay H1(34), contact 5 of relay H2(34), conductor 3400, contact 5 of relay H4(35), conductor 2508 to ground at contact 8 of relay ON1(25). Relay EP(24) operates in this circuit and locks over its contact 4, directly to conductor 2508.

Relay EP(24) at its contact 6, connects ground on conductor 2504 to conductor 3000 to stop the operation of the pulsing relays. At its contact 5, relay EP(24) opens the circuit of relay D(2) in the trunk circuit and of relay CT(31) in the sender. At its contact 1, relay EP(24) opens the locking circuit of relay LR(31).

Relay D(2) in releasing, opens the biasing circuits of relay P(18), and disconnects the operating winding from the sender. At its contact 9 it disconnects the circuit of signaling conductor 207 from the armature of relay P(18) and extends that circuit over its contact 10, conductor 217, contact 2 of relay TM(10) and conductor 903 to the armature of relay SV(18) to place the signaling under the control of the originating office. At its contact 4 it disconnects the windings of relay SV(18) from ground and at its contact 3 connects them over conductor 1015 to ground at contact 2 of relay E(10). When the called subscriber answers, ground is connected to conductor 200, operating relays E(10) and EA(10). Relay E(10) at its contact 2, disconnects ground from the windings of relay SV(18) and at its contact 3, connects battery through resistance lamp E(9) thereto as a signal to the originating office.

In the sender, relay CT(31) is made slow to release to prevent disconnecting the sender before relay D(2) has completed its functions in the trunk. At its contact 3, relay CT(31) opens the pulsing circuit and at contact 6 releases relay LR(31). Relay LR(31) opens the locking circuit of relay ON(25) and the latter relay releases, in turn releasing relay ON1(25) and relay AV(24). The release of relays ON(25) and ON1(25) removes ground from the various off-normal ground conductors permitting any relays locked thereto to release. Relay LR(31) also opens the circuit of hold magnet H0(24) of the sender link, restoring the link to normal.

The sender is also arranged to serve local trunks to step-by-step offices, and trunks to offices having incoming registers, to transmit designations by pulses having a speed of twenty pulses per second or by battery and ground pulses and to send out various numbers of digits. These functions are largely controlled by the class relays CL1(19) to CL6(30), but since they are not involved in the operation of the trunk under consideration they will not be described.

At the termination of the call, if disconnection takes place first at the step-by-step office, ground is removed from conductor 200, releasing relays E(10) and EA(10). Relay E(10) in releasing disconnects battery from the windings of relay SV(18) and connects ground thereto, to transmit a disconnect signal to the originating office.

When disconnection takes place at the originating office, the cross bar switches are released, releasing relay SV(18) and ground is removed from conductor 1011, permitting relay TM(10) to release. The release of relay TM(10) disconnects ground from conductor 205, permitting condenser G(10) to charge as previously described, operating tube G(10) and relay G(10) after a measured interval. Relay G(10) opens the locking circuit of relay MB(10) and the latter relay releases, in turn releasing relay SG(2), and extinguishing tube G(10) to release relay G(10), and restore the trunk circuit to normal.

If relay TM(10) releases before disconnection takes place at the step-by-step office, ground is connected over contact 1 of relay TM(10) to conductor 217 and thence as previously traced to conductor 207 as a disconnect signal to the step-by-step office. If relay E(10) has not been released by the time tube G(10) functions to release relays MB(10) and SG(2), the trunk circuit will respond as to a normal incoming call.

*Outgoing call from operator switchboard*

When an operator at the cross-bar office receives a call to be extended to the step-by-step office, she will test for an idle trunk circuit such as that shown and seize that trunk by inserting the plug of a cord circuit 121 at her position in the jack 120 individual thereto and will connect her multifrequency key-set 122 to the cord. Battery connected to the sleeve of her cord 121 will complete a circuit over the sleeve of jack 120, conductor 203, contact 1 of relay B(10), contact 3 of relay TM(10), contact 12 of relay F(10), contact 5 of relay IN(10), conductor 1023 to ground through the lower, high resistance winding of relay SL(2).

Relay SL(2) at its contact 5 connects ground to conductor 204 to operate relay MB(10) which marks the trunk busy to the marker as previously described, but relay SL(2) at its contact 2 opens the circuit by which relay MB(10) marks the sleeve of jack 120 busy. Relay SL(2) at its contact 3 closes an obvious circuit for operating relay SG(2) which locks over its contact 2 and conductor 219 to ground at contact 5 of relay MB(10). Relay SL(2) at its contact 4 and relay SG(2) at its contact 3, each opens the operating circuit for relay IN(10) to prevent the effective seizure of the trunk for an incoming call. At its contact 1, relay SL(2) closes a circuit for relay SL1(2), which may be traced from battery through the winding of relay SL1(2), contact 1 of relay SL(2), contact 10 of relay SL1(2), to ground supplied to conductor 123 from the cord circuit 121 over the tip contact of jack 120. Relay SL1(2) operates in this circuit when the cord plug is seated in the jack and locks to ground over its contact 11 under the control of relay SL(2). Relay SL1(2) at its contact 1 closes a circuit from ground over conductor 223, through the upper winding of relay P(18), contact 2 of jack C(18), resistance FA(18), conductor 1807, contact 12 of relay D(2), contact 2 of relay T1(2), conductor 225 to battery through resistance N(10). At its contact 2, relay SL1(2) connects ground to conductor 222, completing a circuit through resistance E(18), contact 3 of jack D(18), middle winding of relay P(18), contact 3 of jack C(18) to battery. Relay P(18) operates in response to the closure of these circuits to close its contact 2, thereby closing a circuit from battery through resistance lamp M(18), conductor 1800, contact 3 of jack E(18), contact 2 of relay P(18), conductor 221, contact 8 of relay SL1(2), conductor 1017, contact 1 of relay IN(10), contact 1 of relay RD(10), conductor 1008, contact 7 of relay BY(9), conductor 900, contact 9 of relay TT(2) to conductor 207 as a seizure signal to the step-by-step office.

Relay SL1(2) also initiates the connection of a multi-frequency incoming register to the trunk by closing a circuit from battery through resistance ST(2), contact 4 of relay CO(2), conductor 208, contact 7 of relay SL1(2), conductor 226, through the winding of trunk preference relay TP0(4) to ground. Relay TP0(4) operates and, if no other trunk in the group is seeking a register, is effective to control the seizure of a register.

Trunk preference relays TP0(4) to TP19(4) are each individual to a trunk and are arranged in a chain so that the operation of one trunk preference relay prevents the operation of those having higher numbers. A preference relay having a lower number can operate, but is ineffective until the higher numbered relay releases.

Assuming that relay TP0(4) operates alone, it closes a circuit from ground over its contact 1, conductor 400, contact 1 of register busy relay RB0(12), if the associated register is idle, to battery through the winding of register preference relay RP0(12). The register preference relays RP0(12) to RP4(12) and their associated register busy relays are all associated with the register of Figs. 5 to 8, 13 to 16, 22, 23 and 29, but are individual to different groups of trunks which may be served by that register. A similar set of register preference relays and register busy relays is provided for each register and the register busy relays associated with each trunk group are arranged in a chain to establish an order of preference for the registers, this order varying with the trunk group. When a register is seized by a trunk group, the associated register busy relays are operated for each group except the seizing group, thereby advancing the preference to the next register in each group.

Assuming that the register shown is idle and, therefore relay RB0(12) is not operated, the above-traced circuit for relay RP0(12) is completed and relay RP0(12) operates. With relay RP0(12) operated a locking circuit is closed for relay TP0(4) which may be traced from ground through the winding of relay TP0(4), contact 7 of relay TP0(4), contacts 11 of relay TP10(4) and the other intermediate trunk preference relays, contact 10 of relay TP19(4), conductor 401, contact 8 of relay RP0(12), contacts 13 of relay RP2(12) and the other intermediate register preference relays, contact 12 of relay RP4(12), conductor 1200, contact 7 of relay RLK(22), resistance F(22) to battery.

At its contact 9, relay RP0(12) connects ground to conductor 1201, which leads to battery through the winding of relay ON(22), operating that relay to prepare the incoming register for operation. Ground on conductor 1201 is also extended over contact 2 of relay TRL(29), contact 3 of relay MRL(29), conductor 2900, contact 2 of relay MB(22) to battery through the winding of relay RB(22). Relay RB(22) connects resistance and battery over its contacts to the windings of all of the register busy relays associated with this register, circuits being shown over contacts 2, 4 and 6 of that relay and conductors 2200, 2201 and 2202 to ground through the upper windings of relays RB0(12), RB2(12) and RB4(12). However, since relay RP0(12) is operated, ground is also connected over contact 1 of relay RLK(22), conductor 2203, contacts 6 of relays RP4(12), RP2(12) and the intermediate relays, contact 4 of relay RP0(12) to conductor 2202 in shunt of the resistance battery supplied by relay RB(22) to prevent relay RB0(12) from operating.

Relay RP0(12) also closes a circuit from ground through the winding of select magnet SO(11), individual to the incoming register, conductor 1100, contact 2 of relay RP0(12), contacts 2 of relays RP2(12), RP4(12) and the intermediate register preference relays, conductor 1202, contact 2 of relay H(22), conductor 2204, contact 4 of relay TRL(29), resistance SM(29) to battery. The select magnet SO(11) operates in this circuit to prepare the cross-points of the corresponding level of the register link switch for operation. With magnet SO(11) operated, a circuit is closed for hold magnet H0(11) individual to the trunk circuit, which may be traced from battery through the winding of magnet H0(11), conductor 1101, contact 8 of relay TP0(4), contact 13 of relay TP19(4) and the other intermediate trunk preference relays, contact 12 of relay TP19(4), conductor 402, auxiliary contact of select magnet SO(11), conductor 1102, contact 6 of relay H(22), conductor 2205, contact 8 of relay TRL(29), conductor 2901, to ground at contact 5 of relay ON(22).

Magnet H0(11) operates in this circuit, closing cross-point 00(11) to connect the trunk with the register and extending its operating ground over contact 1 of cross-point 00(11), conductor 1103 to battery through the winding of relay H(22). Relay H(22) operates and closes a locking circuit for itself and the hold magnet H0(11) through the upper winding of relay DCK(22), contact 7 of relay H(22), conductor 2205 and thence as above traced to ground at contact 5 of relay ON(22). Relay H(22) at its contact 2 opens the circuit of select magnet SO(11) and at its contact 6 opens the operating circuit of magnet H0(11). If no double connection exists, relay DCK(22) operates as soon as the operating ground is disconnected and in turn locks in a circuit from battery through its lower winding and over its contact 4 to ground on conductor 2205, and over its contacts 3 and 4 connects ground from conductor 2205 to conductor 1103. If a false double connection exists, ground is connected to conductor 1103 by some other register, relay DCK(22) cannot operate and the register cannot function.

In the meantime, a registration has been set up of the trunk frame number and of the class of the calling trunk. As soon as relay RP0(12) operates, it closes a circuit from ground over contact 4 of relay CK(22), conductor 2206, contacts 4 of relays RP4(12), RP2(12) and the intermediate register preference relays, contact 3 of relay RP0(12), conductor 1203, to battery through the windings of relays TN(3), CL(3) and TF(3). Relays TF(3) and CL(3) prepare circuits for identifying the trunk frame and class of the calling trunk as will be described. Relay TN(3) prepares circuits for registering a trunk number on the LU and LT relays of Figs. 13 and 14, under the control of the auxiliary preference relays, which are used by the marker in the case of tandem trunks to identify the location of the trunk on the line link frame.

Relay TF(3), at contact 2 connects ground to conductor 300, operating relay FG0(6) to identify the group of frames in which the particular frame is located. Contacts of the trunk preference relays are cross-connected at rack 301 to the armatures of relay TF(3) in accordance with the trunk link frame on which the associated trunk is located. Assuming that the trunk under consideration is located on frame O, the cross-connection at rack 301 would be as shown, and a circuit is closed from ground over contacts 4 of relays TP19(4), TP10(4) and the intermediate trunk preference relays, contact 3 of relay TP0(4), conductor 403, cross-connected at rack 301 to conductor 302, contact 12 of relay TF(3), conductor 303 to battery through the winding of relay TF0(5).

Similarly, a circuit is closed from ground over contacts 2 of relays TP19(4), TP10(4) and the intermediate trunk preference relays, contact 2 of relay TP0(4), conductor 404, which is cross-connected at rack 304 to conductor 305, over contact 11 of class relay CL(3), conductor 306, winding of class relay PCD(6) to battery.

In the case of tandem trunks, rack 304 is used to connect the contact of the trunk preference relay to an auxiliary preference relay, such as AP0(11) and rack 307 is used to establish the class relay circuit under the control of the auxiliary preference relay.

When relay H(22) operates as above described, it closes a circuit from ground over its contact 4, conductor 2207, contact 6 of cross-point 00(11), conductor 209 to battery through the winding of relay CO(2) in the trunk circuit. Relay CO(2) operates in this circuit and locks over its contact 3 and conductor 210 to ground at contact 5 of relay SL1(2). At its contact 4, relay CO(2) opens the start circuit of the register link and at its contact 6 connects ground to conductor 204 to hold relay MB(10) operated.

With relay CO(2) operated and one frame group, trunk frame and class relay operated, a checking circuit is closed, which may be traced from ground over contact 1 of relay CO(2), conductor 211, contact 4 of relay TP0(4), contacts 6 of relays TP10(4), TP19(4) and the intermediate trunk preference relays, conductor 405, contact 7 of relay RP0(12), contact 11 of relay RP2(12) and the intermediate register preference relays, contact 10 of relay RP4(12), conductor 1204, contact 3 of relay PCD(6), conductor 600, contact 1 of relay TF0(5), conductor 500, contact 1 of relay FG0(6), conductor 601, to battery through the winding of relay CK (22). Relay CK(22) operates and at its contact 2 connects ground to conductor 1204 to lock itself operated after the preference relays release.

When relay ON(22) operates, it connects ground over its contact 4 to conductor 2208, which extends to battery through the winding of relay ON1(23), over contact 9 of relay MST(29) to battery through the winding of relay TM1(29) and over contact 7 of relay RV(29) and contact 5 of relay TM(29) to battery through the winding of relay SR(29), thereby operating relays ON1(23), MST(29) and SR(29). In addition relay ON(22) at its contact 3 connects ground to conductor 2209, over contact 8 of relay RLK(22), conductor 2210 to battery through the winding of relay AS(7), operating the latter relay.

With relay ON1(23) operated, the frame and class relays FG0(6), TF0(5) and PCD(6) lock over conductor 2320 to ground at contact 1 of relay ON1(23).

When relays DCK(22) and CK(22) have operated, a circuit is closed from battery through the winding of relay RLK(22), contact 2 of relay DCK(22) to ground at contact 1 of relay CK(22). Relay RLK(22) operates in this circuit and locks over its contact 5 and conductor 2211 to ground at contact 11 of relay ON1(23). At its contact 6 it connects ground on conductor 2211 to conductor 2900 to hold relay RB(22) operated and to complete a holding circuit for relay ON(22) which extends from conductor 2900 over contact 3 of relay MRL(29), contact 2 of relay TRL(29) and conductor 1201 to battery through the winding of relay ON(22). Relay RLK(22) also disconnects ground from conductor 2203 to permit register busy relay RB0(12) to operate and mark this register busy to the associated trunk group. In addition, relay RLK(22) opens the operating circuit of relay AS(7), but relay AS(7) remains operated in a circuit from battery through its winding and over its contact 2, contact 4 of relay BS(7), conductor 2209 to ground at contact 3 of relay ON(22). At its contact 7, relay RLK(23) disconnects battery from conductor 1200, thereby opening the locking circuit of relay TP0(4) which releases, in turn releasing relay RP0(12) and relays TF(3), CL(3) and TN(3). The control circuit of the register link is now free to control another trunk and register connection. Cross-point 00(11) is held under the control of relay ON(22) as above described, maintaining the connection between the trunk and the register.

Relay RLK(22) starts a timing operation to insure a stable condition before the transmission of the start pulsing signal. Tube RV(22) is employed for this purpose. +130-volt battery is connected to one side of condenser C3(22) which is connected across the control gap of tube RV(22), but with relay RLK(22) non-operated, condenser C3(22) is held discharged over contact 3 of relay RLK(22) and resistance R14(22). When relay RLK(22) operates, it opens this discharge circuit and extends the other side of condenser C3(22) over its contact 4, conductor 2212, upper winding and contact 6 of relay RV(29), conductor 2902, to ground at contact 10 of relay ON1(23). Condenser C3(22) charges in this circuit and after an interval of about 0.2 second, the voltage across the condenser reaches the breakdown potential of tube RV(22) and the control gap of the tube breaks down, permitting relay RV(29) to operate across the main gap. Relay RV(29) closes a locking circuit for itself from battery through its lower winding and over its contact 8, conductor 2903, to ground at contact 5 of relay CK(22). It then opens its operating circuit at its contact 6, to quench tube RV(22).

With relay RV(29) operated, ground through the upper winding of relay A(29) is connected over contact 3 of relay RV(29), contact 6 of relay MST(29), conductor 2904, contact 1 of relay H(22), conductor 2213, which is connected through one winding of the input coil of the multifrequency receiving circuit to conductor 2300, contact 3 of cross-point 00(11), conductor 237, contact 8 and winding of relay RV(2) to battery. Relay RV(2) operates in this circuit, locks over its contact 9, conductor 231, contact 5 of relay CO(2), contact 6 of relay D(2), to ground at contact 9 of relay SG (2) and extends conductor 237 over its contact 5, contact 4 of relay CT(2), contact 3 of relay SL1(2), conductor 123, tip of jack 120 and cord 121 to the multifrequency key-set 122.

With relay RV(2) operated, a circuit is closed from battery through the lower winding of relay A(29), contact 5 of relay RV(29), contact 7 of relay MST(29), conductor 2905, contact 5 of relay H(22), conductor 2214, which is connected through a second winding of the input coil of the multifrequency receiving circuit to conductor 2301, contact 2 of cross-point 00(11), conductor 1105, contact 10 of relay RV(2), contact 7 of relay CT(2), contact 4 of relay SL1(2), conductor 124, ring of jack 120 and cord 121 to the multifrequency key-set 122.

For a detailed disclosure of a multifrequency key-set and a multifrequency receiving circuit, reference may be made to patent 2,382,893, granted to B. McKim et al, August 14, 1945.

Relay RV(2) closes a circuit from ground over its contact 2, conductor 227, contact 1 of relay FL(9), conductor 923 to the upper winding of relay SL(2) thereby reducing the resistance in the sleeve circuit, to light a lamp at the operator's position as an indication that the register is ready to receive the designation.

Relay A(29) operates in series with relay RV(2) closing a circuit from ground at contact 4 of relay ON(22), conductor 2208, contact of relay A(29), to battery through the winding of relay SR(29) to hold that relay operated after its original operating circuit is opened by the operation of relay RV(29), relay SR(29) being slow to release to cover the interval between the operation of relay RV(29) and the operation of relay A(29). If relay A(29) fails to operate, the release of relay SR(29) causes the register to release as for an abandoned call.

With relay RV(2) operated, retard coil D(2) is connected conductors 123 and 124, the circuit extending from conductor 123, lower winding of coil D(2), contact 6 of relay RV(2), resistance V(2), upper winding of coil D(2), contact 4 of relay SL1(2) to conductor 124. This connection serves to hold relay A(29) operated during pulsing.

The operator now operates her key-set to send out coded multifrequency pulses corresponding to the wanted number. Assuming, for convenience, that the same subscriber is being called as in the last previously described call, the designation will be AD4-1360. However, since the trunk leads directly to the wanted office, only the numerical designation 1360 will be keyed.

Each digit sent out by the multifrequency key-set consists of two out of five audio frequencies which may be designated frequencies 0, 1, 2, 4 and 7. In addition, a key pulse signal using frequency 2 and a sixth frequency designated 10 is sent first as a "gate opener" and a "start" signal consisting of frequencies 7 and 10 is sent after the last digit. The entire code used is as follows:

| Digit | Frequencies |
|---|---|
| 0 | 4, 7 |
| 1 | 0, 1 |
| 2 | 0, 2 |
| 3 | 1, 2 |
| 4 | 0, 4 |
| 5 | 1, 4 |
| 6 | 2, 4 |
| 7 | 0, 7 |
| 8 | 1, 7 |
| 9 | 2, 7 |
| key pulse | 2, 10 |
| start | 7, 10 |

The actual frequencies may be as follows:

| Designation | Cycles per Second |
|---|---|
| 0 | 700 |
| 1 | 900 |
| 2 | 1,100 |
| 4 | 1,300 |
| 7 | 1,500 |
| 10 | 1,700 |

The key pulse signal is received entirely by the multifrequency receiver without any effect on the register. Each subsequent digit causes the receiver to ground two of the conductors 800, 801, 802, 804 and 807, and then to ground conductor 820. As shown, the register is arranged to receive as few as four digits, for example, for a call to be terminated locally, or as many as eleven digits for a toll call, where a preliminary directing code is also required. For each digit there is provided a steering relay, such as relay AS(7) and a set of five register relays such as relays A0(23), A1(23), A2(23), A4(23) and A7(23).

Relay AS(7) was operated in response to the operation of relay ON(22) as previously described. As soon as relay AS(7) operates, it closes a circuit from battery through the winding of relay EV(7), contact 4 of relay OD(7), contact 4 of relay AS(7), conductor 2209 to ground at contact 3 of relay ON(22).

When the operator keys the first digit 1, the multifrequency receiving circuit will connect ground to conductors 800 and 801 completing one circuit from ground on conductor 800, contact 10 of relay EV(7), contact 10 of relay AS(7), conductor 700 to battery through the winding of relay A0(23), and a second circuit from ground on conductor 801, contact 9 of relay EV(7), contact 9 of relay AS(7) conductor 701 to battery through the winding of relay A1(23). Relays A0(23) and A1(23) operate in these circuits and lock over their contacts 1 and 2 to ground at contact 5 of relay ON1(23).

The multifrequency receiving circuit then connects ground to conductor 820, completing a circuit to battery through the winding of relay RA(8). Relay RA(8) at its contact 1 closes an auxiliary locking circuit for relay AS(7) which may be traced from battery through the winding of relay AS(7) and over its contact 1, contact 1 of relay EV(7), conductor 710, to ground at contact 1 of relay RA(8). Relay RA(8) also closes a circuit from battery through the winding of relay BS(7), contact 3 of relay AS(7), contact 2 of relay EV(7), conductor 711, contact 3 of relay RA(8), conductor 821 to ground in the multifrequency receiving circuit. Relay BS(7) operates in this circuit, locking over its contact 3 and contact 4 of relay CS(7) to ground on conductor 2209. Relay BS(7) opens one locking circuit for relay AS(7) but relay AS(7) remains locked under the control of relay RA(8).

Relay RA(8) further, at its contact 2, closes an obvious operating circuit for relay SYN(8) locks over its contacts 2 and 3 to conductor 822 which is grounded by the receiving circuit as long as a signal is present. Relay SYN(8) at its contact 4, closes a locking circuit for relay EV(7) over conductor 825, contact 3 and winding of relay EV(7) to battery.

Conductor 823 leading to the receiving circuit is connected, when the register is idle, over contact 5 of relay EV(7), contact 5 of relay AS(7), contact 6 of relay CS(7), contact 6 of relay ES(7), conductor 712, contact 6 of relay GS(15), contact 6 of relay JS(15), contact 5 of relay LS(15), conductor 1500, contact 2 of relay END(8) to conductor 824 also leading to the receiving circuit. A parallel path between conductor 823 and conductor 1500 may be traced over contact 5 of relay OD(7), contact 6 of relay BS(7), contact 6 of relay DS(7), conductor 713, contact 6 of relay FS(15), contact 6 of relay HS(15), and contact 6 of relay KS(15). When relay AS(7) operated, one branch of this circuit was opened and when relay BS(7) is operated, in response to the operation of relay RA(8), the second branch is opened, causing the multifrequency receiving circuit to release relay RA(8).

Relay RA(8) in releasing, releases relay AS(7). When the operator releases her key, removing the signal, relay SYN(8) releases, in turn releasing relay EV(7) and reclosing the connection between conductors 823 and 824. A circuit is now closed from battery through the winding of relay OD(7), contact 4 of relay EV(7), contact 5 of relay BS(7) to ground on conductor 2209.

When the key for the second digit, 3, is closed, the multifrequency receiving circuit connects ground to conductors 801 and 802, completing circuits over contacts 7 and 8 of relay OD(7), contacts 10 and 9 of relay BS(7), conductors 721 and 722, to battery through the windings of relays B1(8) and B2(8). These relays operate and lock over their contacts 1 and 2, conductor 2303 to ground at contact 4 of relay NO1(23). When the multifrequency receiving circuit then grounds conductor 820, relay RA(8) operates, operating relay SYN(8) which locks to conductor 822.

Relay SYN(8) connects ground to conductor 825 to close a holding circuit over contact 3 and through the winding of relay OD(7) to hold the latter relay operated. Relay RA(8) closes a locking circuit for relay BS(7) from battery through the winding of relay BS(7) and over its contact 1, contact 1 of relay OD(7), conductor 710 to ground at contact 1 of relay RA(8). In addition, relay RA(8) closes a circuit from ground supplied to conductor 821 by the receiving circuit, contact 3 of relay RA(8), conductor 711, contact 2 of relay OD(7), contact 2 of relay BS(7), to battery through the winding of relay CS(7). Relay CS(7) operates, locking over its contact 3 and contact 4 of relay DS(7) to ground on conductor 2209. Relay CS(7) opens one locking circuit for relay BS(7) and disconnects conductor 823 from conductor 824, causing the receiving circuit to remove ground from conductor 820 to release relay RA(8) and in turn relay BS(7). Relay BS(7) opens the operating circuit for relay OD(7). When the signal ceases and relay SYN(8) releases, relay OD(7) also releases, closing a circuit from ground on conductor 2209, contact 5 of relay CS(7), contact 4 of relay OD(7), to battery through the winding of relay EV(7). The register is now ready to receive the third digit.

The third and fourth digits are registered in the manner above described for the first and second digits, register relays C2(8), C4(8), D4(8) and D7(8) being operated. At the end of the fourth digit, relay ES(7) and relay EV(7) are operated.

Since less than the maximum number of digits has been keyed, a start signal is now sent, consisting, as above-mentioned, of the frequencies 7 and 10, causing the multifrequency receiving circuit to ground conductors 807 and 810. Ground on conductor 807, with relays EV(7) and ES(7) operated, operates relay E7(8), while ground on conductor 810 operates relay TEN (8). Relay E7(8) locks over its contacts 1 and 2 to ground on conductor 2309, while relay TEN(8) locks over its contact 1 and conductor 2304 to ground at contact 6 of relay ON1(23).

When, now, relay RA(8) is operated, it closes a circuit from ground at contact 2 of relay TEN(8), contact 4 of relay RA(8) to battery through the winding of relay END(8). Relay END(8) operates and locks over its contact 1, conductor 2215 to ground at contact 6 of relay CK(22). Relay RA(8) operates steering relay FS(15) in the manner described for the other steering relays and relay FS(15) opens one link between conductors 823 and 824. However, when relay TEN(8) operated, it connected these conductors together over its contact 4 and contact 2 of relay END(8) so that the connection is finally opened only after relay END(8) has operated.

With relay END(8) operated to indicate the receipt of the last digit, a circuit is closed from battery through the winding of marker start relay MST(29), conductor 2906 to ground at contact 3 of relay END(8). However, before the marker can be seized, it is necessary to transfer supervision back to the trunk. Therefore relay MST(29) at its contacts 6 and 7 disconnects relay A(29) from the signalling conductors and closes a circuit from ground over its contact 1, conductor 2907, through the lower winding of relay TC1(23), contact 4 of relay TC2(23) to conductor 2305. Conductor 2305 extends to battery through the upper winding of relay TC1(23) and over contact 9 of relay ON(22), conductor 2216, contact 5 of cross-point 00(11), conductor 1106, to battery through the winding of relay CT(2) in the trunk circuit. Relay CT(2) operates in this circuit, but relay TC1(23) is differentially wound and does not respond to the closure of the above-traced circuit. Relay CT(2) locks over its contact 6 to ground at contact 5 of relay SL1(2) and the connection of direct ground to conductor 1106 deenergizes the lower winding of relay TC1(23) causing the latter relay to operate as an indication that relay CT(2) has operated and locked.

With relay TC1(23) operated, a circuit is closed from battery through the winding of relay TC2(23), contact 1 of relay TC1(23), conductor 2306 to ground at contact 3 of relay CK(22) or contact 5 of relay MST(29). Relay TC2(23) connects battery over its contact 5, conductor 2307, contact 1 of relay MRL(29), contact 1 of relay TRL(29) to conductor 2908 leading through cable 154 to the marker connector 108, to cause the connector 108 to connect the incoming register with an idle marker, for example the marker shown in Fig. 38. At its contact 6 relay TC2(23) connects battery to conductor 2309 to supply operating battery for the multicontact relays of the connector.

When the connector has operated, the recorded designation is transferred to the marker by the grounding of conductors by the operated register relays. With the assumed registration, conductors 2310, 2311, 831, 832, 842, 844, 854, 857 and 1607 are grounded and are extended through marker connector 108 to registers in the marker, not shown. In addition, class relay PCD(6) closes a circuit from ground at contact 3 of relay R9(22), conductor 2217, contact 1 of relay PCD(6) to conductor 612 which extends through the marker connector 108 to conductor 3800 and through the winding of relay PCD(38) to battery, operating relay PCD(38) to inform the marker that pulse conversion is necessary and therefore that no switch controlling functions are required, but that it must select an outgoing dial pulse sender. Furthermore the trunk frame identification is transmitted to the marker by the grounding of conductors 514 and 517 by relay TF0(5) and the grounding of conductor 610 by relay FG0(6) which operate corresponding relays in the trunk frame registers 3801 to guide the marker in selecting the trunk frame on which the calling trunk is located.

In the trunk circuit, with relay CT(2) operated, the tip conductor 123 from the operator's position is connected over contact 3 of relay SL1(2), contact 3 of relay CT2(2), contact 3 of relay TT(2) to the tip conductor 212 outgoing to the step-by-step office and ring conductor 124 is connected over contact 4 of relay SL1(2), contact 3 of relay CT(2), contact 7 of relay TT(2) to the ring conductor 213 leading to the step-by-step office.

In the marker, relay PCD(38) in operating closes, at its contact 1, a circuit for operating a route relay R(38) individual to this type of call which in turn operates a relay in the sender selection and control circuit 3802, to initiate the operation of selecting an idle sender arranged to transmit dial type pulses, and connecting it with the marker. As soon as this relay operates a circuit is closed over contact 2 of relay PCD(38), windings of relays PCL1(38), PCL2(38) and PCL3(38) to battery to operate these auxiliary pulse conversion relays. Relay PCL2(38) at its contact 8 closes a locking circuit for the three relays to off normal ground. Relay PCL3(38) at its contact 1 closes a circuit for relay FTCK(38) to simulate the trunk frame test check.

As previously described, an idle dial type sender connects ground to conductor 3200 which is extended by the sender selection circuit 3802 to battery through the winding of relay SKA(38). The sender selection circuit proceeds to select an idle sender and operate the outgoing sender connector to connect the marker with the selected sender, which may be assumed to be the sender shown in full.

In the meantime, with relay SKA(38) operated to indicate the availability of at least one dial type sender, a circuit is closed from battery over the contact of relay SKA(38), contact 4 of relay PCL2(38) through the trunk frame registers 3801, which identify the frame on which the seized trunk is located, and through the trunk frame selection circuits 3803 to the trunk link connector of that frame, operating the connector to connect the marker with the trunk. When the trunk link connector has operated, it connects ground to conductor 3804, completing a circuit over contact 4 of relay PCL3(38) to battery through the winding of relay TFK3(38).

With the trunk link connector, for example, connector 110 operated, the sender selection circuit 3802 establishes a circuit for operating select magnet SO(24) individual to the selected sender in the sender link.

Relay TFK3(38) in operating closes a circuit from battery over its contact and contact 3 of relay PCL2(38) to conductor 3806 which is extended through the frame selection circuits to conductor 3805 and through the marker connector 108 to conductor 1107, which extends over contact 4 of cross-point 00(11), conductor 1108, to ground through the winding of relay LF(18).

In the meantime, with the marker connector 108 and the sender connector 115 operated the designation set up on the multifrequency incoming register is transferred over conductors of cable 154 through the marker connector 108, marker, outgoing sender connector 115, conductors of cable 153 to the outgoing sender where relays A0(19), A1(20), B1(20), B2(20), C2(20), C4(21), D4(28), D7(28) and E7(28) are operated, at the same time operating corresponding relays in the number checking registers 3807.

The route relay R(38) also sets up certain control registrations on the sender control registers 3808, which registers in turn operate control relays in the sender such as digit deletion relays DL1(19) etc., directing code relays CR0(19), etc. Under the assumed conditions none of these relays is operated. A route relay also normally sets up the class indication in the sender control register 3808. However, with relay PCL1(38) operated the class circuits from the sender control registers are opened.

When the trunk link connector 110 operates, it also operates relay 2MB(38) to indicate to the marker the class of the trunk. Relay PCL2(38) operates relay PCCL(38) from off-normal ground and relay PCCL(38) prepares alternative class transfer circuits. With trunk class relay 2MB(38) operated, ground is connected over the contact of relay 2MB(38), contact 2 of relay PCCL(38), through the winding of transfer checking relay TCN2(38) to battery and over contact 6 of relay PCL1(38) to conductor 3809, which is extended through the sender connector to battery through the winding of relay CL2(24).

The marker checks the transfer of the number and sender control information and measures a time interval for the transfer by means of the registration checking and timing circuit 3810 as a result of which relay RSC(38) is operated. The marker also performs a similar operation for the class information by means of the class transfer checking and timing circuit 3811.

When the sender has been selected and connected with the marker, the sender selection and control circuit 3802 connects ground to the right winding of relay SLK(38), but this relay is differentially wound and does not operate. After the trunk link connector 110 has operated and relay LF(18) in the trunk has been operated, conductor 3812, connected to the two windings of relay SLK(38) is extended to conductor 2402 and over the contact of select magnet SO(24), conductor 1019, contact 4 of relay LF(18), conductor 2401 to battery through the winding of hold magnet H0(24). Relay SLK(38) and magnet H0(24) both operate in this circuit, relay SLK(38) in turn operating relay SLK1(38) which locks under the control of the sender selection and control circuit 3802. As previously described, hold magnet H0(24) closes cross-point 00(24) to connect the trunk with the sender, and extends its operating ground to operate relay ON(25). When relay LR(31) operates to close the holding circuit for relay ON(25) and hold magnet H0(24), the holding ground, extends back to relay SLK(38) causing that relay to release. With relay SLK1(38) operated, the release of relay SLK(38) causes the operation of relay SLK2(38) which also locks and in turn operates relay SIK(38).

The marker is now ready to advance the sender and a circuit is closed from ground at contact 2 of relay RSC(38), contact 9 of relay PCL2(38), contact of relay SIK(38), contact 1 of relay SLK2(38), through resistances AVK2(38) and AVKI(38) to battery. Relay AVK(38) is biased by an off normal circuit through its right winding. Reduced battery potential from the midpoint of resistances AVKI(38) and AVK2(38) is extended through the left winding of relay AVK(38), contact 2 of relay PCL3(38) through the class transfer checking and timing circuit 3811, contact 1 of relay RSC(38) to conductor 3813 which is extended through the outgoing sender connector 115 to conductor 2409 and the winding of relay AV(24) in the sender. Relay AV(24) operates but relay AVK(38) is energized in the non-operate direction and does not operate. However, when relay AV(24) locks, its locking ground reverses the energization of relay AVK(38) and permits the latter relay to operate. Relay AVK(38) in turn operates relay AVKI(38), which, with relay PCL2(38) operated, now operates relay LKI(38), independent of the switch controlling circuits which have no function and are not operated for this type of call. With relay PCL2(38) operated, relay LKI(38) operates relays DISI(38) and relay DIS2(38). The latter relays connect ground to conductor 3814 which extends through the marker connector to conductor 2909, completing a circuit over contact 2 of relay SR(29) to battery through the winding of relay MRL(29). Relay MRL(29) disconnects battery from conductor 2908, releasing the marker connector 108, which releases the marker and opens the circuit of relay LF(18) in the trunk. Relay MRL(29) locks over its contact 4 and conductor 2910, to ground at contact 3 of relay TC2(23). At its contact 2 relay MRL(29) connects ground to conductor 2900 to hold relay RB(22) operated. At its contact 3, relay MRL(29) opens the holding circuit for relay ON(22) and that relay releases, in turn releasing the hold magnet HO(11) of the register link, and relays H(22), DCK(22) and ONI(23). Relay ONI(23) releases the trunk frame number relays FG0(6) and TF0(5), class relay PCD(6) and the line designation register relays. When relays FG0(6), etc., release they open the circuit of relay CK(22) and that relay releases, followed in turn by relay END(8), relay MST(29), relay TC2(23), relay MRL(29) and relay RB(22). Relay RB(22) releases the register busy relays in the register link and the register is thereby made available for reselection.

The outgoing sender functions in substantially the manner previously described except that, since the numerical digits are registered on the first four registers and all are to be sent out, none of the relays DLI(19) to DL6(19) are operated by the marker. Relay DCR(19) is operated in the manner previously described and when relay AV(24) is operated, the steering relay AS(19) is operated in a circuit from battery through its winding and contact 5, conductor 1904, contacts 2 of relays DL6(26), DL5(26) and DL4(26), conductor 2602, contacts 2 of relays DL3(19), DL2(19) and DLI(19), contact 3 of relay DCR(19), contact 1 of relay CLI(19), conductor 2410, contact 3 of relay AV(24), conductor 2503, contact 2 of relay TTI(25), conductor 2502 to ground at contact 10 of relay ONI(25). Therefore, outpulsing starts with the digit registered on relays A0(19) to A7(21).

As previously described, when the sender is ready to pulse out, it connects ground to conductor 2405, operating relay D(2) in the trunk. If the step-by-step office is ready to receive pulses, relay E(10) and EA(10) will be released. With relay EA(10) released and relay D(2) operated, the trunk test circuit will be closed from battery through resistance N(10) over contact 8 of relay EA(10) to conductor 2415 and thence as previously traced through the windings of relays TG(31) and OF(31) in the sender back to conductor 1022, contact 5 of relay EA(10), conductor 224, contact 11 of relay D(2), conductor 1807, resistance FA(18), contact 2 of jack C(18), upper winding of relay P(18), conductor 223 to ground at contact 1 of relay SLI(2) or contact 8 of relay D(2). Relay P(18) continues to hold battery connected to signalling conductor 207.

The sender then establishes the pulsing circuit including the contacts of relay P(30), which interrupts the circuit of relay P(18) a number of times depending on the registered digit, relay P(18) opening its contact 2 and closing its contact 1 at each interruption, thereby disconnecting battery from conductor 207 and connecting that conductor to ground for each interruption, to control the switches at the step-by-step office in the manner previously described.

When the sender has finished pulsing, it releases relay D(2) and disconnects as previously described. The operator now receives supervision from the step-by-step office by means of a circuit extending from the upper winding of relay SL(2), conductor 923, contact 1 of relay FL(9), conductor 227, contact 5 of relay CT(2), conductor 236, contact 3 of relay EA(10), conductor 1024, contact 1 of relay D(2), contact 1 of relay RV(2) to ground. When the called subscriber answers, relays E(10) and EA(10) operate to open this circuit.

If the operator wishes to resignal the step-by-step subscriber, she operates her ringing key which connects 48-volt battery to the tip conductor 123. With relay RV(2) released, the shunt around relay T(2), which is connected between the windings of coil D, is opened and relay T(2) operates, closing an obvious circuit for relay TI(2) which also operates. When the ringing key is restored, relay T(2) releases and opens the circuit of relay TI(2) which, being slow to release, also releases after an interval. During this interval the circuit through the upper winding of relay P(18) is opened and that relay closes its contact 1 to transfer conductor 207 from battery to ground as a rering signal to the step-by-step office.

At the conclusion of the call, if the step-by-step office disconnects first, ground will be removed from conductor 200, releasing relays E(10) and EA(10) to reclose the circuit through the upper winding of relay SL(2) to light the cord lamp at the operator's position. When the operator responds, by withdrawing the plug of cord 121 from jack 120, relays SL(2) and SLI(2) release, disconnecting ground from conductor 205 to permit condenser G(10) to charge and operate tube G(10) and relay G(10) as previously described. Relay G(10) releases relay MB(10) in turn releasing relay SG(2), and relay G(10). Relay SLI(2) in releasing also releases relays CH(2) and CO(2).

If the operator disconnects first, the release of relay SLI(2) disconnects conductor 207 from the control of relay P(18) and extends it to ground at contact 1 of relay TM(10) as previously traced, to transmit a disconnect signal to the step-by-step office.

Call cannot be completed

If, in attempting to complete either type of incoming call, the marker encounters a line busy, or a channel busy condition, the marker will seize the trunk link appearance of the trunk, operating relay LT(9) as previously described.

If the called line is busy, relay RC(9) will be operated and select magnets S1(17) and S9(17) of the ringing switch will be operated, followed by hold magnet H0(17), thereby closing crosspoints 01(17) and 09(17) of the ringing switch. With these cross-points closed, a circuit is completed from battery through the winding of relay BY(9), conductor 924, contact 1 of cross-point 09(17), contact 1 of cross-point 01 (17), conductor 1701, contact 5 of relay RD(10) conductor 1031 to ground at contact 8 of relay SG(2). Relay BY(9) operates and locks over its contact 5 and conductor 905 to ground at contact 8 of relay IN(10). At its contact 9, relay BY(9) connects ground to the start conductor 926 leading to the interrupter to be sure that it is operating.

With relay LT(9) operated the incoming talking conductors 212 and 213 are connected to the left windings of repeating coil A as previously traced, while relay BY(9) connects line busy tone from conductor 1025, over contact 5 of relay OF(10), conductor 1026, contact 3 of relay BY(9), condenser AX(9) to the lower right winding of repeating coil A(9). In addition relay BY(9) closes a circuit from interrupted ground on conductor 1027, contact 1 of relay OF(10), conductor 1028, contact 8 of relay BY(9) to battery through the winding of relay FL(9) causing relay FL(9) to operate and release at the line busy rate.

With relays BY(9) and RC(9) operated, conductor 207 is connected over contact 9 of relay TT(2), conductor 900, contact 6 of relay BY(9), contact 10 of relay RC(9), to the inner upper armature of relay FL(9). With relay FL(9) released, this circuit extends to ground over contact 3 of relay FL(9) and with that relay operated, it extends over contacts 4 and 7 of relay FL(9) and conductor 1800 to battery through resistance lamp M(18). Therefore, battery and ground are connected alternately to conductor 207 at a rate indicative of a busy line. When the step-by-step office disconnects relays BY(9), RC(9) and FL(9) are released.

In case the marker encounters an overflow, or channels busy condition, the operation is substantially as above described, except that select magnet S0(17) is operated in place of magnet S1(17) resulting in the closure of cross-point 00(17). With cross-point 00(17) closed, the operation of relay BY(9) closes a circuit from generator ground on conductor 1702, contact 2 of cross-point 00(17), conductor 912, contact 4 of relay BY(9), conductor 925 to battery through the lower winding of relay OF(10). Relay OF(10) locks over its contact 3 and through its upper winding, over conductor 1701, contact 5 of relay RD(10), conductor 1031 to ground at contact 8 of relay SG(2). Relay OF(10) opens the tone circuit and transfers the circuit of relay FL(9) to conductor 1029 which leads to a source of interrupted ground having the overflow rate.

In the case of an outgoing call, if the sender encounters a condition which prevents it from setting up the connection, it connects battery to conductor 1021. For example if the reorder relay RO(31) is operated, because a trouble release from the marker operates relay TRL(31), direct battery is connected over contact 5 of relay RO(31), contact 1 of relay CT(31), conductor 2408, contact 4 of cross-point 00(24) of the sender link to conductor 1021 followed by the release of the sender and the release of relay D(2). Conductor 1021 extends over contact 5 of relay D(2), conductor 235, contact 11 of relay IN(10), upper winding of relay OF(10), conductor 220 to ground at contact 7 of relay SG(2). Relay OF(10) operates under this condition and closes a locking circuit for itself from battery through its lower winding, over its contact 3 and through its upper winding to ground on conductor 220. Relay OF(10), at its contact 2, connects ground to conductor 924, operating relay BY(9). With relays BY(9) and OF(10) operated, relay FL (9) is operated at the overflow rate as previously described.

Under this condition relay RC(9) is not operated and with relay BY(9) operated, conductor 207 extends over contact 9 of relay TT(2), conductor 900, contact 6 of relay BY(9), contact 11 of relay RC(9), conductor 1800, to battery through resistance lamp M(9). The midpoint of the windings of the supervisory relay SV(18) is extended over conductor 922, contact 2 of relay BY(9), contact 12 of relay RC(9) to the inner lower armature of relay FL(9) whence it is extended to ground over contact 6 of relay FL(9) when that relay releases, and over contacts 5 and 2 of relay FL(9) to battery through resistance lamp E(9) when relay FL(9) operates, to transmit a reorder signal over the ring conductor through the switches to the originating office. When the originating operator disconnects in response to this reorder signal, ground is removed from conductor 1011, releasing relay TM(10) in turn releasing relays OF(10), BY(9) and FL(9). With relays D(2), BY(9) and TM(10) released, conductor 207 extends over contact 9 of relay TT(2), conductor 900, contact 7 of relay BY(9), conductor 1008, contact 1 of relay RD(10), contact 1 of relay IN(10), conductor 1017, contact 9 of relay SL1(2), conductor 216, contact 5 of relay F(10), conductor 1018, contact 10 of relay D(2), conductor 217, to ground at contact 1 of relay TM(10), transmitting a disconnect signal to the step-by-step office. The release of relay TM(10) also initiates the complete release of the trunk as described.

In the case of a call originated by the local toll operator, if the marker, when called in by the incoming register, finds all of the outgoing senders busy, it sets the trunk to transmit a reorder signal in a manner similar to that employed for giving an overflow signal on an incoming call. The marker operates select magnets S9(17) and S0(17), and connects ground to conductors 1803 and 1805. Ground on conductor 1803 operates relay RC(9), after which ground on conductor 1805 operates hold magnet H0(17) to close cross-points 00(17) and 09(17). The closure of the cross-points operates relays BY(9) and OF(10) as previously described, relay OF(10) locking under the control of relay TM(10) and holding relay BY(9) operated. Relay RC(9) locks over cross-point 00(17) under the control of relay TM(10) and when the marker releases relay LF(18), hold magnet H0(17) also is held operated under the control of relay TM(10).

With relays BY(9) and OF(10) operated, relay FL(9) operates at the overflow or reorder rate as previously described. At this time the incoming register has released, in turn releasing relay D(2) and relay FL(10) alternately connects and disconnects ground to the low resistance upper winding of relay SL(2) to flash the operator's cord lamp. The circuit for this purpose differs according as relay EA(10) is operated to give an off-hook indication or released as an on-hook signal. In the former case the circuit from the upper winding of relay SL(2) extends over conductor 923, contact 2 of relay FL(9), conductor 927, contact 4 of relay EA(10), conductor 1024, contact 1 of relay D(2), to ground at contact 1 of relay RV(2). In the latter case the circuit extends from conductor 923, over contact 1 of relay FL(9) conductor 227, contact 5 of relay CT(2), conductor 236, contact 3 of relay EA(10), conductor 1024, contact 1 of relay D(2) to ground at contact 1 of relay RV(2).

If the sender encounters a condition which prevents it from setting up the connection, it operates relay OF(10) as described for an outgoing call through the switches. Relay OF(10) operates relay BY(9) and these relays cause the operation of relay FL(10). Relay FL(10) flashes the operator's cord lamp as above.

Pad control

The pad control system is arranged so that when either one of a pair of connected trunks requires that the transmission pad remain in, the pads in both trunks will stay in. Pad control through the switches is accomplished by means of signals passed over the tip conductor. Battery connected to tip conductor 918 through the switches from an outgoing trunk, or by way of conductor 909 and contact 1 of relay LT(9) from an incoming trunk, completes a circuit through retard coil C(18) to ground through the winding of pad control relay PC(18). Relay PC(18) in operating, connects battery through resistance PC(18) over its contact 2, conductor 1809, contact 1 of relay TT(2) to the pad control conductor 228 associated with the two-way trunk 102 at the step-by-step office. For a locally terminated call, relay LT(9) in operating disconnects relay PC(18) from the tip conductor and holds it released. Under this condition, conductor 228 is extended over contact 1 of relay TT(2), conductor 1809, contact 1 of relay PC(18), contact 3 of relay TS2(18), contact 3 of relay TS2(18), contact 3 of relay TS1(18), conductor 1810, contact 1 of relay CT(2), conductor 229, contact 5 of relay TM(10), conductor 1030, to battery through resistance PC(18).

On an outgoing call originating at the switchboard, the above-traced circuit remains closed to keep the pad in, until relay CT(2) operates, after which it is under the control of the connected trunk. If the operator should break into the connection after cut-through, a simplex bridge in the position circuit connects battery to conductors 123 and 124, conductor 123 extending through the lower winding of retard coil D(2) and the winding of relay T(2) to conductor 230, and conductor 124 extending over contact 4 of relay SL1(2), upper winding of retard coil D(2) and resistance V(2) to conductor 230. Conductor 230 is extended over contact 7 of relay RV(2) and conductor 234 to ground through the winding of relay PD(18), operating the latter relay. Relay PD(18) connects battery through resistance PC(18) over its contact and contact 1 of relay PC(18) to conductor 1809 and over contact 1 of relay TT(2) to the pad control conductor 228.

As soon as the operator restores the circuit, the simplex battery is removed and control returns to the trunk.

During completion of a through call the pad control circuit is the same as that traced for a locally terminated call except that, when relay TF(18) is operated a path is closed at contact 2 of that relay between conductor 1810 and contact 1 of relay PC(18) in parallel with contacts 3 of relays TS1(18) and TS2(18) to maintain the pad control path after the operation of relay TS1(18) or TS2(18).

During the setting up of an outgoing call through the switches, the pad control circuit is the same as traced for a locally terminated call, except that relay F(10) at its contact 8 closes a connection between conductors 229 and 1030 in parallel with contact 5 of relay TM(10) to maintain the pad control path after the operation of relay TM(10).

What is claimed is:

1. In a telephone system a first office, subscribers' lines and switching apparatus at said first office, a second office, subscribers' lines and switching apparatus at said second office, a trunk connecting said offices and terminating in a trunk circuit at said first office, trunk seizing means individual to each of said offices, means under the control of either one of said seizing means to initiate the operation of said trunk circuit, first registers responsive to one type of pulses, first connecting means to connect one of said first registers with said trunk, other registers responsive to a different type of pulses, other connecting means to connect one of said second registers with said trunk, said first connecting means operated under the control of the seizing means individual to said first office, said second connecting means operated under the control of the seizing means individual to said second office, means to register the designation of a called subscriber's line in the connected register and means operated in accordance with said registered designation to control the switching apparatus at the non-seizing office to complete a connection to said designated line.

2. In a telephone system a cross-bar office, subscribers' lines and switching apparatus at said cross-bar office, a step-by-step office, subscribers' lines and switching apparatus at said step-by-step office, a trunk connecting said offices and terminating in a trunk circuit at said cross-bar office, means to seize said trunk from either office, first registers responsive to multifrequency pulses, other registers responsive to dial-type pulses, means in said trunk circuit responsive to seizure from said cross-bar office to connect said trunk circuit with one of said first registers, means at said cross-bar office to register the designation of a wanted line in said connected first register, means operated in accordance with said registered designation to transmit dial-type pulses to said step-by-step office to operate the switching apparatus at said step-by-step office to complete a connection to said designated line, means in said trunk circuit responsive to seizure from said step-by-step office to connect said trunk circuit with one of said other registers, means in said trunk circuit operated from said step-by-step office to register in said connected other register the designation of a wanted line, and means operated in accordance with said designation registered in said other register to operate the switching apparatus of said cross-bar office to complete a connection from said trunk circuit to said designated line.

3. In a telephone system a first office, subscribers' lines and switching apparatus at said first office, a second office, subscribers' lines and switching apparatus at said second office, a trunk connecting said offices and terminating in a trunk circuit at said first office, automatic means for seizing said trunk circuit, manual means for seizing said trunk circuit, a register sender of said first office for controlling the transmission of pulses to said second office to control the switching apparatus at said second office to complete a connection to a wanted line, a digit register at said first office for registering called line designations, first connecting means for connecting said trunk circuit with said register sender, second connecting means for connecting said trunk circuit with said digit register, means under the control of said automatic seizing means to operate said first connecting means, and means under the control of said manual seizing means to successively operate said second connecting means and said first connecting means.

4. In a telephone system a first office, subscribers' lines and switching apparatus at said first office, a second office, subscribers' lines and switching apparatus at said second office, a trunk connecting said offices and terminating in a trunk circuit at said first office, automatic means for seizing said trunk circuit, manual means for seizing said trunk circuit, a register sender at said first office for controlling the transmission of pulses to said second office to control the switching apparatus at said second office to complete a connection to a wanted line, a digit register at said first office for registering called line designations, means responsive to said manual seizing means to connect said trunk circuit with said register, means to connect said trunk circuit with said sender, means to operate said sender connecting means directly by said automatic seizing means, and means to operate said sender connecting means under the control of said manual seizing means subsequent to the operation of said register connecting means.

5. In a telephone system a first office, subscribers' lines and switching apparatus at said first office, a second office, subscribers' lines and switching apparatus at said second office, a trunk connecting said offices and terminating in a trunk circuit at said first office, automatic means for seizing said trunk at said first office, a sender at said first office, means to register a line designation in said sender, means responsive to the seizure of said trunk circuit by said automatic means to connect said trunk with said sender, manual means for seizing said trunk circuit, registers, means responsive to said manual seizure for connecting said trunk circuit with an idle one of said registers, means to register a line designation in said connected register, means under the control of said register to connect said trunk circuit with said sender and to transfer said line designation from said register to said sender, and means in said trunk circuit under the control of said sender to transmit pulses to said second office to operate the switching apparatus of said second office to complete a connection from said trunk to said designated line.

6. In a telephone system, a first office, incoming lines and switching apparatus at said first office, a second office, incoming lines and switching apparatus at said second office, a trunk connecting said offices and terminating in a trunk circuit at said first office, automatic means for seizing said trunk circuit, manual means for seizing said trunk circuit, a sender for controlling the transmission of pulses to said second office to control the switching apparatus at said second office to complete a connection to a wanted line, a register for registering line designations, a switch controlling marker, means in said marker to control said automatic seizing means, means in said marker to control the connection of said sender with said trunk, means associated with said control means for said automatic seizing means to operate said switching apparatus at said first office to connect said trunk with an incoming line, means in said trunk responsive to said manual seizing means to connect said trunk circuit with said register, and means in said register to cause said marker to connect said sender with said trunk.

HENRY J. MICHAEL.

References Cited in the file of this patent

UNITED STATES PATENTS

| Number | Name | Date |
|---|---|---|
| 1,789,606 | Stehlik | Jan. 20, 1931 |
| 2,211,116 | Hensler | Aug. 13, 1940 |
| 2,281,636 | Strickler | May 5, 1942 |
| 2,300,951 | Malthaner | Nov. 3, 1942 |
| 2,332,912 | Hecht | Oct. 26, 1943 |
| 2,465,539 | Joel | Mar. 29, 1949 |
| 2,467,490 | McClew | Apr. 19, 1949 |
| 2,486,100 | Beale et al. | Oct. 25, 1949 |
| 2,569,650 | Balzer et al. | Oct. 2, 1951 |